(12) United States Patent
Shin et al.

(10) Patent No.: US 12,032,996 B2
(45) Date of Patent: *Jul. 9, 2024

(54) PROCESSING DEVICE AND METHOD FOR MANAGING TASKS THEREOF

(71) Applicant: Rebellions Inc., Seongnam-si (KR)

(72) Inventors: Wongyu Shin, Seongnam-si (KR); Miock Chi, Seongnam-si (KR); Hongyun Kim, Seongnam-si (KR); Jinwook Oh, Seongnam-si (KR); Juyeong Yoon, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,695

(22) Filed: Oct. 20, 2023

(65) Prior Publication Data
US 2024/0152391 A1    May 9, 2024

(30) Foreign Application Priority Data

Nov. 4, 2022 (KR) .......... 10-2022-0146444
Nov. 4, 2022 (KR) .......... 10-2022-0146533
Nov. 4, 2022 (KR) .......... 10-2022-0146543

(51) Int. Cl.
*G06F 9/48* (2006.01)
*G06F 9/38* (2018.01)

(52) U.S. Cl.
CPC .......... *G06F 9/4881* (2013.01); *G06F 9/3838* (2013.01)

(58) Field of Classification Search
CPC ............................ G06F 9/4881; G06F 9/3838
See application file for complete search history.

(56) References Cited

U.S. PATENT DOCUMENTS

2020/0110676 A1* 4/2020 Volos .................... G06F 11/203
2023/0034835 A1* 2/2023 Reyes .................... G06F 9/5027

FOREIGN PATENT DOCUMENTS

KR    10-2258566 B1    6/2021

* cited by examiner

*Primary Examiner* — Wissam Rashid
(74) *Attorney, Agent, or Firm* — BROADVIEW IP LAW, PC

(57) ABSTRACT

A neural processing device and a method for managing tasks thereof are provided. The neural processing device includes a neural core configured to perform a task and generate a completion signal for completion of the task, a core global configured to transfer task information for the task to the neural core and receive the completion signal of the task from the neural core, and a task manager configured to generate and transmit the task information to the core global, receive the completion signal from the core global, generate a completion report, and transmit the completion report.

19 Claims, 40 Drawing Sheets

PROCESSING DEVICE AND METHOD FOR MANAGING TASKS THEREOF

CROSS-REFERENCE TO RELATED APPLICATION

This application claims priority under 35 U.S.C § 119 to Korean Patent Application No. 10-2022-0146533, filed on Nov. 4, 2022, Korean Patent Application No. 10-2022-0146444, filed on Nov. 4, 2022, and Korean Patent Application No. 10-2022-0146543, filed on Nov. 4, 2022, in the Korean Intellectual Property Office, the entire contents of which is hereby incorporated by reference.

TECHNICAL FIELD

The disclosure relates to a processing device and a method for managing tasks thereof. Specifically, the disclosure relates to a processing device and a method for managing tasks that perform task management efficiently.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

Such a neural processing unit has a plurality of computation devices therein, and each computation device operates in parallel and thus can enhance computation efficiency. In this case, a method of distributing and managing tasks to each computation device may be important.

The description set forth in the background section should not be assumed to be prior art merely because it is set forth in the background section. The background section may describe aspects or embodiments of the disclosure.

SUMMARY

Aspects of the disclosure provide a neural processing device that performs task management efficiently.

Aspects of the disclosure provide a method for managing tasks of a neural processing device that performs task management efficiently.

According to some aspects of the disclosure, a neural processing device includes a neural core configured to perform a task and generate a completion signal for completion of the task, a core global configured to transfer task information for the task to the neural core and receive the completion signal of the task from the neural core, and a task manager configured to generate and transmit the task information to the core global, receive the completion signal from the core global, generate a completion report, and transmit the completion report.

According to some aspects, the task manager includes a task passage configured to generate a task descriptor for the task and transfer the task information according to the task descriptor to the core global, and a done passage configured to perform check-in by receiving the task descriptor from the task passage and storing the task descriptor in a check-in buffer, and generate the completion report by receiving the completion signal and performing check-out of the task descriptor, and wherein the check-in is a procedure in which the task descriptor is registered before being processed, and the check-out is a procedure in which the task descriptor is processed and de-registered.

According to some aspects, the task passage includes a task buffer configured to receive and store the task from a command processor, a task queue in which the task descriptor received from the task buffer waits, and a runtime handle configured to transfer task information corresponding to a task descriptor transferred from the task queue to the core global, and wherein the runtime handle controls the task descriptor to wait in the task queue if the task descriptor includes a wait field.

According to some aspects, the runtime handle releases a waiting state of the task descriptor in response to a run signal provided from the command processor.

According to some aspects, the runtime handle includes a run signal counter in which the run signal is received, and the runtime handle releases the waiting state of the task descriptor via the run signal received in advance in the run signal counter.

According to some aspects, the runtime handle transfers task information corresponding to a task descriptor whose waiting state has been released or task information corresponding to a task descriptor that does not include the wait field to the core global, and provides a task descriptor corresponding to the task information transferred to the core global as check-in data to the done passage.

According to some aspects, the task queue includes a first queue configured to receive the task descriptor from the task buffer, a dependency checker configured to receive a task descriptor from the first queue and perform a dependency check on the received task descriptor, and a second queue configured to receive the task descriptor for which the dependency check has been completed from the dependency checker.

According to some aspects, the second queue includes a first task descriptor and a second task descriptor stored in sequence, and as the first task descriptor is controlled to wait in the second queue by the runtime handle, the second task descriptor is also controlled to wait in the second queue.

According to some aspects, the task manager is configured to generate a timeout detection signal by monitoring an execution time of the task in the neural core, and generate a timeout report according to the timeout detection signal.

According to some aspects, the timeout report is included in the completion report and transferred to a command processor.

According to some aspects, the task includes a first task that is set to generate the completion report and a second task that is set not to generate the completion report, and the task manager checks in a first task descriptor corresponding to the first task and a second task descriptor corresponding to the second task into a first check-in buffer and a second check-in buffer, respectively.

According to some aspects, the task manager modifies the second task descriptor to generate a completion report if a timeout report for the second task is generated.

According to some aspect of the disclosure, a neural processing device includes at least one neural processor including first and second neural processors, a shared memory shared by the at least one neural processor, a command processor configured to transfer tasks to the at least one neural processor, and a global interconnection configured to exchange data and control signals of the at least one neural processor and the shared memory, wherein the first neural processor includes first and second neural cores, and a first task manager configured to generate task descriptors by receiving the tasks, and report completion reports for the task descriptors to the command processor.

According to some aspects, the second neural processor includes a second task manager configured to generate task descriptors by receiving the tasks, and report completion reports for the task descriptors to the command processor, and third and fourth neural cores.

According to some aspects, the at least one neural processor further includes a third neural processor, and the third neural processor includes a third task manager configured to generate task descriptors by receiving the tasks, and report completion reports for the task descriptors to the command processor.

According to some aspects, the neural processing device further includes a first master task manager configured to receive the completion reports from the first and second task managers and report the completion reports to the command processor.

According to some aspects of the disclosure, a method for managing tasks of a neural processing device includes fetching tasks and generating task descriptors, checking dependencies of the task descriptors and sequentially transferring the task descriptors, checking wait fields of the task descriptors and sequentially transferring the task descriptors whose wait fields are checked, performing the tasks of the transferred task descriptors, and receiving completion signals of the performed tasks and generating completion reports.

According to some aspects, the checking the wait fields of the task descriptors and sequentially transferring the task descriptors includes controlling a task descriptor to wait in a task queue if the task descriptor includes a wait field, releasing a waiting state of the task descriptor in response to a run signal provided from a command processor, generating task information corresponding to the task descriptor whose waiting state has been released and transferring the task information to a core global, and providing the task descriptor corresponding to the task information transferred to the core global as check-in data to the done passage.

According to some aspects, the performing the tasks of the transferred task descriptors includes monitoring execution times for the tasks and generating timeout detection signals, and the receiving the completion signals of the performed tasks and generating the completion reports includes generating timeout reports according to the timeout detection signals, generating checkout reports according to the received completion signals, and generating completion reports based on the checkout reports and the timeout reports.

According to some aspects, the tasks include a first task that is set to generate the completion report and a second task that is set not to generate the completion report, the checking the wait fields of the task descriptors and sequentially transferring the task descriptors includes checking in a first task descriptor corresponding to the first task and a second task descriptor corresponding to the second task into a first check-in buffer and a second check-in buffer, respectively, if a timeout report for the second task is generated in the generating the timeout reports, the generating the completion reports includes modifying the second task descriptor to generate a completion report.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The neural core, the neural processing device, and the method for managing tasks thereof according to the disclosure can efficiently perform the management of tasks distributed to a plurality of neural cores as the task manager manages and monitors the tasks of the neural cores, respectively, and reports them to the command processor.

In addition, CPU intervention can be minimized by checking whether each task is completed and actively controlling the dependency of each task. Accordingly, the overhead due to communication with the CPU can be minimized.

Further, if a report to the command processor is required, it can be configured to modify whether to generate a completion report for each task descriptor. Accordingly, it may be possible to report related to a particular task without monitoring all tasks, and thus stable monitoring of tasks may be possible while reducing the burden on the command processor.

Moreover, the execution time of tasks can be controlled via the runtime handle configured in the task manager. That is, it can be managed so that a temporary waiting time occurs between distributed tasks, and it is possible to further improve not only the sequential processing of the entire tasks but also the efficiency of task processing and management.

In addition to the foregoing, the specific effects of the disclosure will be described together while elucidating the specific details for carrying out the embodiments below.

DETAILED DESCRIPTION OF THE PREFERRED EMBODIMENTS

Figure 1:
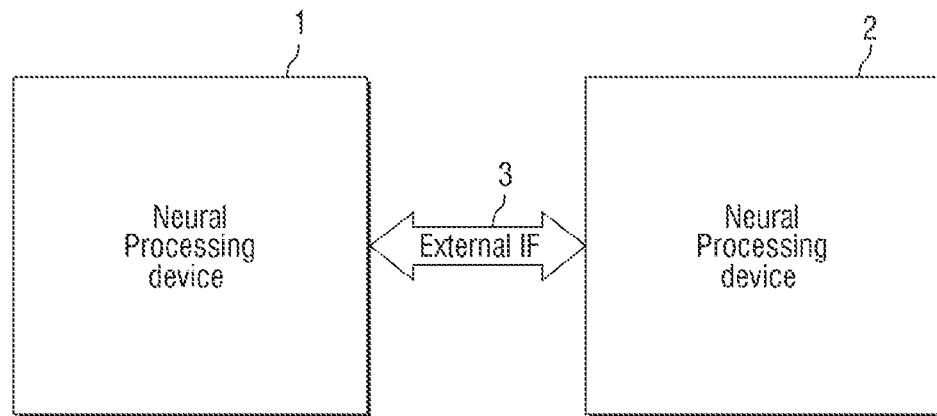
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device in accordance with some embodiments of the disclosure will be described with reference to FIGS. 1 to 41.

FIG. 1 is a block diagram for illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. In some embodiments, in a neural processing system NPS, three or more neural processing devices may be connected to each other via the external interface 3. Also, conversely, a neural processing system NPS in accordance with some embodiments may include only one neural processing device.

In some embodiments, each of the first neural processing device 1 and the second neural processing device 2 may be a processing device other than the neural processing device. In some embodiments, each of the first neural processing device 1 and the second neural processing device 2 may be a graphics processing unit (GPU), a central processing unit (CPU), and other types of processing units as well. In the following, the first neural processing device 1 and the second neural processing device 2 will be described as neural processing devices for convenience.

Figure 2:
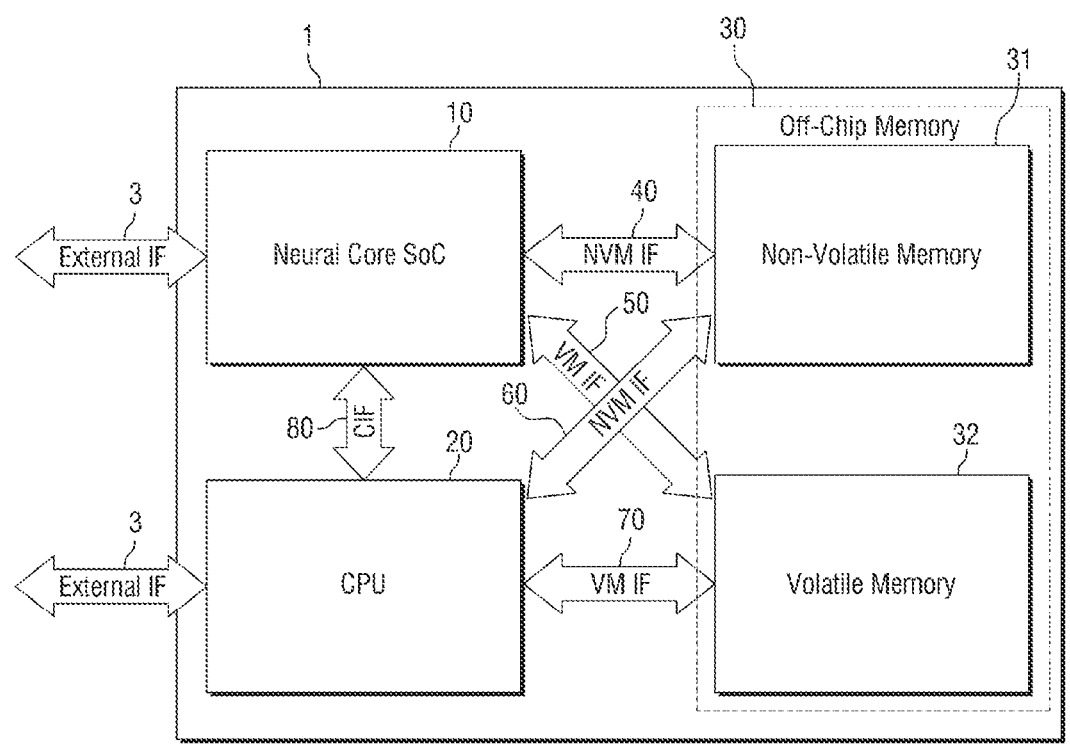
FIG. 2 is a block diagram for illustrating the neural processing device of FIG. 1.

FIG. 2 is a block diagram for illustrating the neural processing device of FIG. 1.

Referring to FIG. 2, the first neural processing device 1 may include a neural core SoC 10, a CPU 20, an off-chip memory 30, a first non-volatile memory interface 40, a first volatile memory interface 50, a second non-volatile memory interface 60, a second volatile memory interface 70, and a control interface (CIF) 80.

The neural core SoC 10 may be a system on a chip device. The neural core SoC 10 can be an artificial intelligence calculation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are frequently used in deep learning. Accordingly, there can be high efficiency by performing calculations in deep learning inference and training tasks by the neural core SoC 10.

The CPU 20 may exchange data with other external calculation units via the external interface 3. Further, the CPU 20 may be connected to the non-volatile memory 31 and the volatile memory 32 via the second non-volatile memory interface 60 and the second volatile memory interface 70, respectively.

The CPU 20 may also transfer tasks to the neural core SoC 10 via commands. In some embodiments, the CPU 20 may be a kind of host that gives instructions to the neural core SoC 10. In some embodiments, the neural core SoC 10 can efficiently perform parallel computation tasks such as deep learning tasks according to the instructions of the CPU 20.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

The control interface 80 may be an interface for transferring control signals between the CPU 20 and the neural core SoC 10. The control interface 80 may transmit commands of the CPU 20 and transmit the responses thereto of the neural core SoC 10. The control interface 80 may be, for example, PCIe (PCI Express), but is not limited thereto.

Figure 3:
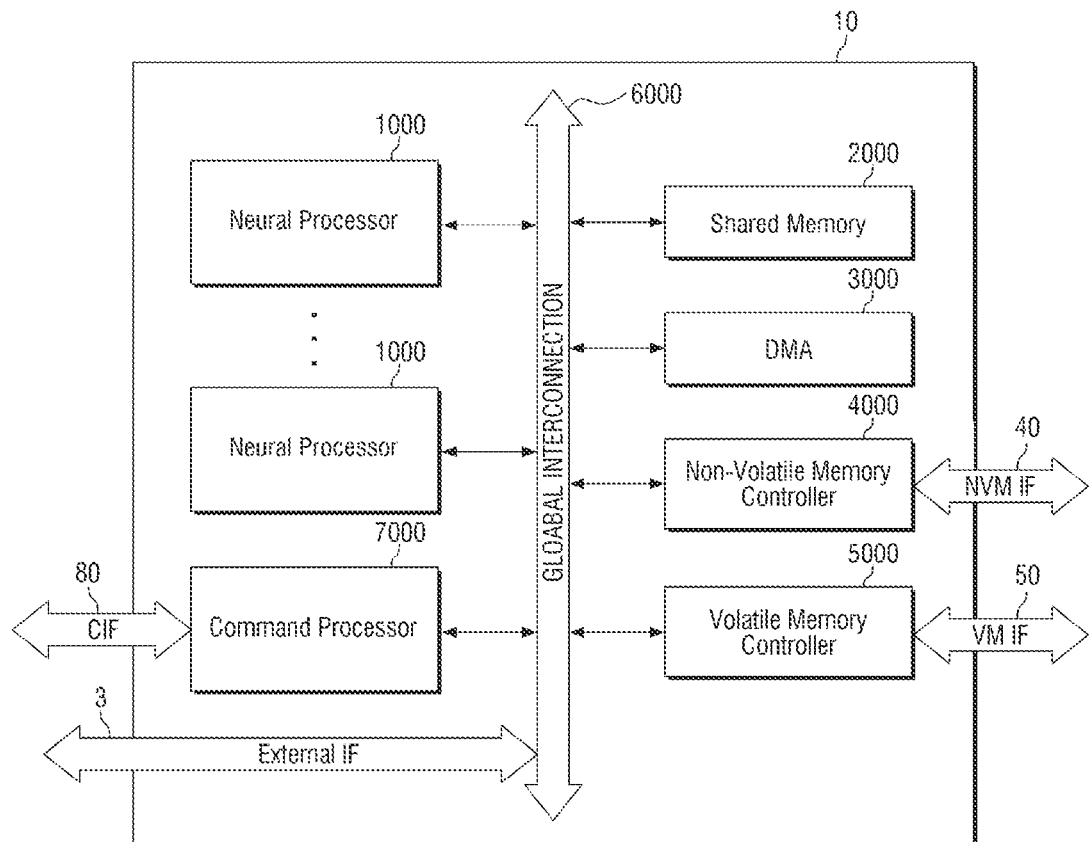
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, a command processor 7000, and a global interconnection 6000. In some embodiments, the command processor 7000 may be referred to as a command processor circuit, but for the sake of convenience, the terms are unified as a command processor. In addition, the command processor 7000 may be implemented as a circuit or circuitry.

The command processor 7000 may be implemented in software on the off-chip memory 30, in particular, on the volatile memory 32 of FIG. 2. However, the embodiment is not limited thereto and may also be implemented as separate hardware. Furthermore, the command processor 7000 may also be implemented in software in part and in hardware in part. In some embodiments, the part implemented in hardware can increase the computation speed of the command processor 7000.

The neural processor 1000 may be a calculation device that directly performs calculation tasks. If there exist a plurality of neural processors 1000, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 2.

The shared memory 2000 may be required to be a relatively high-speed memory.

Accordingly, the shared memory 2000 may include, for example, an SRAM. However, the embodiment is not limited thereto. In some embodiments, the shared memory 2000 may include a DRAM as well.

The shared memory 2000 may be a memory corresponding to the SoC level, i.e., level 3 (L3). Accordingly, the shared memory 2000 may also be defined as an L3 shared memory.

The DMA 3000 can directly control the movement of data without requiring the CPU 20 or the neural processor 1000 to control input/output of data. Accordingly, the DMA 3000 may control data movement between memories, thereby minimizing the number of interrupts of the CPU 20 or the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40. In some embodiments, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control the task of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The command processor 7000 may be connected to the control interface 80. The command processor 7000 may receive control signals from the CPU 20 via the control interface 80. The command processor 7000 may generate tasks via the control signals received from the CPU 20 and transmit the tasks to neural processors 1000. Further, the command processor 7000 may receive completion reports for the tasks from each neural processor 1000.

The global interconnection 6000 may connect the at least one neural processor 1000, the shared memory 2000, the DMA 3000, the non-volatile memory controller 4000, the command processor 7000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, the command processor 7000, and the external interface 3.

The global interconnection 6000 may transmit not only data but also control signals and may transmit a signal for synchronization. In some embodiments, in the neural processing device, each neural processor 1000 may directly transmit and receive a synchronization signal, instead of a separate control processor managing the synchronization signal. Accordingly, it is possible to preclude the latency of the synchronization signal generated by the command processor 7000.

In some embodiments, if there exist a plurality of neural processors 1000, there may be dependencies of individual tasks in which the task of one neural processor 1000 needs to be finished before the next neural processor 1000 start a new task. The end and start of these individual tasks can be checked via synchronization signals. In conventional techniques, both the reception of such synchronization signals and an instruction to start a new task were performed exclusively by the command processor 7000 or the host, i.e., the CPU 20.

However, as the number of neural processors 1000 increases and task dependencies are designed more complicatedly, the number of these synchronization signals increases exponentially, and thus, the latency resulting from each synchronization signal can greatly reduce the efficiency of tasks.

Accordingly, in the neural processing device in accordance with some embodiments, each neural processor 1000, instead of the command processor 7000, may directly transmit a synchronization signal to another neural processor 1000 according to the dependency of a task. In some embodiments, several neural processors 1000 can perform the synchronization tasks in parallel as compared with the method managed by the command processor 7000, thereby minimizing the latency due to synchronization.

In addition, the command processor 7000 needs to perform the task scheduling of the neural processors 1000 according to task dependencies, and the overhead of such scheduling may increase significantly as the number of neural processors 1000 increases. Accordingly, in the neural processing device, in accordance with some embodiments, the scheduling task is also performed by the individual neural processors 1000, and thus, the performance of the neural processing device can be improved without resulting in an additional scheduling burden.

In addition, the neural processing device in accordance with some embodiments of the disclosure can perform monitoring whether a task is completed, an event occurs, a task is delayed, or the like in the neural core of each neural processor 1000, and can minimize the intervention of the command processor 7000 and reduce the burden on the command processor 7000, thereby improving the performance of the device.

Furthermore, the neural processing device in accordance with some embodiments of the disclosure can selectively generate a completion report by setting whether to monitor a task for each task, and can be configured to modify whether to generate a completion report if a report to the command processor 7000 is required. Accordingly, it may be possible to report tasks that require an alert without monitoring all tasks, and stable monitoring of tasks may be possible while reducing the burden on the command processor 7000.

Figure 4:
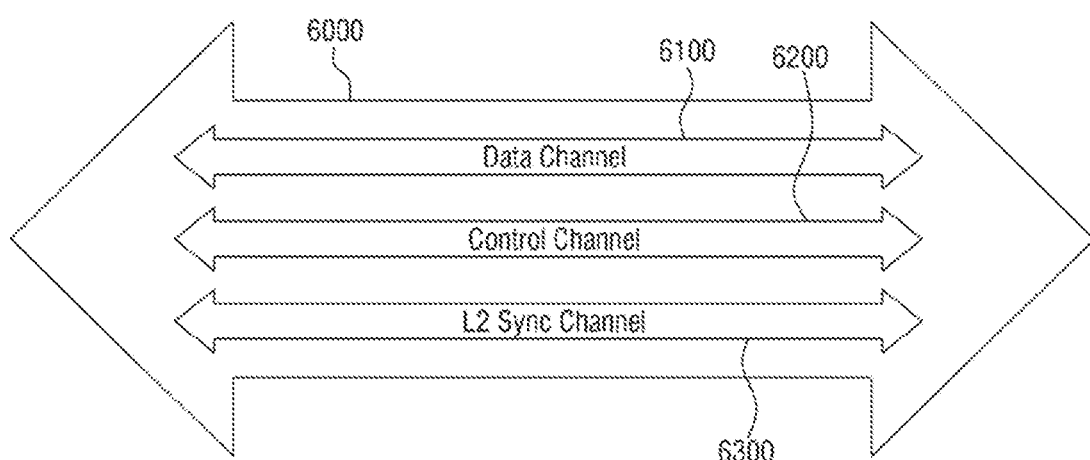
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Via the control channel 6200, the at least one neural processor 1000, the shared memory 2000, the DMA 3000, the non-volatile memory controller 4000, the volatile memory controller 5000, the command processor 7000, and the external interface 3 may exchange control signals with one another. In particular, the command processor 7000 may transfer various control signals to each neural processor 1000.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, the command processor 7000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
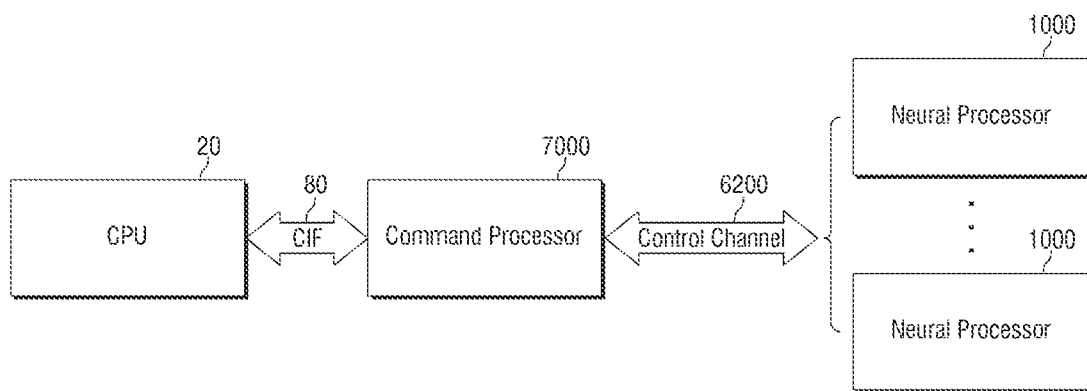
FIG. 5 is a block diagram for illustrating a flow of control signals of the neural processing device of FIG. 1.

FIG. 5 is a block diagram for illustrating a flow of control signals of the neural processing device of FIG. 1.

Referring to FIG. 5, the CPU 20 may transfer control signals to the command processor 7000 via the control interface 80. In some embodiments, a control signal may be a signal instructing execution of each operation, such as a computation task or a data load/store task.

The command processor 7000 may receive the control signals and transfer the control signals to the at least one neural processor 1000 via the control channel 6200. Each control signal may be stored in the neural processor 1000 as each task.

Figure 6:
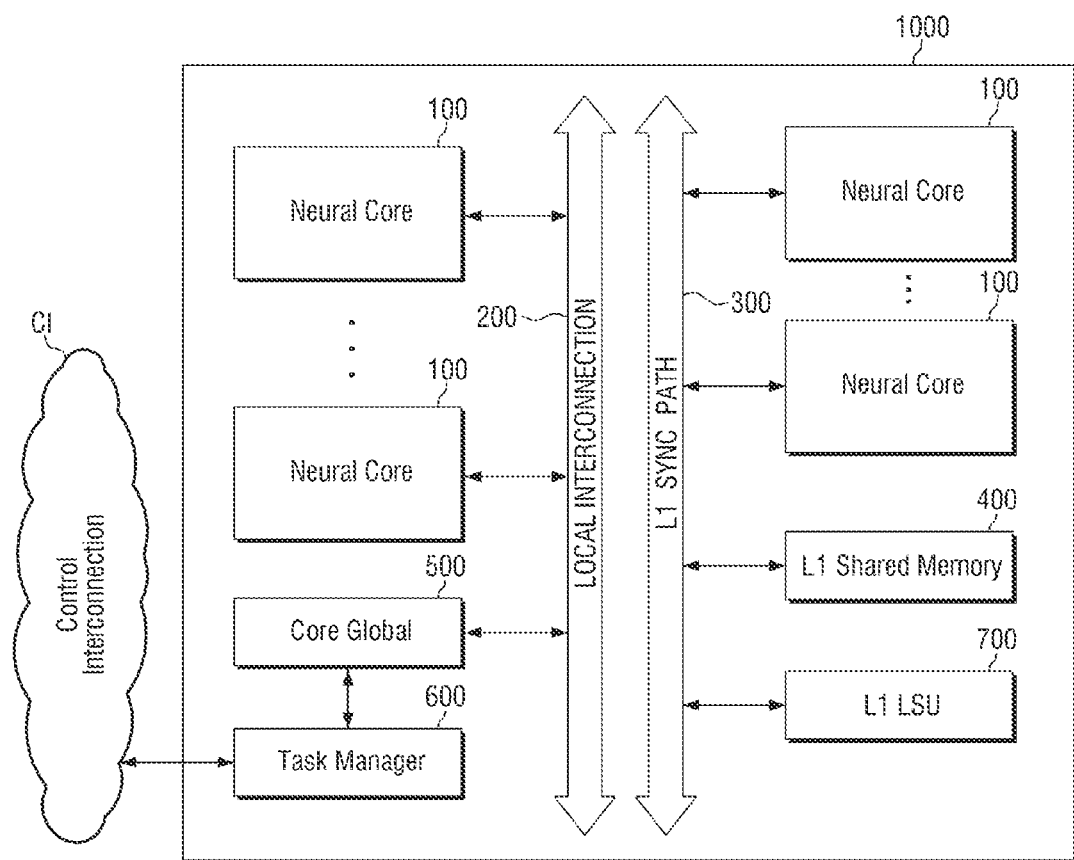
FIG. 6 is a block diagram for illustrating the neural processor of FIG. 3 in detail.

FIG. 6 is a block diagram for illustrating the neural processor of FIG. 3.

Referring to FIGS. 3 to 6, the neural processor 1000 may include at least one neural core 100, a local interconnection 200, an L1 sync path 300, an L1 shared memory 400, a core global 500, a task manager 600, and an L1 load/store unit (LSU) 700. The L1 LSU 700, the task manager 600, and the core global 500 may be referred to respectively as an L1 LSU circuit, a task manager circuit, and a core global circuit, but for the sake of convenience, the terms are respectively unified as an L1 LSU, a task manager, and a core global. In addition, the L1 LSU 700, the task manager 600, and the core global 500 may each be implemented as a circuit or circuitry.

The at least one neural core 100 may share and perform the tasks of the neural processor 1000. The number of neural cores 100 may be, for example, eight. However, the embodiment is not limited thereto. FIGS. 3 and 6 illustrate that a plurality of neural cores are included in the neural processor 1000, but the embodiment is not limited thereto. In some embodiments, the neural processor 1000 may be configured with only one neural core.

The neural core 100 may receive task information from the core global 500 and perform a task according to the task information. In some embodiments, a task may be defined by a control signal, and the task may be one of computation operations and memory operations. The memory operation may be, for example, one of micro-DMA (uDMA), LP micro-DMA (Low Priority uDMA), store uDMA (STuDMA), and a pre-processing task.

The L1 shared memory 400 may be a memory shared by the neural cores 100 in the neural processor 1000. The L1 shared memory 400 may store data of each neural core 100. In addition, the L1 shared memory 400 may receive data from the shared memory 2000 of FIG. 3, store them temporarily, and transfer them to each neural core 100. On the contrary, the L1 shared memory 400 may also receive data from the neural core 100, store them temporarily, and transfer them to the shared memory 2000 of FIG. 3.

The L1 shared memory 400 may be a memory corresponding to the neural processor level, i.e., level 1 (L1). The L2 shared memory, i.e., the shared memory 2000 may be shared by the neural processors 1000, and the L1 shared memory 400 may be shared by the neural cores 100.

The L1 LSU 700 may receive at least one of data, a control signal, or a synchronization signal from the outside via the global interconnection 6000. The L1 LSU 700 may transmit at least one of the received data, control signal, or synchronization signal to the L1 shared memory 400. Similarly, the L1 LSU 700 may transfer at least one of the data, the control signal, or the synchronization signal to the outside via the global interconnection 6000. In addition, the L1 LSU 700 may transfer and receive at least one of the data, the control signal, or the synchronization signal to and from each of the neural cores 100.

The neural core 100 may receive task information from the core global 500 and perform tasks according to the task information. In some embodiments, a task may be a computation task (calculation task) or a task related to a memory operation. A task may be defined by a control signal. The task information is information about a task, and may be information about a type of a task, a form of a task, additional information about a task, and the like.

The neural core 100 may transfer a completion signal indicating the completion of execution of a task to the core global 500.

The task manager 600 may receive tasks from a control interconnection CI. In some embodiments, the control interconnection CI may be a generic term for transmission interfaces that transfer tasks from the command processor 7000. In some embodiments, the control interconnection CI may include the control channel 6200 and the local interconnection 200.

The task manager 600 may receive tasks, generate task information, and transmit the task information to the core global 500. Further, the task manager 600 may receive completion signals via the core global 500, generate completion reports accordingly, and transmit completion reports to the command processor 7000 via the control interconnection CI.

The core global 500 may be a wire structure connected in hardware within the neural core 100. Although not shown, the core global 500 may be a structure connecting all of the neural core 100, the L1 shared memory 400, the L1 LSU 700, and the task manager 600. Accordingly, the local interconnection 200 and the L1 sync path 300 may also be included in the core global 500. However, the embodiment is not limited thereto.

The core global 500 may receive the task information from the task manager 600 and transfer the task information to the neural core 100, and may receive a completion signal related thereto from the neural core 100. Subsequently, the core global 500 may transfer the completion signal to the task manager 600.

The local interconnection 200 may connect the at least one neural core 100, the L1 shared memory 400, the L1 LSU 700, the core global 500, and the task manager 600 to one another. The local interconnection 200 may be a path through which data moves between the at least one neural core 100, the L1 shared memory 400, the L1 LSU 700, the core global 500, and the task manager 600. The local interconnection 200 may be connected and transmit data to the global interconnection 6000 of FIG. 3.

The L1 sync path 300 may connect the at least one neural core 100, the L1 shared memory 400, the core global 500 and the task manager 600 to each other. The L1 sync path 300 may be a path through which synchronization signals of the at least one neural core 100, the L1 shared memory 400, the core global 500 and the task manager 600 travel.

The L1 sync path 300 may be formed physically separately from the local interconnection 200. In the case of the local interconnection 200, sufficient channels may not be formed therein, unlike the global interconnection 6000. In such a case, the L1 sync path 300 may be formed separately so that the synchronization signal can be transmitted quickly and without any delay. The L1 sync path 300 may be used for synchronization performed at a level one step lower than that of the L2 sync channel 6300 of the global interconnection 6000.

Figure 7:
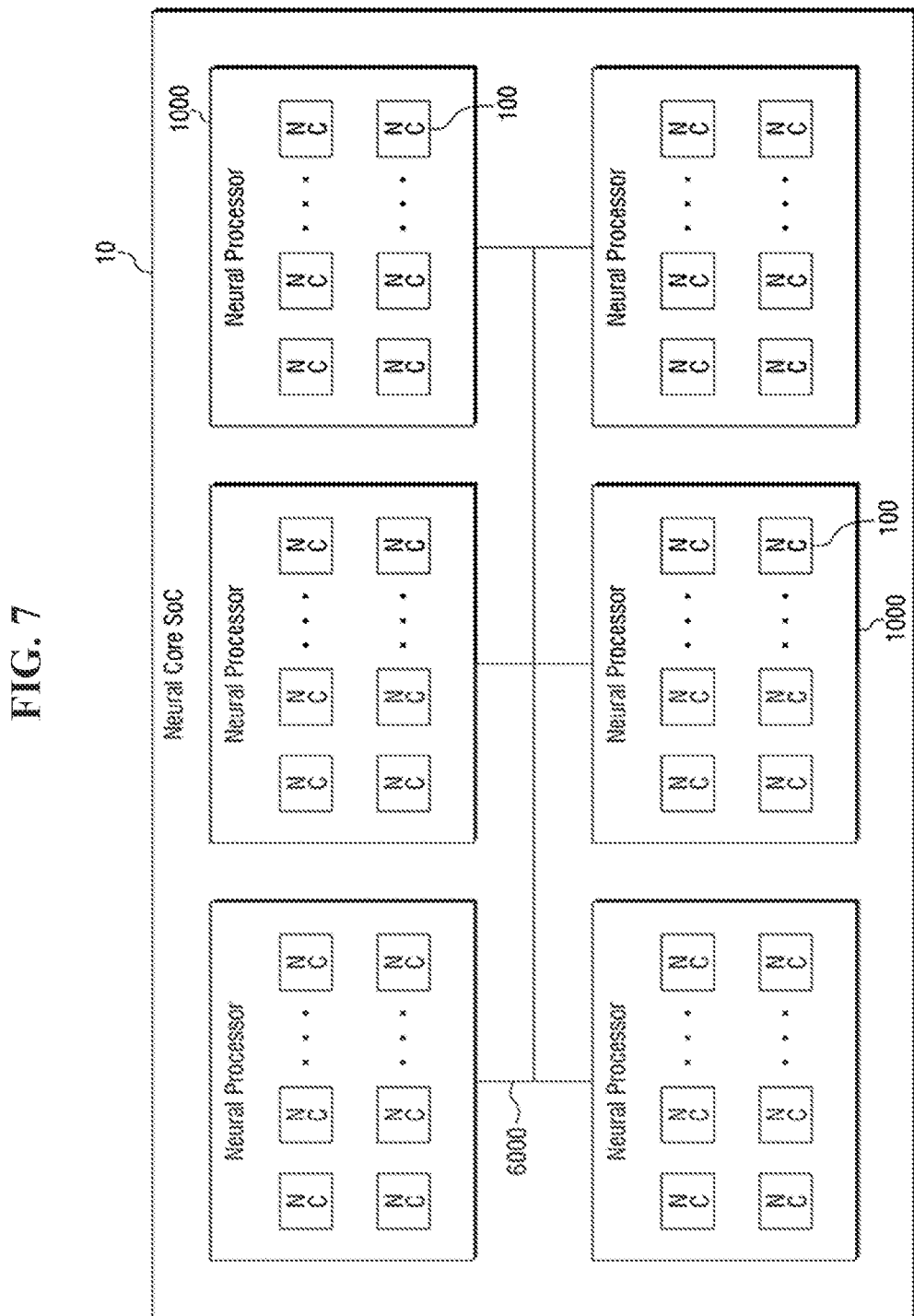
FIG. 7 is a diagram for illustrating a hierarchical structure of a neural processing device in accordance with some embodiments of the disclosure.

FIG. 7 is a diagram for illustrating a hierarchical structure of a neural processing device in accordance with some embodiments of the disclosure.

Referring to FIG. 7, the neural core SoC 10 may include at least one neural processor 1000. Each neural processor 1000 may transmit data to each other via the global interconnection 6000.

The neural processors 1000 may each include at least one neural core 100. The neural core 100 may be a unit of processing optimized for deep learning computation tasks. The neural core 100 may be a unit of processing corresponding to one operation of deep learning computation tasks. In other words, a deep learning computation task can be represented by a sequential or parallel combination of multiple operations. The neural cores 100 may each be a unit of processing capable of processing one operation, and may be a minimum computation unit that can be considered for scheduling from the viewpoint of a compiler.

The neural processing device in accordance with the embodiment may configure scales of the minimum computation unit considered from the viewpoint of compiler scheduling and the hardware unit of processing to be the same, so that fast and efficient scheduling and computation tasks can be performed.

In some embodiments, if a unit of processing into which hardware can be divided is too large compared to computation tasks, inefficiency of the computation tasks may occur in driving the unit of processing. Conversely, it is not appropriate to schedule a unit of processing that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware unit of processing to be similar in the embodiment, it is possible to simultaneously satisfy the fast scheduling of computation tasks and the efficient execution of the computation tasks without wasting hardware resources.

Figure 8:
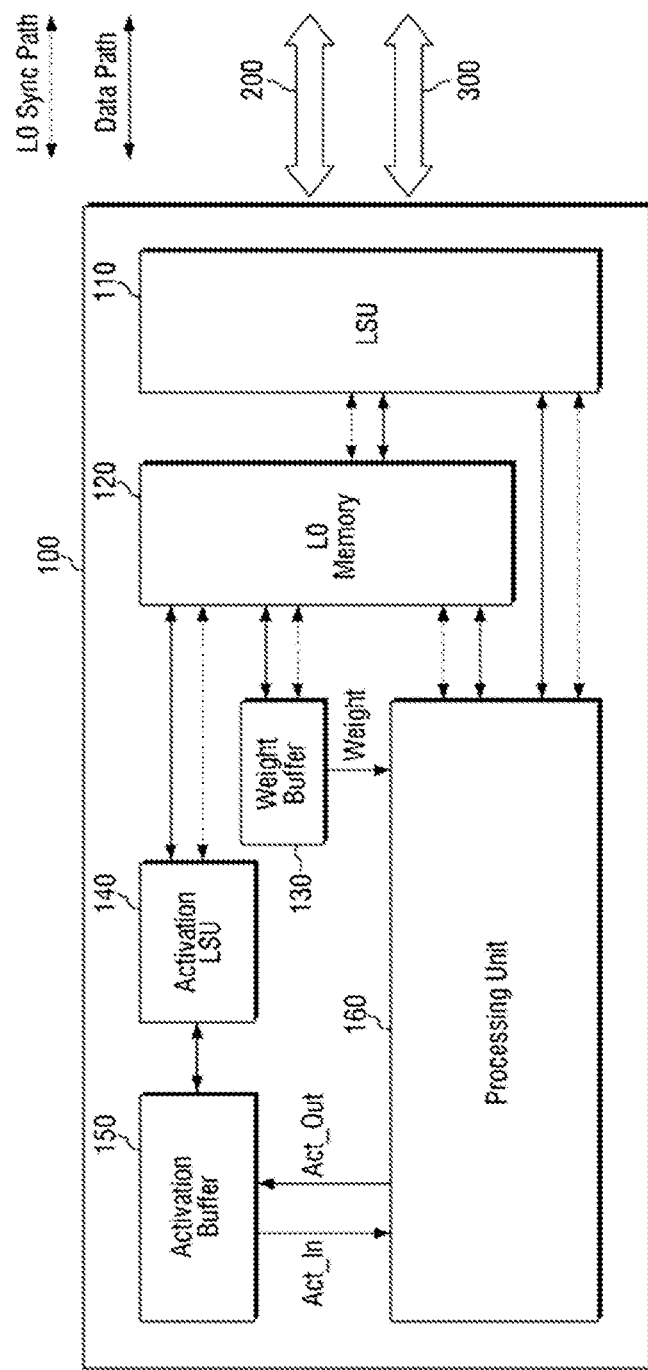
FIG. 8 is a block diagram for illustrating the neural core of FIG. 6 in detail.

FIG. 8 is a block diagram for illustrating the neural core of FIG. 6 in detail.

Referring to FIG. 8, the neural core 100 may include a load/store unit (LSU) 110, an L0 memory 120, a weight buffer 130, an activation LSU 140, an activation buffer 150, and a processing unit 160. In some embodiments, the LSU 110 and the activation LSU 140 may referred to respectively as an LSU circuit and an activation LSU circuit, but for the sake of convenience, the terms are respectively unified as an LSU and an activation LSU. Further, the LSU 110 and the activation LSU 140 may each be implemented as a circuit or circuitry.

The LSU 110 may receive at least one of data, a control signal, or a synchronization signal from the outside via the local interconnection 200 and the L1 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L1 sync path 300.

Specifically, the micro-DMA task may be a task in which the neural core 100 loads a program or data from the shared memory 2000 or the off-chip memory 30 to the L0 memory 120. The LP micro-DMA task may be a load task for a program or data to be used later rather than a current program or data, unlike a general micro-DMA task. As such a task has a low priority, it can be identified differently from the micro-DMA task. The ST micro-DMA task may be a store task that stores data from the L0 memory 120 of the neural core 100 to the shared memory 2000 or the off-chip memory 30. The pre-processing task may include a task that pre-loads data such as a large number of lookup tables in the CPU 20.

Figure 9:
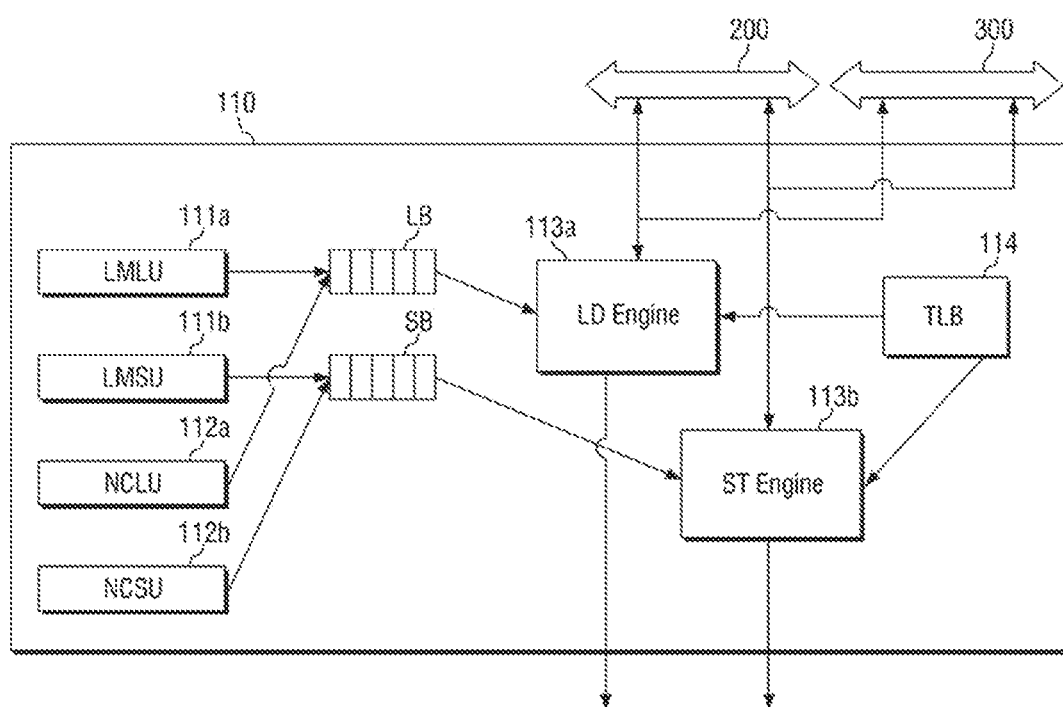
FIG. 9 is a block diagram for illustrating the LSU of FIG. 8 in detail.

FIG. 9 is a block diagram for illustrating the LSU of FIG. 8 in detail.

Referring to FIG. 9, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114. The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, the local memory load unit 111a, the local memory store unit 111b, the neural core load unit 112a, the neural core store unit 112b, the load engine 113a, and the store engine 113b may each be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. In some embodiments, the load engine 113a may quickly find the data by using a translation table of a logical address and a physical address that has been used recently in the translation lookaside buffer 114. If the logical address of the load engine 113a is not in the translation lookaside buffer 114, the address translation information may be found in another memory.

The store engine 113b may receive the memory access request and retrieve data via the local interconnection 200. In some embodiments, the store engine 113b may quickly find the data by using a translation table of a logical address and a physical address that has been used recently in the translation lookaside buffer 114. If the logical address of the store engine 113b is not in the translation lookaside buffer 114, the address translation information may be found in another memory.

The load engine 113a and the store engine 113b may send synchronization signals to the L1 sync path 300. In some embodiments, the synchronization signal may indicate that the task has been completed.

Referring to FIG. 8 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a processing element (PE) array 163 and a vector unit 164. The L0 memory 120 may be a memory corresponding to the level of the neural core. In some embodiments, the L0 memory 120 may be a private memory of the neural core that is not shared.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In some embodiments, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 10:
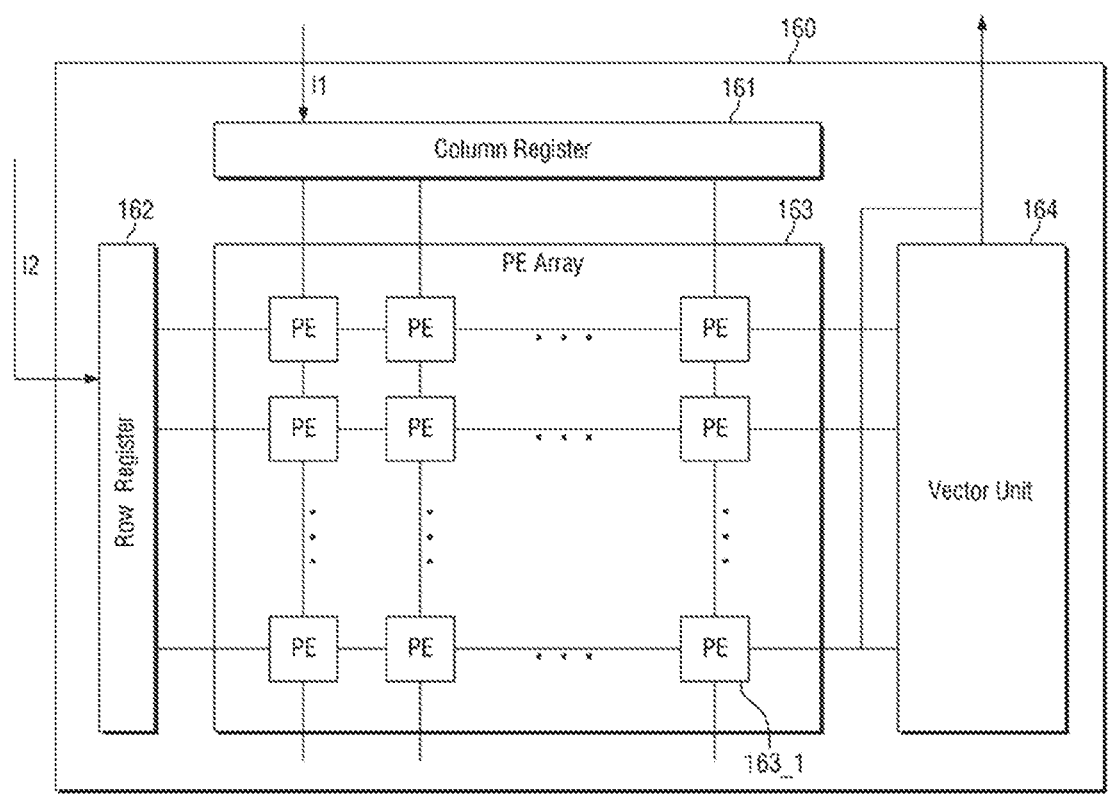
FIG. 10 is a block diagram for illustrating the processing unit of FIG. 8.

FIG. 10 is a block diagram for illustrating the processing unit of FIG. 8 in detail.

Referring to FIG. 8 and FIG. 10, the processing unit 160 may include a PE array 163, a vector unit 164, a column register 161, and a row register 162.

The PE array 163 may receive the input activation Act_In and the weight and perform multiplication on them. In some embodiments, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element (PE) 163_1. The processing elements 163_1 may be aligned with each other so that each of the processing elements 163_1 may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 11:
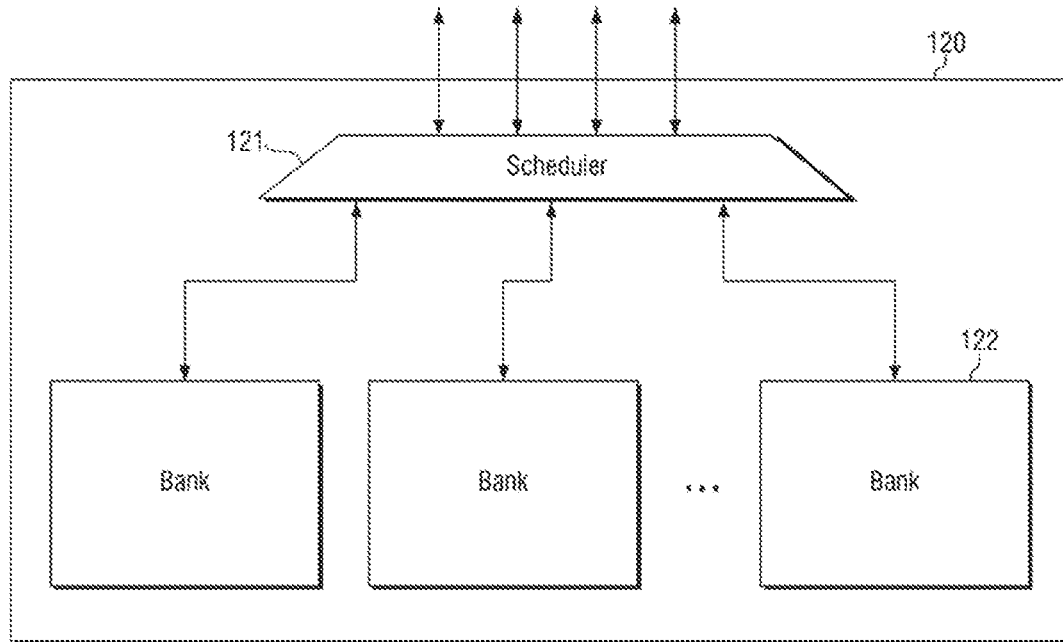
FIG. 11 is a block diagram for illustrating the L0 memory of FIG. 8 in detail.

FIG. 11 is a block diagram for illustrating the L0 memory of FIG. 8 in detail.

Referring to FIG. 11, the L0 memory 120 may include a scheduler 121 and one or more local memory banks 122.

When data is stored in the L0 memory 120, the scheduler 121 may receive data from the load engine 113a. In some embodiments, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200. In some embodiments, the scheduler 121 may be referred to as a scheduler circuit, but for the sake of convenience, the term is unified as a scheduler. In addition, the scheduler 121 may be implemented as a circuit or circuitry.

Figure 12:
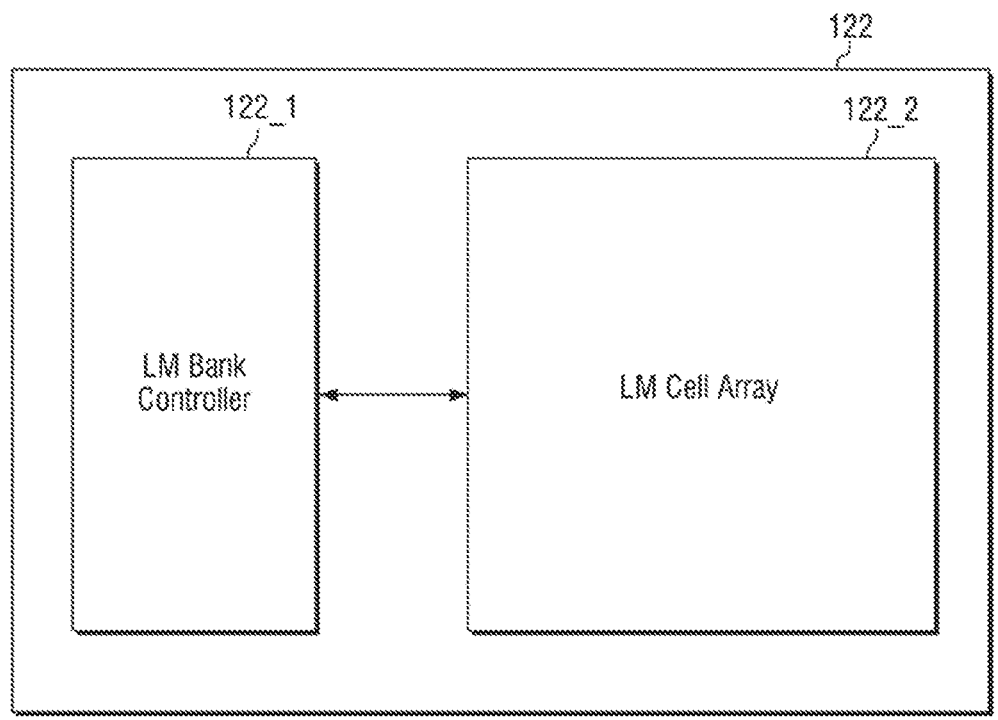
FIG. 12 is a block diagram for illustrating the local memory bank of FIG. 11.

FIG. 12 is a block diagram for illustrating the local memory bank of FIG. 11 in detail.

Referring to FIG. 12, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 13:
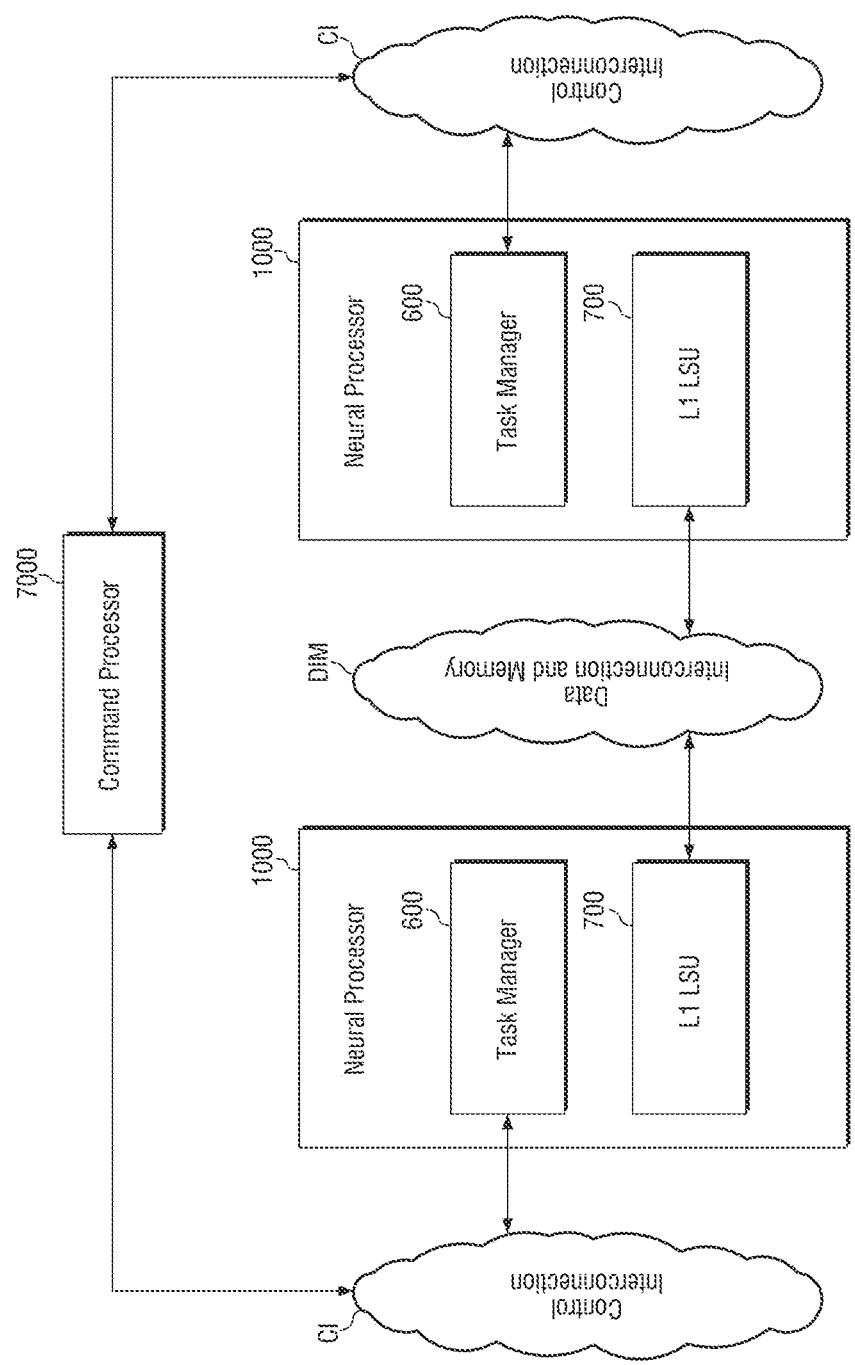
FIG. 13 is a block diagram for illustrating a flow of data and control signals of the neural processing device of FIG. 1.
Figure 14:
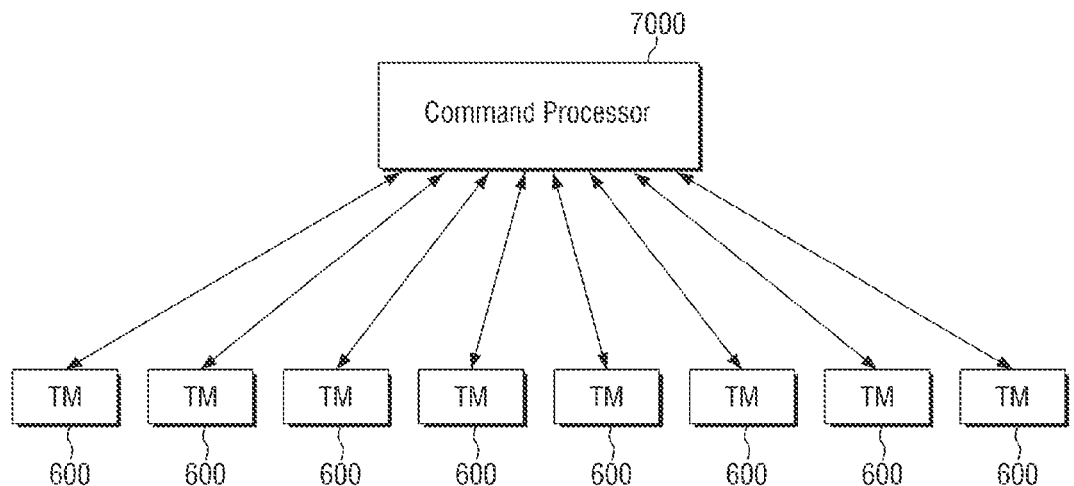
FIG. 14 is a block diagram for illustrating the relationship between the command processor and the task managers of FIG. 13.

FIG. 13 is a block diagram for illustrating a flow of data and control signals of the neural processing device of FIG. 1, and FIG. 14 is a block diagram for illustrating the relationship between the command processor and the task managers of FIG. 13.

Referring to FIGS. 13 and 14, each neural processor 1000 may include a task manager 600 and an L1 LSU 700 therein, respectively. The task managers 600 may exchange control signals and responses to the control signals with the command processor 7000 via a control interconnection CI.

In contrast, the L1 LSU 700 may exchange data via a data interconnection and memory DIM. The data interconnection and memory DIM may include an interconnection for transmitting data and a memory in which data is shared. Specifically, the data interconnection and memory DIM may include a local interconnection 200 and a data channel 6100. In addition, the data interconnection and memory DIM may include an L1 shared memory 400, a shared memory 2000, and a volatile memory 32. However, the embodiment is not limited thereto.

The task managers 600 may be controlled by the command processor 7000. In some embodiments, the command processor 7000 may transfer tasks to the task managers 600 via control signals, and the task managers 600 may transfer task completion reports to the command processor 7000. At least one task manager 600 may be included in the neural processor 1000. Moreover, if there exist a plurality of the neural processors 1000, the number of task managers 600 may get larger. Such a plurality of task managers 600 may all be controlled by the command processor 7000.

Figure 15:
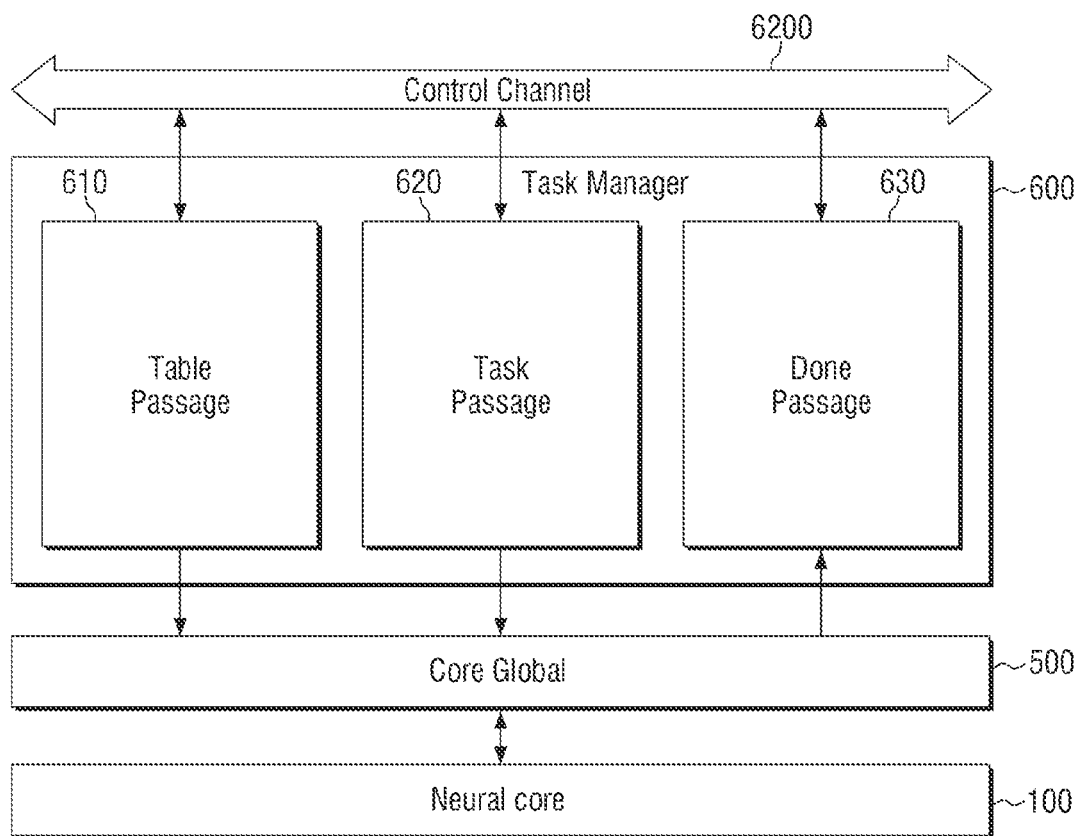
FIG. 15 is a block diagram for illustrating the structure of the task manager of FIG. 8 in detail.

FIG. 15 is a block diagram for illustrating the structure of the task manager of FIG. 8 in detail.

Referring to FIGS. 8, 9, and 15, the task manager 600 may include a table passage 610, a task passage 620, and a done passage 630. In some embodiments, the table passage 610, the task passage 620, and the done passage 630 may be referred to respectively as a table passage circuit, a task passage circuit, and a done passage circuit, respectively, but for the sake of convenience, the terms are respectively unified as a table passage, a task passage, and a done passage. Further, the table passage 610, the task passage 620, and the done passage 630 may be implemented as circuits or circuitry.

The table passage 610 may receive a table update request TURQ for updating a matching table of physical addresses and logical addresses from the control channel 6200 and transfer the table update request TURQ to the core global 500. In some embodiments, the table update request TURQ may be transferred from the command processor 7000 via the control channel 6200.

The task passage 620 may receive a task from the control channel 6200, generate task information according thereto, and transmit the task information to the core global 500. In some embodiments, the task may be transferred from the command processor 7000 via the control channel 6200. The core global 500 may transfer the task information to the neural core 100. The neural core 100 may perform the task according to the transferred task information and transfer a completion signal back to the core global 500.

The core global 500 may transfer the completion signal to the done passage 630. The done passage 630 may receive the completion signal and generate a completion report DNrp for the task. The done passage 630 may transmit the completion report DNrp to the command processor 7000 via the control channel 6200.

In addition, the table update request TURQ in the table passage 610 may be transferred to the neural core 100 via the core global 500. In some embodiments, the table of the translation lookaside buffer 114 inside the LSU 110 of the neural core 100 may be updated.

Figure 16:
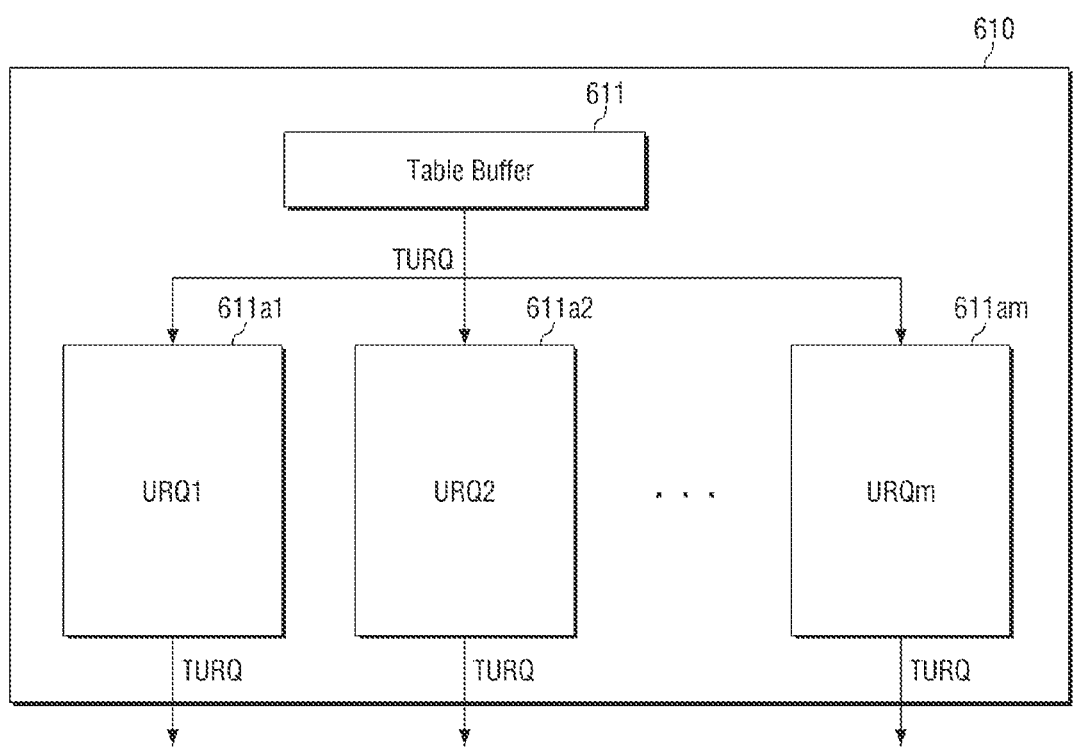
FIG. 16 is a block diagram for illustrating the table passage of FIG. 15 in detail.

FIG. 16 is a block diagram for illustrating the table passage of FIG. 15 in detail.

Referring to FIG. 16, the table passage 610 may include a table buffer 611 and first to m-th update request queues 611a1 to 611am.

In the table buffer 611, table update requests TURQ in which physical addresses and logical addresses are matched may be transmitted from the command processor 7000 and stored. When the core global 500 fetches these table update requests TURQ, each table update request TURQ may be stored in the first to m-th update request queues 611a1 to 611am.

Different types of table update requests TURQ may be stored in the first to m-th update request queues 611a1 to 611am. For example, different types of table update requests TURQ may include at least one of neural core TLB update requests, micro-DMA TLB update requests, LP micro-DMA TLB update requests, or ST micro-DMA TLB update requests. However, the embodiment is not limited thereto. In some embodiments, each of the first to m-th update request queues 611a1 to 611am may include the same type of table update request TURQ as well.

In addition, each of the first to m-th update request queues 611a1 to 611am may be a general queue, i.e., a queue that accommodates various types of requests. Accordingly, each of the first to m-th update request queues 611a1 to 611am may accept requests regardless of the type.

Each of the first to m-th update request queues 611a1 to 611am may transmit the table update requests TURQ to the core global 500, and may transfer them to the LSU 110 via the core global 500. In some embodiments, the tables in the translation lookaside buffer 114 inside the LSU 110 may be updated.

Figure 17:
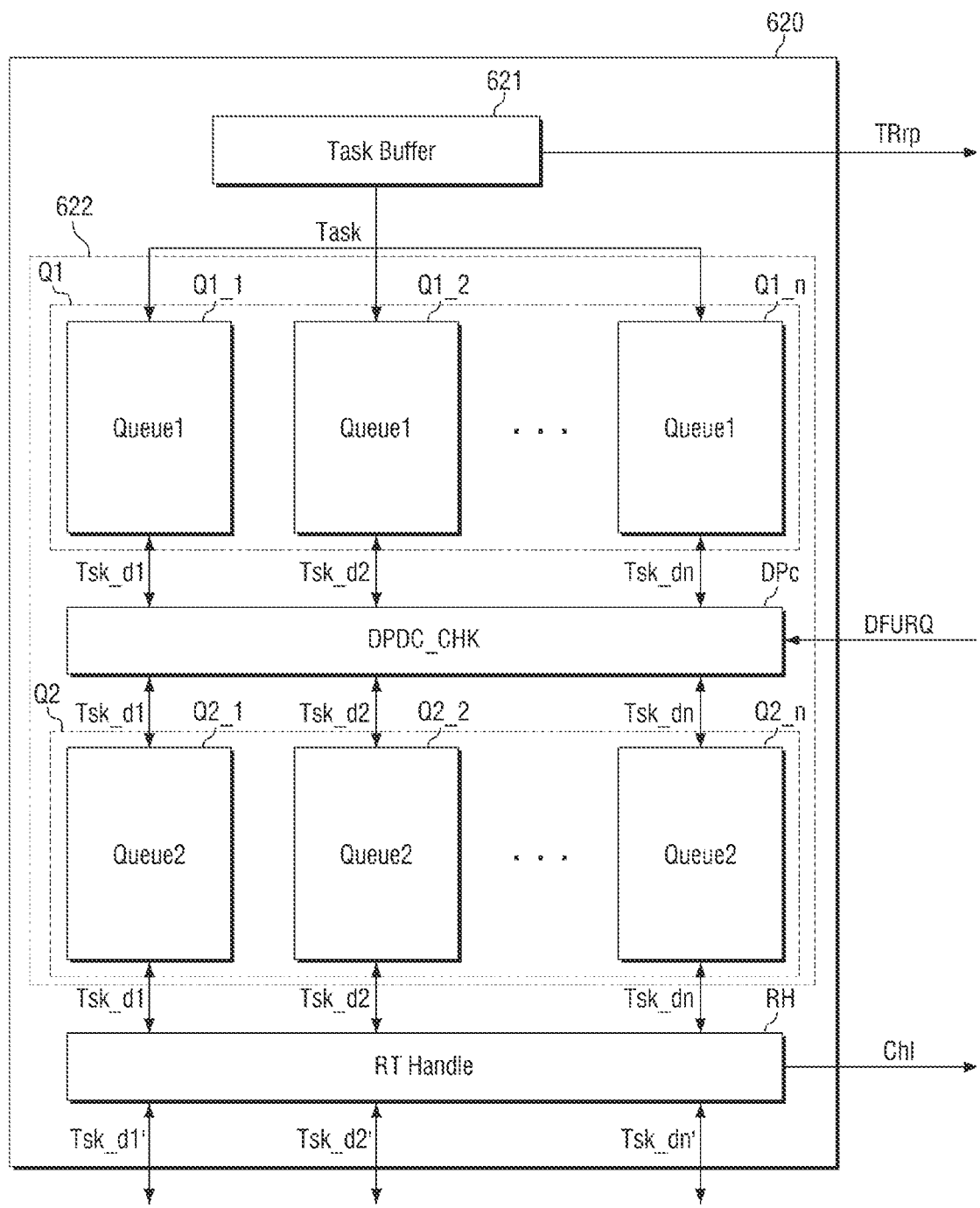
FIG. 17 is a block diagram for illustrating the task passage of FIG. 15 in detail.

FIG. 17 is a block diagram for illustrating the task passage of FIG. 15 in detail.

Referring to FIG. 17, the task passage 620 includes a task buffer 621, a task queue 622, and a runtime handle RH.

The task buffer 621 may store tasks Task according to the control signals transmitted from the command processor 7000. The task buffer 621 may store the tasks Task in the form of task descriptors in the task queue 622 by task fetching operations of the core global 500.

The task descriptor for a task may contain dependency information. The dependency information may represent a list of reference tasks which the task depends on. The reference tasks which the task depends on may be tasks which have to be completed for the task to be transferred to a plurality of neural cores 100 via the core global 500.

The task queue 622 is configured to store task descriptors in sequence, perform dependency checks on the stored task descriptors, and sequentially store task descriptors for which the dependency checks have been completed. In some embodiments, the task queue 622 may include a first queue group Q1, a dependency checker DPc. and a second queue group Q2.

In some embodiments, the task buffer 621, the first queue group Q1, the dependency checker DPc, the second queue group Q2, and the runtime handle RH may be respectively referred to as a first queue circuit, a dependency checker circuit, a second queue circuit, and a runtime handle circuit, but for the sake of convenience, the terms are respectively unified as a first queue, a dependency checker, a second queue, and a runtime handle. Further, the task buffer 621, the first queue group Q1, the dependency checker DPc, the second queue group Q2, and the runtime handle RH may each be implemented as circuits or circuitry. In some embodiments, the first queue group Q1 may be referred to as a dependency check waiting memory and the second queue group Q2 may be referred to as a process waiting memory.

The first queue group Q1 may store the task descriptors provided from the task buffer 621. The task buffer 621 may transmit the task descriptors to the first queue group Q1 and generate transfer done reports TRrp. The task buffer 621 may transmit the transfer done reports TRrp to the done passage 630. The transfer done reports TRrp may be reports on the tasks transmitted to the first queue group Q1.

The first queue group Q1 may divide and store the task descriptors according to the types of the task descriptors. FIG. 17 shows n queues of the first queue group Q1. In some embodiments, n may be a natural number. In some embodiments, the first queue group Q1 may be at least one.

In some embodiments, the first queue group Q1 may include a plurality of queues $Q1\_1 \ldots Q1\_n$. The i-th queue $Q1\_i$ of the first queue group Q1 ($i=1 \ldots n$) may store a i-th task descriptor $Tsk\_di$.

The first to n-th task descriptors $Tsk\_d1$ to $Tsk\_dn$ may be of different types or the same type. Alternatively, some of the first to n-th task descriptors Tsk_d1 to Tsk_dn may be of the same type, and some may be of different types.

The dependency checker DPc may include a dependency check memory region. The dependency check memory region may represent whether reference tasks which tasks in the first queue group Q1 depend on are completed. The dependency checker DPc may determine whether reference tasks which a currently-waiting task in the first queue group Q1 depends on are completed based on the dependency information of the currently-waiting task and the dependency check memory region. The dependency checker DPc may receive a dependency update request DFURQ. The dependency update request DFURQ may notify the change of dependency as a completed task occurs according to a defined dependency between particular tasks. In some embodiments, each task descriptor may include a dependency field as to which tasks has a dependency on. In some embodiments, it must be updated in such a way that when the task included in the dependency field is completed, it will be removed from the dependency field.

Therefore, the dependency update request DFURQ may include an update request for the dependency field of a task descriptor.

The dependency checker DPc may transfer the currently-waiting task in the first queue group Q1 to the second queue group Q2 in response to determining that the reference tasks which the currently-waiting task depends on are completed. In some embodiments, dependency checker DPc may sequentially transmit the descriptors for which the dependency check has been completed, the first to n-th task descriptors Tsk_d1 to Tsk_dn to the second queue group Q2.

In some embodiments, the second queue group Q2 may include a plurality of queues Q2_1 ... Q2_n. The i-th queue Q2_i of the second queue group Q2 (i=1 ... n) may store the i-th task descriptor Tsk_di. The number of second queues Q2 may be the same as the number of first queues Q1.

The first queue group Q1 of the task queue 622 may store the first to n-th task descriptors Tsk_d1 to Tsk_dn in a state prior to the dependency check, and the second queue group Q2 of the task queue 622 may store the first to n-th task descriptors Tsk_d1 to Tsk_dn for which the dependency check has been completed.

The runtime handle RH may extract necessary information from each of the first to n-th task descriptors Tsk_d1 to Tsk_dn stored in the second queue group Q2 and generate first to n-th task information Tsk_d1' to Tsk_dn'. The runtime handle RH may transfer the first to n-th task information Tsk_d1' to Tsk_dn' to the core global 500. In some embodiments, the first to n-th task information Tsk_d1' to Tsk_dn' may correspond to the first to n-th task descriptors Tsk_d1 to Tsk_dn, respectively. In some embodiments, each of the first to n-th task information Tsk_d1' to Tsk_dn' may also be the same as the first to n-th task descriptors Tsk_d1 to Tsk_dn. However, the embodiment is not limited thereto.

The runtime handle RH may transmit check-in data ChI to the done passage 630. The check-in data ChI may include the first to n-th task descriptors Tsk_d1 to Tsk_dn. The check-in data ChI may be data informing the done passage 630 that the first to n-th task information Tsk_d1' to Tsk_dn' corresponding to the first to n-th task descriptors Tsk_d1 to Tsk_dn have left the task passage 620 and been transferred to the core global 500 for processing. The done passage 630 may monitor whether the task descriptors are performed according to the check-in data ChI.

The first to n-th task descriptors Tsk_d1 to Tsk_dn may be configured to include wait fields. A wait field may be an item pre-specified by software. A task descriptor in which the wait field is set may not be converted into task information and transferred to the core global 500 but wait in the second queue group Q2 at a check-in time. Here, the check-in time may refer to a time at which the preceding task descriptors have all been transferred to the core global 500, and the check-in may refer to transferring the task information to the core global 500 and transferring the corresponding task descriptors to the done passage 630.

The task descriptors in which the wait field is set will have a waiting state. The wait field may be a means for controlling the execution time of tasks, and the task flow and execution time of tasks may be controlled via the runtime handle RH.

In some embodiments, the wait field in the task or the task descriptor of the task may indicate whether the task has to wait for a run signal to be checked in. For example, when the wait field is set equal to a first value, the task may indicate that the run signal is not required. When the wait field is set equal to a second value, the task may indicate that the run signal is required. In some embodiments, the first value and the second value are equal to 0 and 1, respectively. In some embodiments, the task or the task descriptor including the wait field may indicate that the task has to wait for a run signal to be checked in, and the task or the task descriptor not including the wait field may indicate that the task does not have to wait for a run signal to be checked in.

Figure 18:
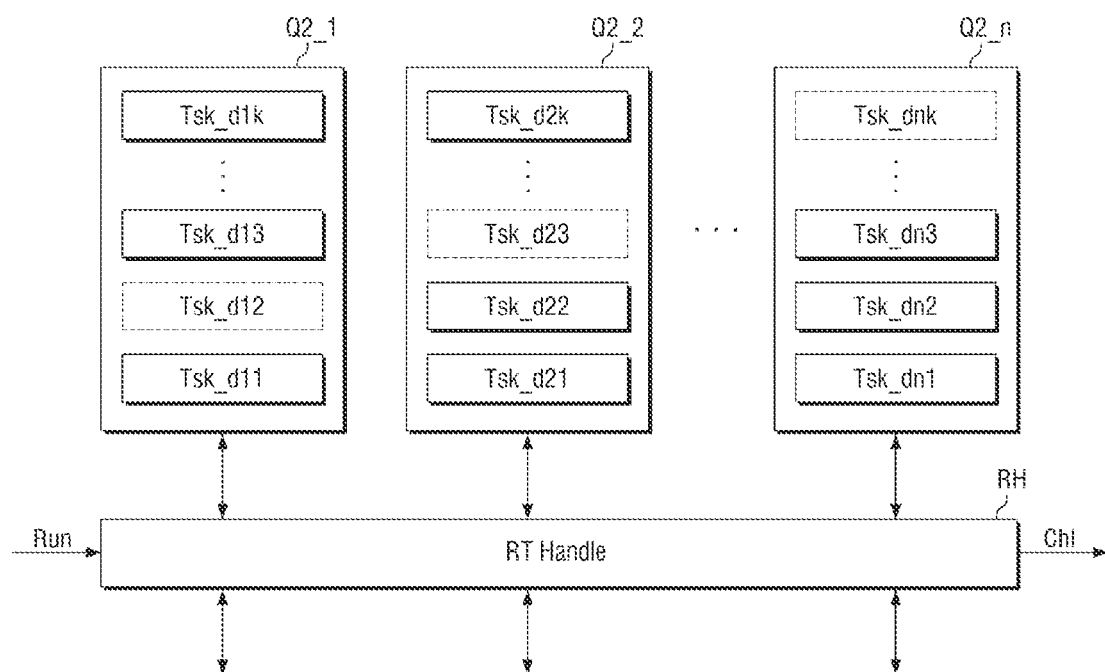
FIG. 18 is a block diagram for specifically illustrating the function of the runtime handle.

FIG. 18 is a block diagram for specifically illustrating the function of the runtime handle.

Referring to FIG. 18, a plurality of task descriptors for which the dependency check has been completed may be stored in the plurality of queues Q2_1 ... Q2_n of the second queue group Q2. The i-th queue Q2_i (i=1 ... n) of the second queue group Q2 may include a plurality of task descriptors Tsk_d11 ... Tsk_d1k. The plurality of task descriptors Tsk_d11 ... Tsk_d1k may be in a state of being stored in order in the 1st queue Q2_1 of the second queue group Q2. Here, k is a natural number. Likewise, the i-th queue Q2_i (i=1 ... n) of the second queue group Q2 may include a plurality of task descriptors Tsk_di1 ... Tsk_dik. In an example embodiment, the wait field may have been set in the 2nd task descriptor Tsk_d12 included in the 1st queue Q2_1 of the second queue group Q2, the 3rd task descriptor Tsk_d23 included in the 2nd queue Q2_2 of the second queue group Q2, and the k-th task descriptor Tsk_dnk included in the n-th queue Q2_n of the second queue group Q2, and the wait field may not have been set in the rest of the task descriptors.

In the 1st queue Q2_1 of the second queue group Q2, the 1st task descriptor Tsk_d11 included in the 1st queue Q2_1 of the second queue group Q2 is in a state where the wait field is not set and may be converted into task information and transferred to the core global 500 at the check-in time, and corresponding check-in data ChI may be transferred to the done passage 630. In contrast, the runtime handle RH may not check in the 2nd task descriptor Tsk_d12 included in the 1st queue Q2_1 of the second queue group Q2 but cause it to wait in the 1st queue Q2_1 of the second queue group Q2 even if the 2nd task descriptor Tsk_d12 in which the wait field is set may correspond to the check-in time.

As the 2nd task descriptor Tsk_d12 included in the 1st queue Q2_1 of the second queue group Q2 waits in the 1st queue Q2_1 of the second queue group Q2 in a waiting state, other task descriptors Tsk_d13 to Tsk_d1k following the 2nd task descriptor Tsk_d12 cannot be checked in and continue to wait in the 1st queue Q2_1 of the second queue group Q2.

The runtime handle RH may control all the run times of the plurality of queues Q2_1 ... Q2_n of the second queue group Q2. The 1st and 2nd task descriptors Tsk_d21 and Tsk_d22 preceding the 3rd task descriptor Tsk_d23 included in the 2nd queue Q2_2 of the second queue group Q2 may each be converted into task information and transferred to the core global 500 at the check-in time, and corresponding check-in data ChI may be transferred to the done passage 630. In contrast, the 3rd task descriptor Tsk_d23 included in the 2nd queue Q2_2 of the second queue group Q2 cannot be checked in by the runtime handle RH and waits in the 2nd queue Q2_2 of the second queue group Q2.

In addition, task descriptors preceding the k-th task descriptor Tsk_dnk included in the n-th queue Q2_n of the second queue group Q2 may pass through the runtime handle RH, be converted into task information, and transferred to the core global 500, and corresponding check-in data ChI may be transferred to the done passage 630, but the k-th task descriptor Tsk_dnk included in the n-th queue Q2_n of the second queue group Q2 including the wait field will wait in the n-th queue Q2_n of the second queue group Q2.

In some embodiments, the runtime handle RH may check whether the task descriptors stored in the plurality of queues Q2_1 . . . Q2_n of the second queue group Q2 include the wait field, and determine the state of the task descriptors as a run state or a waiting state.

The runtime handle RH may receive a run signal Run from the command processor 7000. The run signal Run may be provided from the command processor 7000 via the control interconnection CI. The command processor 7000 may transfer the run signal Run in response to transmitting a task including a wait field, but embodiments of the disclosure are not limited thereto. The command processor 7000 may transmit the run signal Run to the runtime handle RH at regular intervals. The runtime handle RH may change the task descriptors in the waiting state to the run state in response to the run signal Run. The runtime handle RH may be configured to receive the run signal Run and store the run signal Run for a period of time. The runtime handle RH may include at least one of at least one register Rs or counter Rc for receiving and storing the run signal Run, but embodiments of the disclosure are not limited thereto.

In the following, a process in which the runtime handle RH performs wait-run control according to the run signal Run will be described in greater detail with reference to FIGS. 19 to 21.

Figure 19:
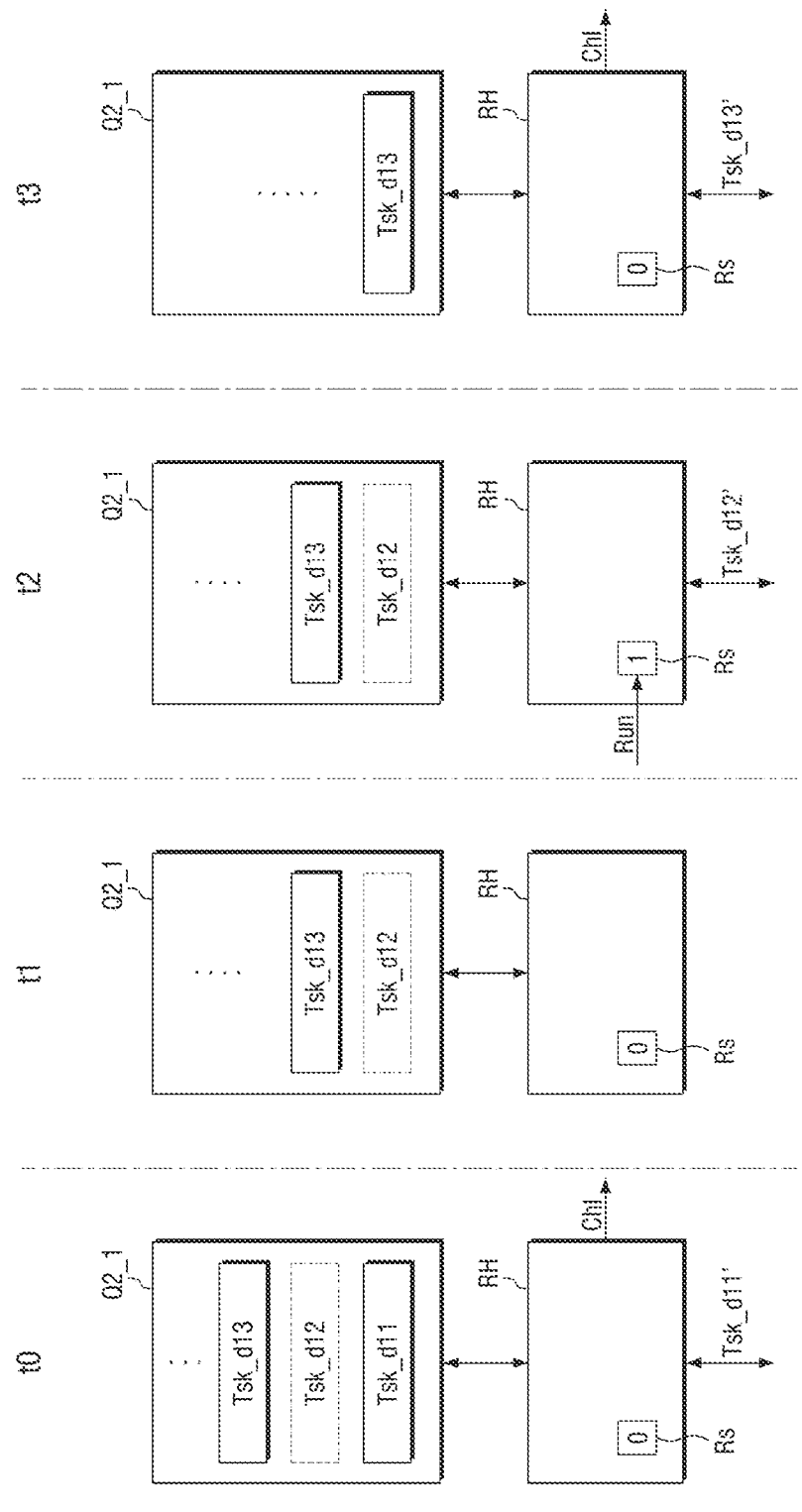
FIG. 19 is an example diagram for illustrating a process of processing task descriptors included in a 1st queue of the second queue group in response to a run signal.

FIG. 19 is an example diagram for illustrating a process of processing task descriptors included the 1st queue Q2_1 of the second queue group Q2 in response to a run signal.

Referring to FIG. 19, a process in which the task descriptors Tsk_d11 to Tsk_d13 included in the 1st queue Q2_1 of the second queue group Q2 are processed can be checked according to the change in time. Here, the times t0, t1, t2, and t3 are example times. The 2nd task descriptor Tsk_d12 in the 1st queue Q2_1 of the second queue group Q2 includes a wait field, but the rest of the task descriptors do not include a wait field.

At time t0, the 1st task descriptor Tsk_d11 included in the 1st queue Q2_1 of the second queue group Q2 may correspond to the check-in time. In some embodiments, the 1st task descriptor Tsk_d11 may correspond to the most preceding task descriptor in the 1st queue Q2_1 of the second queue group Q2. The runtime handle RH may determine that the 1st task descriptor Tsk_d11, which does not include a wait field, is in a run state. The runtime handle RH may convert the 1st task descriptor Tsk_d11 into 1st task information Tsk_d11' and transfer it to the core global 500, and corresponding check-in data ChI may be transferred to the done passage 630.

At time t1, the 2nd task descriptor Tsk_d12 included in the 1st queue Q2_1 of the second queue group Q2 may correspond to the check-in time. In some embodiments, the 2nd task descriptor Tsk_d12 may correspond to the most preceding task descriptor in the 1st queue Q2_1 of the second queue group Q2. However, the runtime handle RH may determine that the 2nd task descriptor Tsk_d12 including the wait field is in a waiting state, and may control the 2nd task descriptor Tsk_d12 to wait in the 1st queue Q2_1 of the second queue group Q2. In addition, the runtime handle RH can check at the register Rs whether the run signal Run is received. At time t1, the run signal Run has not yet been received. Therefore, the runtime handle RH continues to maintain the waiting state of the 2nd task descriptor Tsk_d12. As the 2nd task descriptor Tsk_d12 waits, the 3rd task descriptor Tsk_d13 included in the 1st queue Q2_1 of the second queue group Q2 that follows also waits in the 1st queue Q2_1 of the second queue group Q2.

At time t2, the run signal Run is received, and the state of the register Rs may be changed upon reception of the run signal Run. In an embodiment, the state of the register Rs that has received the run signal Run is defined as an active state, and the state of the register Rs that has not received the run signal Run is defined as a basic state. For example, the run signal Run may be a 1-bit signal, and the register Rs may be changed from the basic state (0) to the active state (1) in response to the run signal Run. The runtime handle RH may release the waiting state of the 2nd task descriptor Tsk_d12 in response to the run signal Run, and convert it to the run state. The runtime handle RH may convert the 2nd task descriptor Tsk_d12 into 2nd task information Tsk_d12' and transfer it to the core global 500, and corresponding check-in data ChI may be transferred to the done passage 630.

At time t3, as the run signal Run is utilized to release the waiting state of the 2nd task descriptor Tsk_d12, it can be seen that the state of the register Rs has been restored from the active state to the basic state. The 3rd task descriptor Tsk_d13 included in the 1st queue Q2_1 of the second queue group Q2 may correspond to the check-in time. The runtime handle RH may convert the 3rd task descriptor Tsk_d13 that does not include the wait field into 3rd task information Tsk_d13' and transfer it to the core global 500, and corresponding check-in data ChI may be transferred to the done passage 630.

Figure 20:
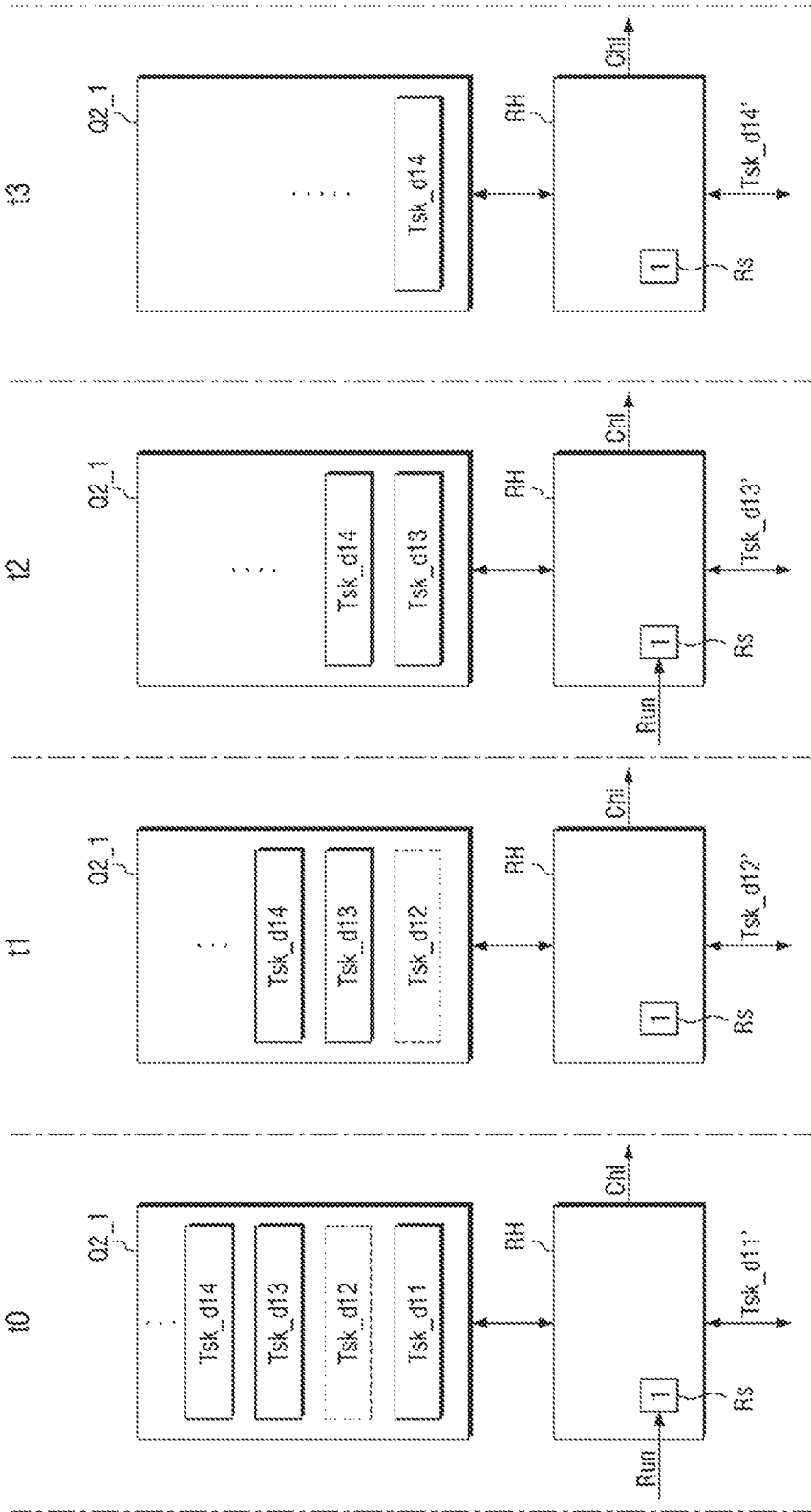
FIG. 20 is an example diagram for illustrating a process of processing task descriptors included in the 1st queue of the second queue group in response to a run signal received in advance.

FIG. 20 is an example diagram for illustrating a process of processing task descriptors included in the 1st queue of the second queue group in response to a run signal received in advance. The 2nd task descriptor Tsk_d12 included in the 1st queue Q2_1 of the second queue group Q2 includes a wait field, but the rest of the task descriptors do not include a wait field.

Referring to FIG. 20, a process in which the task descriptors Tsk_d11 to Tsk_d14 included in the 1st queue Q2_1 of the second queue group Q2 are processed can be checked according to the change in time.

At time t0, the 1st task descriptor Tsk_d11 included in the 1st queue Q2_1 of the second queue group Q2 may correspond to the check-in time. In some embodiments, the 1st task descriptor Tsk_d11 may correspond to the most preceding task descriptor in the 1st queue Q2_1 of the second queue group Q2. The runtime handle RH may determine that the 1st task descriptor Tsk_d11, which does not include a wait field, is in a run state, convert the 1st task descriptor Tsk_d11 into 1st task information Tsk_d11', and transfer it to the core global 500, and corresponding check-in data ChI may be transferred to the done passage 630.

In addition, at time t0, the register Rs may be in the active state in response to the reception of the run signal Run. For the 1st task descriptor Tsk_d11 that does not include the wait field, the check-in process proceeds regardless of the state of the register Rs.

At time t1, the 2nd task descriptor Tsk_d12 included in the 1st queue Q2_1 of the second queue group Q2 may correspond to the check-in time. In some embodiments, the 2nd task descriptor Tsk_d12 may correspond to the most preceding task descriptor in the 1st queue Q2_1 of the second queue group Q2. The runtime handle RH may determine that the 2nd task descriptor Tsk_d12 including the wait field is in the waiting state, and may cause the 2nd task descriptor Tsk_d12 to wait in the 1st queue Q2_1 of the second queue group Q2. However, the runtime handle RH may release the waiting state of the 2nd task descriptor Tsk_d12 via the run signal Run received in advance. The runtime handle RH may convert the 2nd task descriptor Tsk_d12 into 2nd task information Tsk_d12' and transfer it to the core global 500, and corresponding check-in data ChI may be transferred to the done passage 630. Since the runtime handle RH checked in the 2nd task descriptor Tsk_d12, the runtime handle RH may clear the register Rs.

At time t2, the 3rd task descriptor Tsk_d13 included in the 1st queue Q2_1 of the second queue group Q2 may correspond to the check-in time. The runtime handle RH may convert the 3rd task descriptor Tsk_d13 that does not include the wait field into 3rd task information Tsk_d13' and transfer it to the core global 500, and corresponding check-in data ChI may be transferred to the done passage 630. Further, at time t2, the run signal Run may be received in advance, so that the register Rs may be converted into the active state. The active state of the register Rs may be maintained continuously for some time, and a check-in process may be performed for the task descriptors that do not include the wait field regardless of the state of the register Rs.

At time t3, it can be seen that the register Rs continues to maintain the active state. The 4th task descriptor Tsk_d14 included in the 1st queue Q2_1 of the second queue group Q2 may correspond to the check-in time. The runtime handle RH may convert the 4-th task descriptor Tsk_d14 that does not include the wait field into 4th task information Tsk_d14' and transfer it to the core global 500, and corresponding check-in data ChI may be transferred to the done passage 630.

In some embodiments, a plurality of registers Rs may be configured to receive a plurality of run signals Run. In an embodiment, the runtime handle RH is that the run signals Run received respectively by the plurality of registers Rs may be processed individually in response to the task descriptors in the waiting state.

Figure 21:
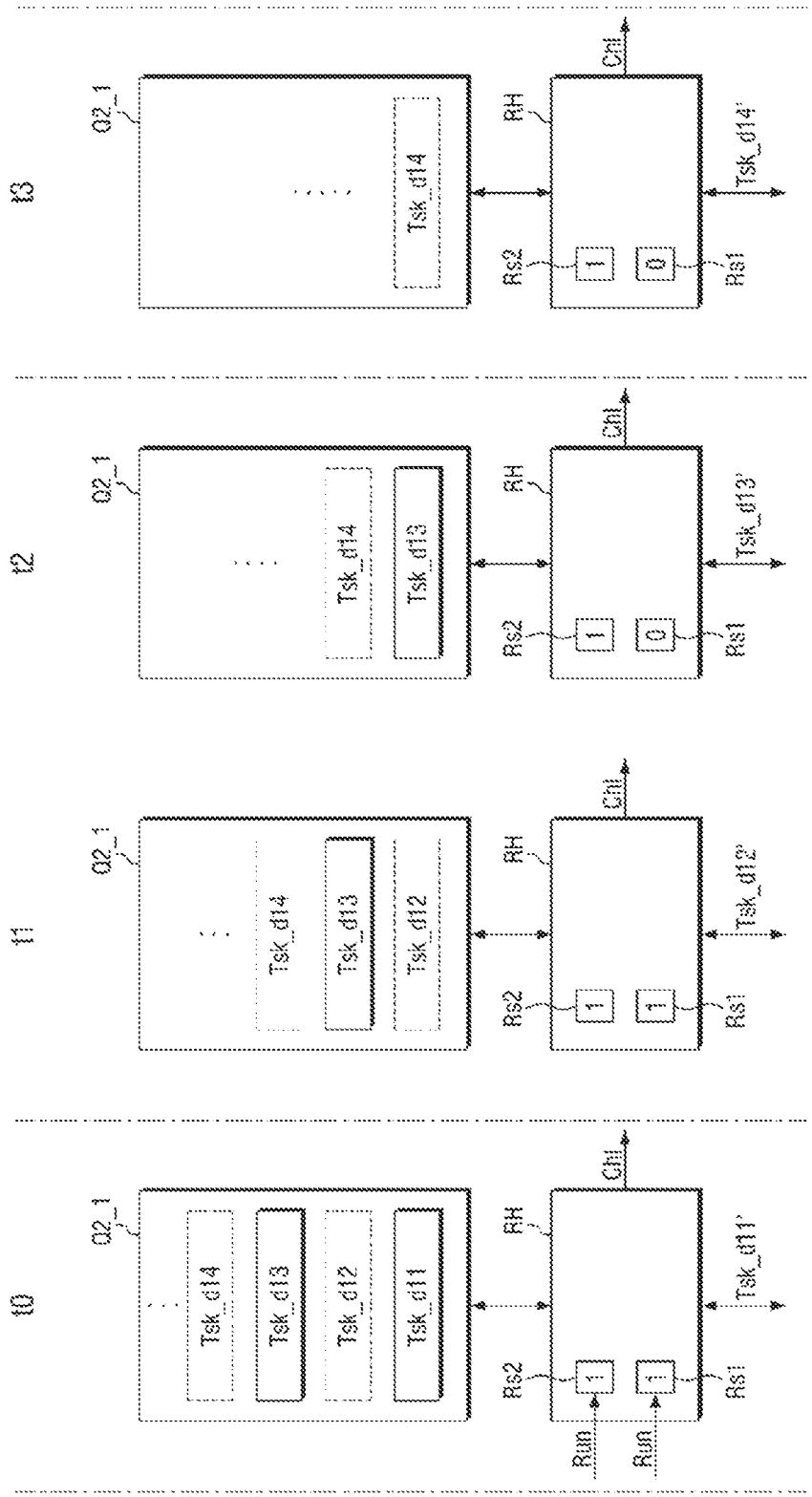
FIG. 21 is an example diagram for illustrating a process of processing task descriptors included in the 1st queue of the second queue group in response to a plurality of run signals.

FIG. 21 is an example diagram for illustrating a process of processing task descriptors included in the 1st queue Q2_1 of the second queue group Q2 in response to a plurality of run signals. The 2nd task descriptor Tsk_d12 included in the 1st queue Q2_1 of the second queue group Q2 and the 4th task descriptor Tsk_d14 included in the 1st queue Q2_1 of the second queue group Q2 include a wait field, but the rest of the task descriptors do not include a wait field.

As shown in FIG. 21, the runtime handle RH may comprise a plurality of registers. In some embodiments, the plurality of registers may be associated with a respective one of a plurality of users. In some embodiments, the plurality of task descriptors may belong to a respective one of the plurality of users.

For example, as shown in FIG. 21, the plurality of task descriptors belongs to a respective one of a user 1 and a user 2 and the plurality of registers may include a first register Rs1 for the user 1 and a second register Rs2 for the user 2. The 1st task descriptor Tsk_d11 and the 2nd task descriptor Tsk_d12 belong to the user 1 and the $3^{rd}$ task descriptor Tsk_d13 and the 4th task descriptor Tsk_d14 belong to the user 2.

Referring to FIG. 21, at time t0, the 1st task descriptor Tsk_d11 included in the 1st queue Q2_1 of the second queue group Q2 may correspond to the check-in time. In some embodiments, the 1st task descriptor Tsk_d11 may correspond to the most preceding task descriptor in the 1st queue Q2_1 of the second queue group Q2. The runtime handle RH may determine that the 1st task descriptor Tsk_d11, which does not include a wait field, is in a run state, convert the 1st task descriptor Tsk_d11 into 1st task information Tsk_d11', and transfer it to the core global 500, and corresponding check-in data ChI may be transferred to the done passage 630.

Further, at time t, a plurality of run signals Run may be received. For example, two run signals Run for the user 1 and the user 2 may be received by a first register Rs1 and a second register Rs2, respectively. It can be confirmed by the received run signals Run that the first register Rs1 and the second register Rs2 are in active states. For the 1st task descriptor Tsk_d11 that does not include the wait field, the check-in process proceeds regardless of the states of the first and second registers Rs1 and Rs2.

At time t1, the 2nd task descriptor Tsk_d12 included in the 1st queue Q2_1 of the second queue group Q2 may correspond to the check-in time. In some embodiments, the 2nd task descriptor Tsk_d12 may correspond to the most preceding task descriptor in the 1st queue Q2_1 of the second queue group Q2. The runtime handle RH may determine that the 2nd task descriptor Tsk_d12 including the wait field is in the waiting state, and may cause the 2nd task descriptor Tsk_d12 to wait in the 1st queue Q2_1 of the second queue group Q2. However, the runtime handle RH may release the waiting state of the 2nd task descriptor Tsk_d12 via the run signal Run of the first register Rs1 received in advance. The runtime handle RH may convert the 2nd task descriptor Tsk_d12 into 2nd task information Tsk_d12' and transfer it to the core global 500, and corresponding check-in data ChI may be transferred to the done passage 630. Since the runtime handle RH checked in the 2nd task descriptor Tsk_d12 for the user 1, the runtime handle RH may clear the register Rs1.

At time t2, the 3rd task descriptor Tsk_d13 included in the 1st queue Q2_1 of the second queue group Q2 may correspond to the check-in time. The runtime handle RH may convert the 3rd task descriptor Tsk_d13 that does not include the wait field into 3rd task information Tsk_d13' and transfer it to the core global 500, and corresponding check-in data ChI may be transferred to the done passage 630.

At time t3, the 4th task descriptor Tsk_d14 included in the 1st queue Q2_1 of the second queue group Q2 may correspond to the check-in time. In some embodiments, the 4th task descriptor Tsk_d14 may correspond to the most preceding task descriptor in the 1st queue Q2_1 of the second queue group Q2. The runtime handle RH may determine that the 4th task descriptor Tsk_d14 including the wait field is in the waiting state, and may cause the 4th task descriptor Tsk_d14 to wait in the 1st queue Q2_1 of the second queue group Q2. However, the runtime handle RH may release the waiting state of the 4th task descriptor Tsk_d14 via the run signal Run of the second register Rs2 received in advance.

The runtime handle RH may convert the 4th task descriptor Tsk_d14 into 4th task information Tsk_d14' and transfer it to the core global 500, and corresponding check-in data ChI may be transferred to the done passage 630. Since the runtime handle RH checked in the 4th task descriptor Tsk_d14 for the user 2, the runtime handle RH may clear the register Rs2.

In some embodiments, the runtime handle RH may include a counter Rc that can receive and process a plurality of run signals Run. The runtime handle RH may release the waiting state of the task descriptors by individually utilizing the plurality of run signals Run received by the counter Rc.

Figure 22:
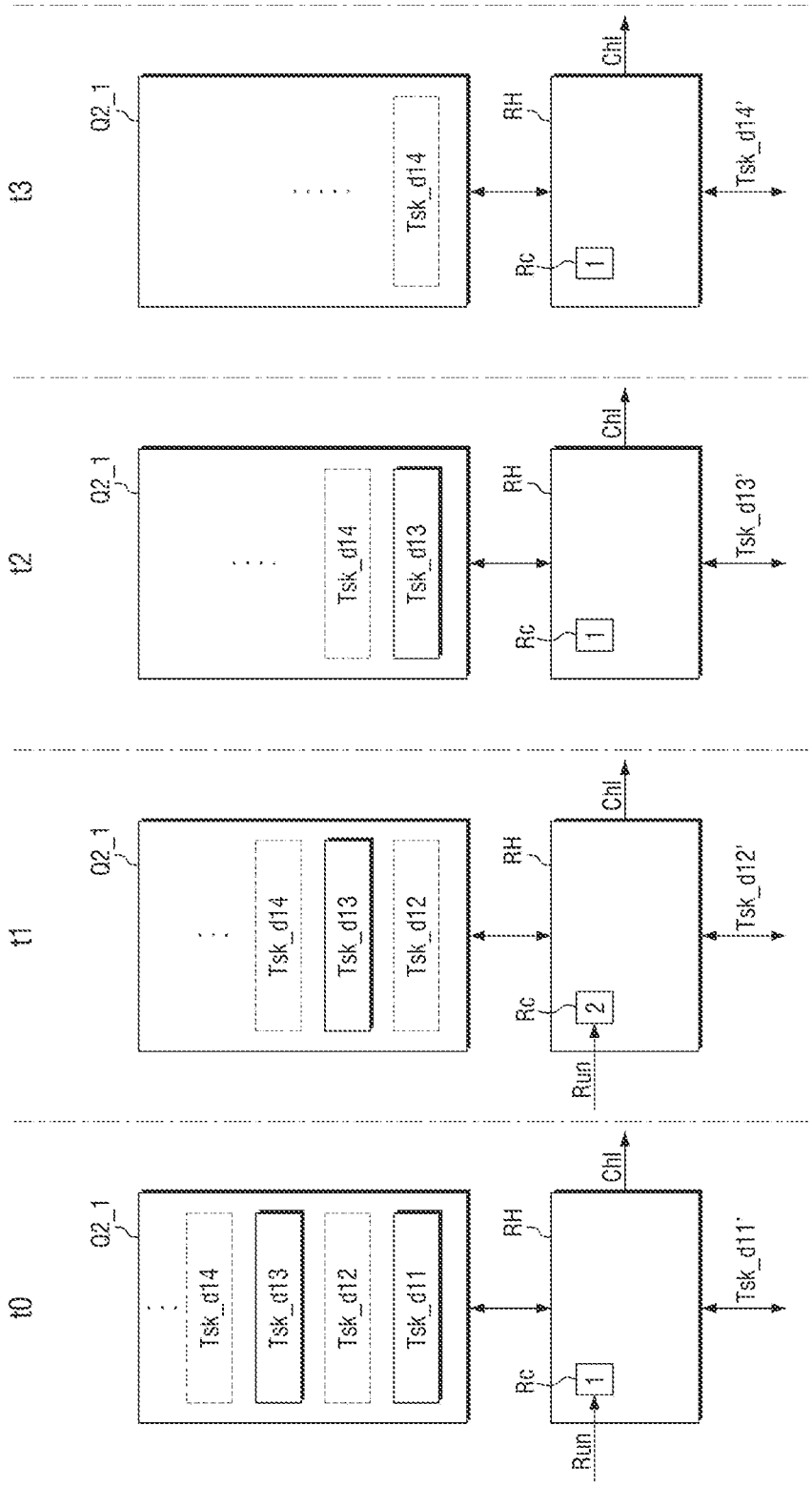
FIG. 22 is an example diagram for illustrating a process of processing task descriptors included in the 1st queue of the second queue group through a plurality of run signals received by a counter.

FIG. 22 is an example diagram for illustrating a process of processing task descriptors included in the 1st queue Q2_1 of the second queue group Q2 through a plurality of run signals received by a counter. The 2nd task descriptor Tsk_d12 included in the 1st queue Q2_1 of the second queue group Q2 and the 4th task descriptor Tsk_d14 included in the 1st queue Q2_1 of the second queue group Q2 include a wait field, but the rest of the task descriptors do not include a wait field.

Referring to FIG. 22, at time t0, the 1st task descriptor Tsk_d11 included in the 1st queue Q2_1 of the second queue group Q2 may correspond to the check-in time. In some embodiments, the 1st task descriptor Tsk_d11 may correspond to the most preceding task descriptor in the 1st queue Q2_1 of the second queue group Q2. The runtime handle RH may determine that the 1st task descriptor Tsk_d11, which does not include a wait field, is in a run state, convert the 1st task descriptor Tsk_d11 into 1st task information Tsk_d11', and transfer it to the core global 500, and corresponding check-in data ChI may be transferred to the done passage 630.

Further, at time to, the run signal Run may be received by the counter Rc. It can be seen by the received run signal Run that one run signal Run has been received by the counter Rc. For the 1st task descriptor Tsk_d11 that does not include the wait field, the check-in process proceeds regardless of the state of the counter Rc.

At time t1, one run signal Run may be received by the counter Rc, and it can be seen that the state of the counter Rc has changed from 1 to 2.

At time t1, the 2nd task descriptor Tsk_d12 included in the 1st queue Q2_1 of the second queue group Q2 may correspond to the check-in time. In some embodiments, the 2nd task descriptor Tsk_d12 may correspond to the most preceding task descriptor in the 1st queue Q2_1 of the second queue group Q2. The runtime handle RH may determine that the 2nd task descriptor Tsk_d12 including the wait field is in the waiting state, and may cause the 2nd task descriptor Tsk_d12 to wait in the 1st queue Q2_1 of the second queue group Q2. However, the runtime handle RH may release the waiting state of the 2nd task descriptor Tsk_d12 via the run signal Run of the counter Rc received in advance. The runtime handle RH may convert the 2nd task descriptor Tsk_d12 into 2nd task information Tsk_d12' and transfer it to the core global 500, and corresponding check-in data ChI may be transferred to the done passage 630.

At time t2, because the 2nd task information Tsk_d12' which has to wait the run signal run is transferred to the core global 500 and corresponding check-in data ChI may be transferred to the done passage 630, the counter Rc may decrease by 1 and the value of the counter Rc has changed from 2 to 1.

At time t2, the 3rd task descriptor Tsk_d13 included in the 1st queue Q2_1 of the second queue group Q2 may correspond to the check-in time. The runtime handle RH may convert the 3rd task descriptor Tsk_d13 that does not include the wait field into 3rd task information Tsk_d13' and transfer it to the core global 500, and corresponding check-in data ChI may be transferred to the done passage 630.

At time t3, the 4th task descriptor Tsk_d14 included in the 1st queue Q2_1 of the second queue group Q2 may correspond to the check-in time. In some embodiments, the 4th task descriptor Tsk_d14 may correspond to the most preceding task descriptor in the 1st queue Q2_1 of the second queue group Q2. The runtime handle RH may determine that the 4th task descriptor Tsk_d14 including the wait field is in the waiting state, and may cause the 4th task descriptor Tsk_d14 to wait in the 1st queue Q2_1 of the second queue group Q2. However, the runtime handle RH may release the waiting state of the 4th task descriptor Tsk_d14 via the run signal Run of the counter Rc received in advance. The runtime handle RH may convert the 4th task descriptor Tsk_d14 into 4th task information Tsk_d14' and transfer it to the core global 500, and corresponding check-in data ChI may be transferred to the done passage 630.

In addition, the runtime handle RH may perform not only the wait-run control of individual task descriptors, but also pause-resume control for temporarily pausing and resuming the operation of at least one second queue.

In some embodiments, the runtime handle RH may temporarily pause checking in task descriptors in at least one second queue if an abnormality or overload is expected in the operation of the neural core 100.

In some embodiments, the runtime handle RH may perform the pause-resume control based on danger signals provided from the done passage 630. Here, the danger signal may be an event according to at least one of hardware or software errors, log-related events, or tasks performed without descriptors, and such events may be provided by the event monitor EM of the done passage 630, which will be described later, but the embodiments of the disclosure are not limited thereto.

Moreover, the runtime handle RH may perform the pause-resume control in response to an overload of the task queue 622 or an overload of the report queue of the reporting manager RM, which will be described later.

According to the pause control of the runtime handle RH, it is possible to temporarily pause the task information corresponding to the task descriptor from being transferred to the core global 500 and being processed. The runtime handle RH can release the paused state and resume the processing of the waiting task descriptor when the overload is resolved.

Figure 23:
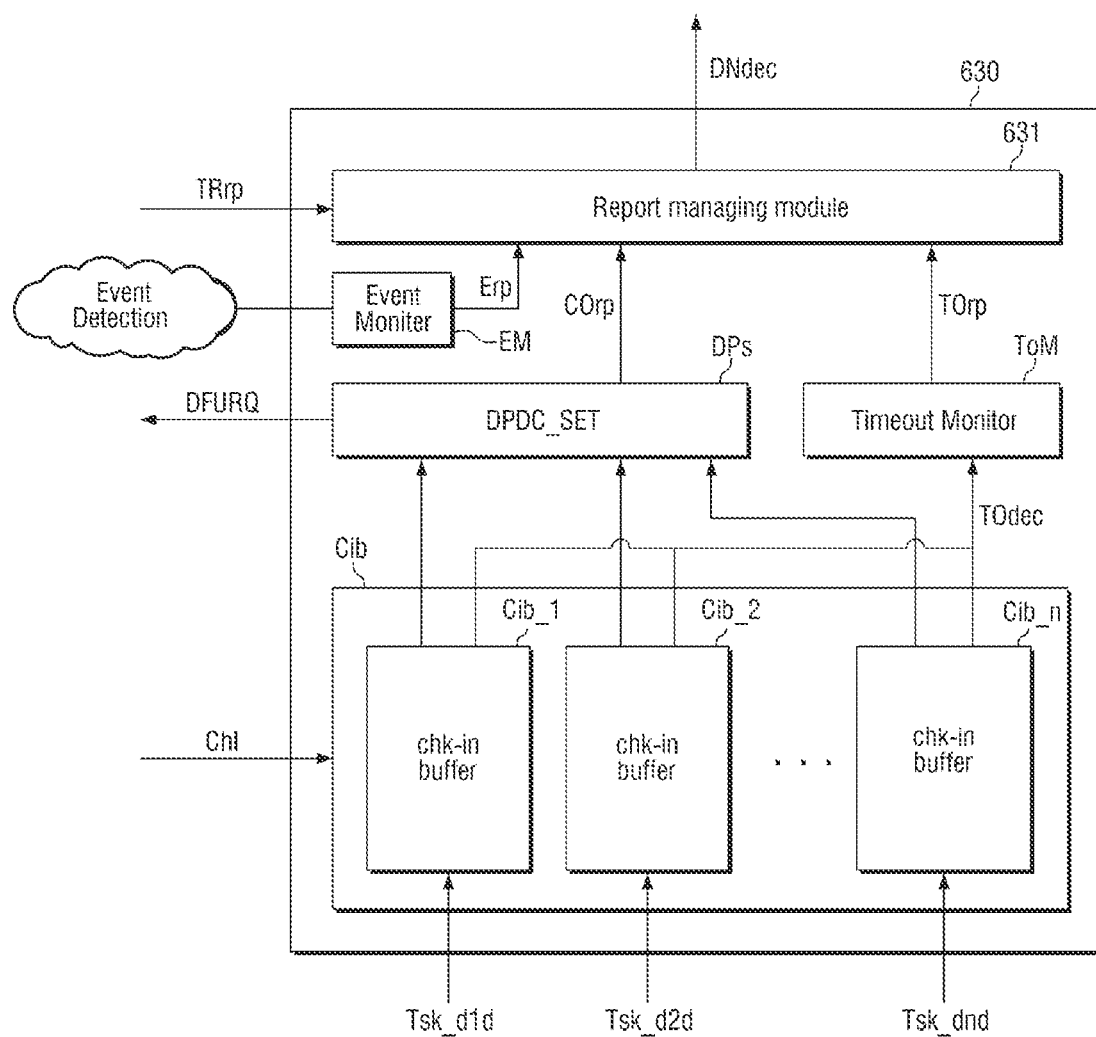
FIG. 23 is a block diagram for illustrating the done passage of FIG. 15 in detail.

FIG. 23 is a block diagram for illustrating the done passage of FIG. 15 in detail.

Referring to FIG. 23, the done passage 630 may include a check-in buffer Cib, a dependency setter DPs, a timeout monitor ToM, an event monitor EM, and a report managing module 631. The check-in buffer Cib, the dependency setter DPs, the timeout monitor ToM, the event monitor EM, and the report managing module 631 may be referred to respectively as a check-in buffer circuit, a dependency setter circuit, a timeout monitor circuit, an event monitor circuit, and a report managing circuit, but for the sake of convenience, the terms are respectively unified as a check-in buffer, a dependency setter, a timeout monitor, an event monitor, and a report managing module. In addition, the check-in buffer Cib, the dependency setter DPs, the timeout monitor ToM, the event monitor EM, and the report managing module 631 may each be implemented as a circuit or circuitry.

The check-in buffer Cib may receive the check-in data ChI. The check-in buffer Cib may include first to n-th check-in buffers Cib_1 to Cib_n. The check-in buffer Cib may store the first to n-th task descriptors Tsk_d1 to Tsk_dn stored in the check-in data ChI. The first to n-th check-in buffers Cib_1 to Cib_n may store the first to n-th task descriptors Tsk_d1 to Tsk_dn, respectively. Through this, the check-in buffer Cib may perform check-in of the first to n-th task descriptors Tsk_d1 to Tsk_dn.

In some embodiments, the i-th check-in buffer Cib_i (i=1 . . . n) may store the i-th task descriptor Tsk_di. A number of check-in buffers Cib may be the same as a number of first queues Q1 and a number of second queues Q2.

The check-in buffer Cib may receive completion signals from the core global 500. In some embodiments, the completion signals may include first to n-th completion signals Tsk_d1d to Tsk_dnd. The first to n-th completion signals Tsk_d1d to Tsk_dnd may be completion signals for each of the first to n-th task descriptors Tsk_d1 to Tsk_dn, respectively. The first to n-th completion signals Tsk_d1d to Tsk_dnd may be received by the first to n-th check-in buffers Cib_1 to Cib_n, respectively. In some embodiments, the i-th check-in buffer Cib_i (i=1 . . . n) may receive the i-th completion signal Tsk_did.

The dependency setter DPs may receive the completion signals from the check-in buffer Cib and generate dependency update requests DFURQ. In some embodiments, depending on which task corresponding to what task descriptor has been completed, the dependency setter DPs may generate a dependency update request DFURQ. The dependency setter DPs may transmit the dependency update request DFURQ to the task passage 620.

The dependency setter DPs may check out each of the first to n-th task descriptors Tsk_d1 to Tsk_dn according to the completion signals. Accordingly, the dependency setter DPs may generate checkout reports COrp about which tasks have been completed and checked out. The dependency setter DPs may transmit the checkout reports COrp to the report managing module 631.

In some embodiments, the check-in can be defined as a procedure in which a task descriptor is registered before the task descriptor is processed, and the check-out can be defined as a procedure in which the task descriptor is completely processed and de-registered.

As the dependency setter DPs transmits the dependency update requests DFURQ to the task passage 620, the dependency checker DPc of the task passage 620 may transmit task descriptors in sequence according to the dependencies of the task descriptors.

The embodiment can minimize the overhead required for communication with the command processor 7000 by allowing the task manager 600 to directly perform dependency checking and setting without the command processor 7000 being solely responsible for processing according to the dependencies. Accordingly, the performance and speed of the neural processing device 1 in accordance with the embodiment can be dramatically improved.

The timeout monitor ToM may receive timeout detection signals TOdec from the check-in buffer Cib. The timeout detection signal TOdec may be a signal regarding whether a time interval between a check-in time and a check-out time exceeds a preset threshold time. Here, the check-out time may refer to a time when execution of the corresponding task is completed. The check-in buffer Cib may monitor execution times of the tasks corresponding to the checked-in task descriptors. The check-in buffer Cib may compare the execution times of the tasks with the threshold time and determine whether to generate the timeout detection signal TOdec. The check-in buffer Cib may generate the timeout detection signal TOdec if the execution time calculated from the check-in time exceeds the threshold time. In some embodiments, if the execution of the task has not been completed by the threshold time, the timeout detection signal TOdec may be generated. The first to n-th check-in buffers Cib_1 to Cib_n will check whether the checked-in task descriptors have been executed, respectively, and generate the timeout detection signals TOdec if the execution times exceed the threshold time.

In an embodiment, the threshold time may be set individually according to the tasks. In some embodiments, the threshold time may be set differently according to the types of tasks. Tasks corresponding to memory operations may be set to spend a shorter threshold time than tasks corresponding to computations. However, embodiments of the disclosure are not limited thereto.

Further, in an embodiment, whether to generate a timeout report may be set individually according to the task. In some embodiments, the command processor 7000 may be set not to be provided with timeout reports for at least some of the tasks transferred to the task manager 600. As it is possible to set not to perform timeout monitoring for all tasks, the burden of timeout monitoring on the task manager 600 can be reduced. By way of example, it can be set that timeout reports are generated for tasks corresponding to computations, but timeout reports are not generated for tasks corresponding to memory operations. However, embodiments of the disclosure are not limited thereto.

The timeout monitor ToM may generate timeout reports TOrp according to the timeout detection signals TOdec. The timeout monitor ToM may transmit the generated timeout reports TOrp to the report managing module 631.

In an embodiment, the event monitor EM may sense events inside the neural processor 1000 and generate event reports Erp. Events may result from at least one of hardware or software errors, log-related events, tasks with erroneous descriptor, tasks with erroneous dependency information, or tasks performed without descriptors. Embodiments of the disclosure are not limited thereto. The event monitor EM may sense whether such events have occurred and generate event reports Erp according to event sensing signals. The generated event reports Erp may be provided to the report managing module 631.

The report managing module 631 may receive at least one of a transfer done report TRrp, an event report Erp, a checkout report COrp, or a timeout report TOrp, and generate a completion report DNrp.

In an embodiment, the checkout report COrp may correspond to a report that allows the command processor 7000 to confirm that the task transmitted to the neural core 100 has been normally processed and checked out.

The transfer done report TRrp may correspond to a report that allows the command processor 7000 to confirm that a task has been normally provided to the task passage 620 and a task descriptor has been generated.

The event report Erp may correspond to a report that allows the command processor 7000 to confirm that an event has occurred according to at least one of hardware or software errors, log-related events, or tasks performed without descriptors.

The timeout report TOrp may correspond to a report that allows the command processor 7000 to confirm that processing for a particular task is delayed beyond a set threshold time.

In an embodiment, the checkout report COrp, the transfer done report TRrp, the event report Erp, and the timeout report TOrp may each be generated independently. For example, even if the execution of a task related to a particular task descriptor is delayed and a timeout report TOrp is generated, a checkout report COrp may be generated independently of the generation of the timeout report TOrp when the execution of the corresponding task is completed.

Here, the completion report DNrp may be generated based on the checkout report COrp. Since the completion report DNrp includes at least the checkout report, whether a task has been normally performed can be transferred to the command processor 7000. Through the generation and transfer of such a completion report DNrp, it can be checked whether a task has been performed normally, and it is possible to prevent a delay in performing a particular task from being prolonged according to dependencies.

In addition, the completion report DNrp may be configured to further include at least one of the transfer done report TRrp, the event report Erp, or the timeout report TOrp, and it is possible to comprehensively report to the command processor 7000 whether a timeout has occurred, whether a transfer has been completed, whether an event has occurred, and the like, along with whether a task has been performed.

In an embodiment, whether to generate such a completion report DNrp may be set individually according to the tasks. In some embodiments, the command processor 7000 may be set in advance such that a particular task will not receive a completion report DNrp related thereto. Accordingly, since completion reports may not be generated for all tasks, the burden of data processing on the task manager 600 may be reduced, and as the command processor 7000 may not receive all completion reports, the management efficiency of the command processor 7000 may be increased.

However, if an important warning related to task execution or a request for a part requiring correction is required to the command processor 7000, such as a timeout report TOrp, corresponding information may be required to be transferred as a completion report DNrp. In an embodiment of the disclosure, if modification is needed for a task descriptor that is set not to generate a completion report, the timeout monitor ToM may transmit a modification request signal Mos to the check-in buffer in which the corresponding task descriptor is stored, and the corresponding task descriptor is modified to generate a completion report.

Figure 24:
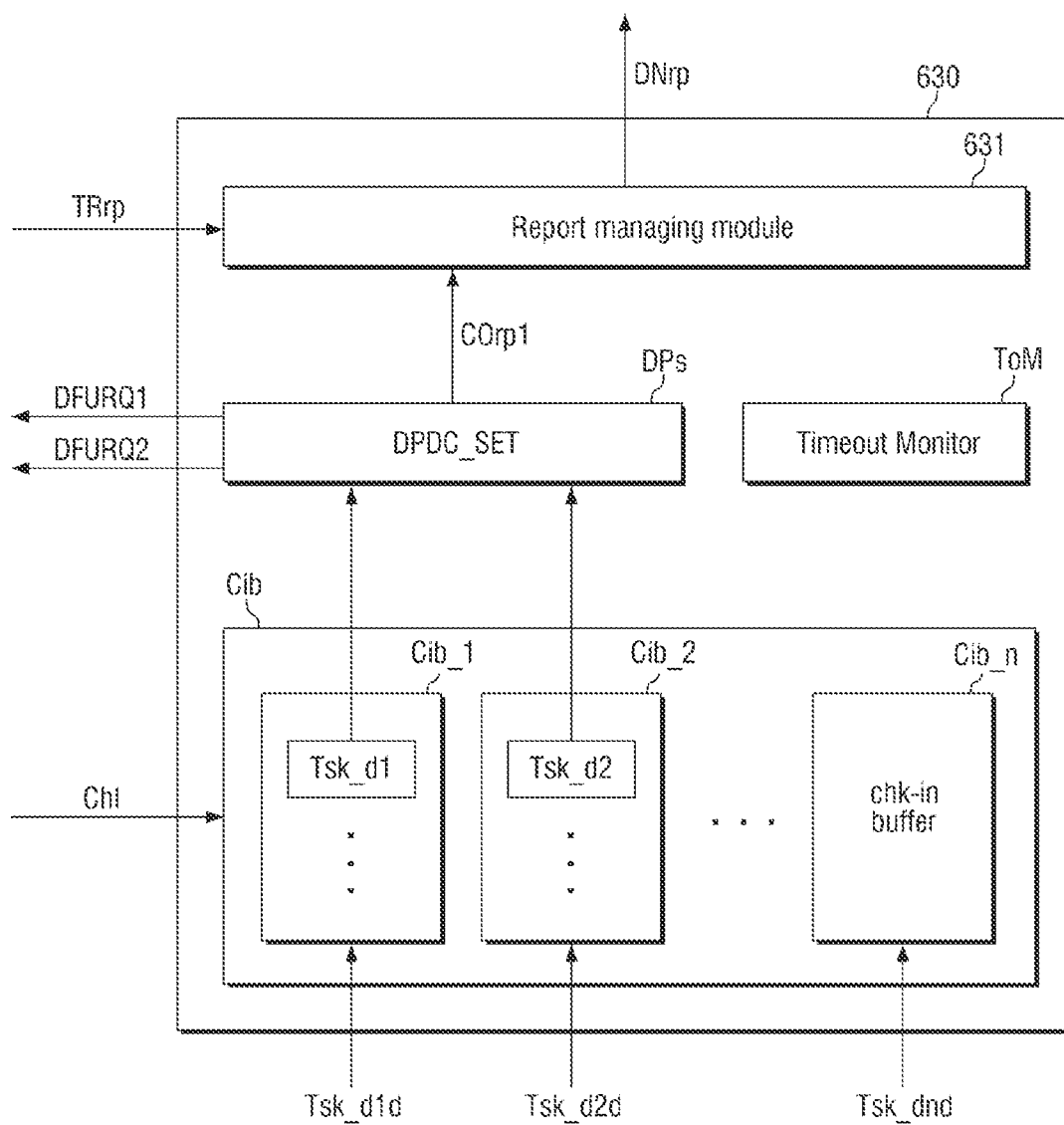
FIG. 24 is an example diagram for illustrating a first task descriptor and a second task descriptor that are set differently as to whether to generate a completion report.

FIG. 24 is an example diagram for illustrating a first task descriptor and a second task descriptor that are set differently as to whether to generate a completion report.

Referring to FIG. 24, in an embodiment, the tasks may include a first task that is set to generate a completion report and a second task that is set not to generate a completion report. The first task descriptor Tsk_d1 generated in correspondence with the first task is in a state of transferring the first task information Tsk_d1' to the core global 500 and being checked in at the first check-in buffer Cib_1. The second task descriptor Tsk_d2 generated in correspondence with the second task is in a state of transferring the second task information Tsk_d2' to the core global 500 and being checked in at the second check-in buffer Cib_2. The first task information Tsk_d1' and the second task information Tsk_d2' may be provided to the neural core 100, respectively, via the core global 500. The first check-in buffer Cib_1 is in a state of waiting for transfer of a first completion signal Tsk_d1d corresponding to the first task descriptor Tsk_d1, and the second check-in buffer Cib_2 is in a state of waiting for transfer of a second completion signal Tsk_d2d corresponding to the second task descriptor Tsk_d2.

Here, when the first completion signal Tsk_d1d is transferred to the first check-in buffer Cib_1, a checkout process is performed for the first task descriptor Tsk_d1 set to generate a completion report DNrp. In some embodiments, the dependency setter DPs may generate a first dependency update request DFURQ1 according to the completion of execution of the first task descriptor Tsk_d1 and transfer the first dependency update request DFURQ1 to the task passage 620. In addition, the dependency setter DPs generates a first checkout report COrp1 and transmits the generated first checkout report COrp1 to the report managing module 631, so that the completion report DNrp is generated.

When the second completion signal Tsk_d2d is transferred to the second check-in buffer Cib_2, a checkout process is performed for the second task descriptor Tsk_d2 set not to generate a completion report DNrp. The dependency setter DPs may generate a second dependency update request DFURQ2 according to the completion of execution of the second task descriptor Tsk_d2 and transfer the second dependency update request DFURQ2 to the task passage 620. However, the dependency setter DPs will not generate a second checkout report COrp2 and the completion report DNrp will not be generated.

Here, when the processing of the second task by the neural core 100 is delayed and a timeout report TOrp is generated, reporting on the generation of the timeout report TOrp must be performed to the command processor 7000, and generation of a completion report DNrp may be required for this purpose. In an embodiment, the timeout monitor ToM may modify the second task to generate a completion report.

Figure 25:
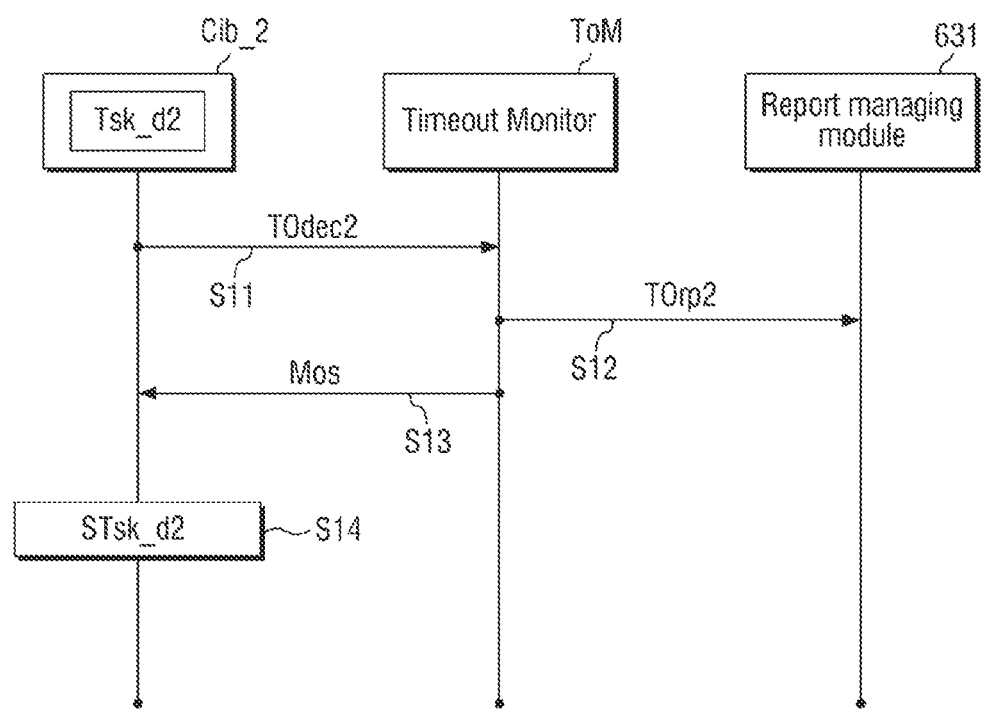
FIG. 25 is a flowchart for illustrating a process of performing modification on the second task descriptor that is set not to generate a completion report.

FIG. 25 is a flowchart for illustrating a process of performing modification on the second task descriptor that is set so that a completion report is not generated.

Referring to FIG. 25, the second check-in buffer Cib_2 may determine that the execution of the second task is delayed and generate a second timeout detection signal TOdec2, and transfer the generated second timeout detection signal TOdec2 to the timeout monitor ToM at S11. Here, the generation of the second timeout detection signal TOdec2 may mean a state in which the second completion signal Tsk_d2d has not yet been received, and modification to the second task descriptor Tsk_d2 may be possible.

The timeout monitor ToM may generate a second timeout report TOrp2 according to the second timeout detection signal TOdec2, and transfer the generated second timeout report TOrp2 to the report managing module 631 at S12.

Further, in order for the second timeout report TOrp2 to be included in the completion report DNrp and transferred to the command processor 7000, a modification request signal Mos for modifying the second task descriptor Tsk_d2 so as to generate the completion report DNrp may be transmitted to the second check-in buffer Cib_2 at S13. For the second task descriptor Tsk_d2 included in the second check-in buffer Cib_2, the completion report DNrp may be generated in response to the modification request, and a modified second task descriptor STsk_d2 is generated at S14.

Figure 26:
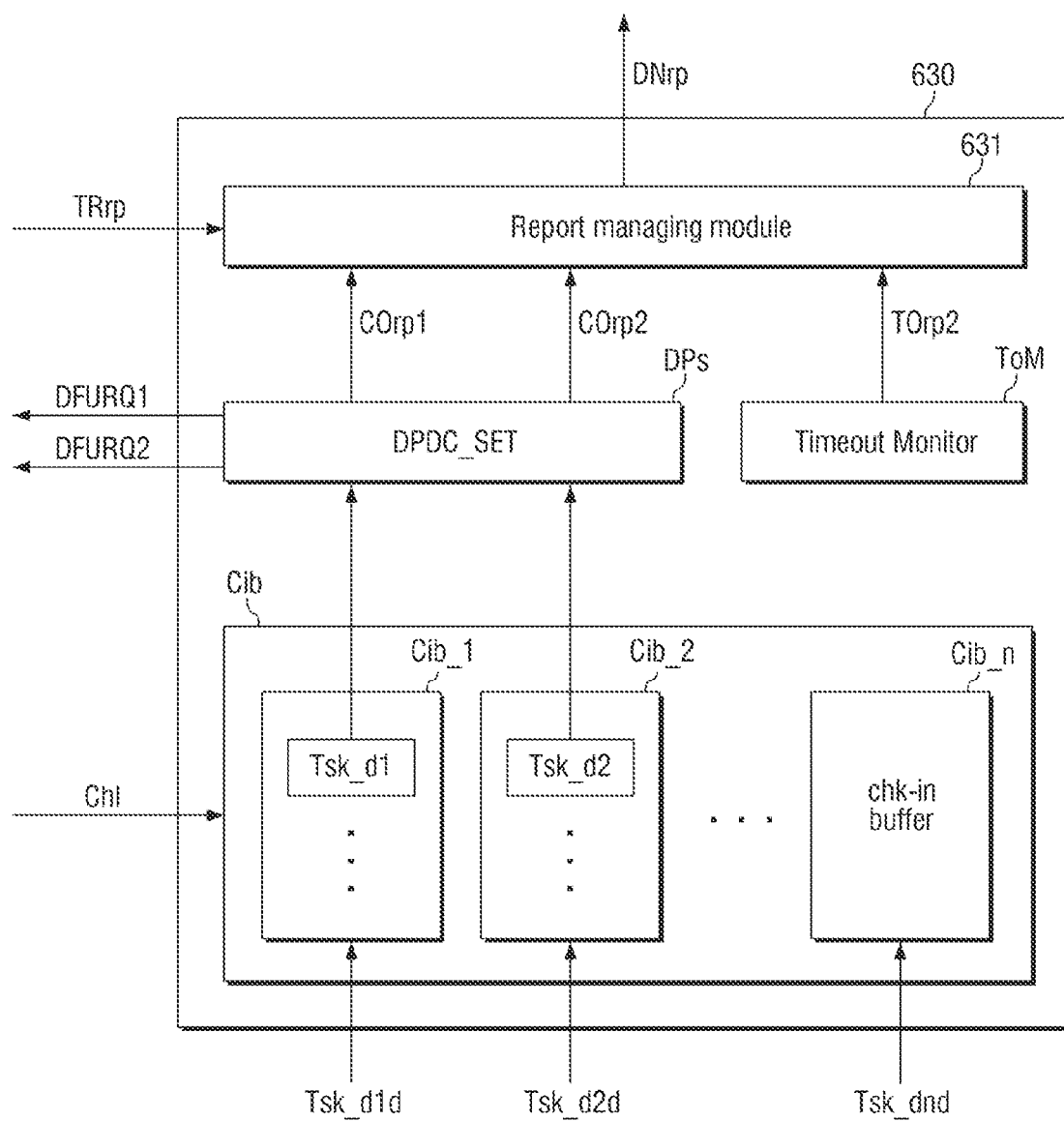
FIG. 26 is an example diagram for illustrating a process of generating a completion report in response to a second checkout report of the second task descriptor modified according to FIG. 25.

FIG. 26 is an example diagram for illustrating a process of generating a completion report in response to a second checkout report of the second task descriptor modified according to FIG. 25.

Referring to FIG. 26, the second check-in buffer Cib_2 receives the second completion signal Tsk_d2d via the core global 500 after a threshold time, and a checkout process for the modified second task descriptor STsk_d2 is performed. The dependency setter DPs may generate a second dependency update request DFURQ2 according to the completion of execution of the modified second task descriptor STsk_d2 and transfer the second dependency update request DFURQ2 to the task passage 620. In addition, the dependency setter DPs generates a second checkout report COrp2, and transmits the generated second checkout report COrp2 to the report managing module 631, so that a completion report DNrp is generated. The report managing module 631 constructs the completion report DNrp by including all information on the second checkout report COrp2 and the second timeout report TOrp2 received, and transfers the constructed completion report DNrp to the command processor 7000.

Figure 27:
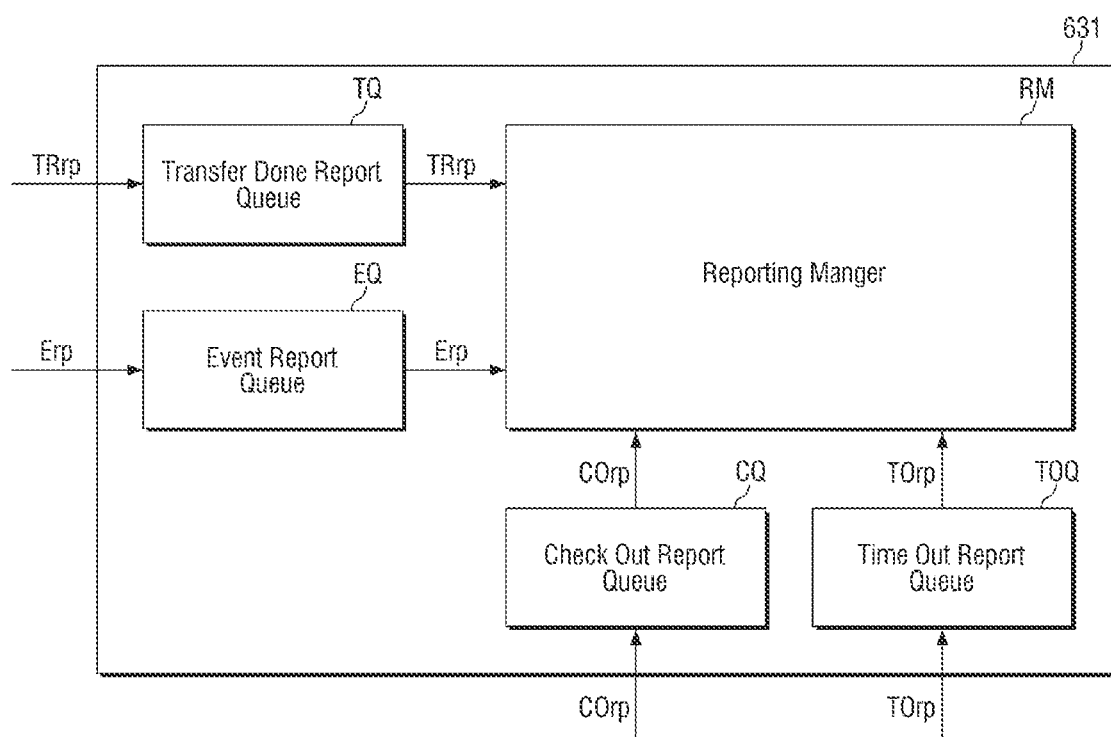
FIG. 27 is a block diagram for illustrating the report managing module of FIG. 23 in detail.

FIG. 27 is a block diagram for illustrating the report managing module of FIG. 23 in detail.

Referring to FIG. 27, the report managing module 631 may include a transfer done report queue TQ, an event report queue EQ, a checkout report queue CQ, a timeout report queue TOQ, and a reporting manager RM. The transfer done report queue TQ, the event report queue EQ, the checkout report queue CQ, the timeout report queue TOQ, and the reporting manager RM may be referred to respectively as a transfer done report queue circuit, an event report queue circuit, a checkout report queue circuit, a timeout report queue circuit, and a reporting manager circuit, but for the sake of convenience, the terms are respectively unified as a transfer done report queue, an event report queue, a checkout report queue, a timeout report queue, and the reporting manager. In addition, the transfer done report queue TQ, the event report queue EQ, the checkout report queue CQ, the timeout report queue TOQ, and the reporting manager RM may each be implemented as a circuit or circuitry.

The transfer done report queue TQ may receive the transfer done report TRrp and transfer the transfer done report TRrp to the reporting manager RM.

The event report queue EQ may receive the event report Erp and transfer the event report Erp to the reporting manager RM. To prevent an overflow of the event report queue EQ, when the number of entries in the event report queue EQ is larger than a first threshold for the event report queue EQ, the report managing module 631 may generate and send a pause signal requiring the runtime handle RH to pause so that the runtime handle RH does not check in any further tasks or task descriptors regardless of the status of the register in the runtime handle RH. The report managing module 631 or the command processor 7000 may generate and send a resume signal requiring the runtime handle RH to resume so that the runtime handle RH can continue to perform a process of checking in tasks or task descriptors, when it detects that the number of entries in the event report queue EQ is less than a second threshold for the event report queue EQ. The second threshold for the event report queue EQ may be equal to or smaller than the first threshold for the event report queue EQ. The resume signal may be triggered by software for a machine learning model which is processed by the CPU 20.

The checkout report queue CQ may receive the checkout report COrp and transfer the checkout report COrp to the reporting manager RM. To prevent an overflow of the checkout report queue CQ, when the number of entries in the checkout report queue CQ is larger than a first threshold for the checkout report queue CQ, the report managing module 631 may generate and send a pause signal requiring the runtime handle RH to pause so that the runtime handle RH does not check in any further tasks or task descriptors regardless of the status of the register in the runtime handle RH. The report managing module 631 or the command processor 7000 may generate and send a resume signal requiring the runtime handle RH to resume so that the runtime handle RH can continue to perform a process of checking in tasks or task descriptors, when it detects that the number of entries in the checkout report queue CQ is less than a second threshold for the checkout report queue CQ. The second threshold for the checkout report queue CQ may be equal to or smaller than the first threshold for the checkout report queue CQ. The resume signal may be triggered by software for a machine learning model which is processed by the CPU 20.

The timeout report queue TOQ may receive the timeout report TOrp and transfer the timeout report TOrp to the reporting manager RM. To prevent an overflow of the timeout report queue TOQ, when the number of entries in the timeout report queue TOQ is larger than a first threshold for the timeout report queue TOQ, the report managing module 631 may generate and send a pause signal requiring the runtime handle RH to pause so that the runtime handle RH does not check in any further tasks or task descriptors regardless of the status of the register in the runtime handle RH. The report managing module 631 or the command processor 7000 may generate and send a resume signal requiring the runtime handle RH to resume so that the runtime handle RH can continue to perform a process of checking in tasks or task descriptors, when it detects that the number of entries in the timeout report queue TOQ is less than a second threshold for the timeout report queue TOQ. The second threshold for the timeout report queue TOQ may be equal to or smaller than the first threshold for the timeout report queue TOQ. The resume signal may be triggered by software for a machine learning model which is processed by the CPU 20.

The reporting manager RM may receive at least one of the transfer done report TRrp, the event report Erp, the checkout report COrp, or the timeout report TOrp, and may generate a completion report DNrp through this. The reporting manager RM may transfer the completion report DNrp to the command processor 7000.

Figure 28:
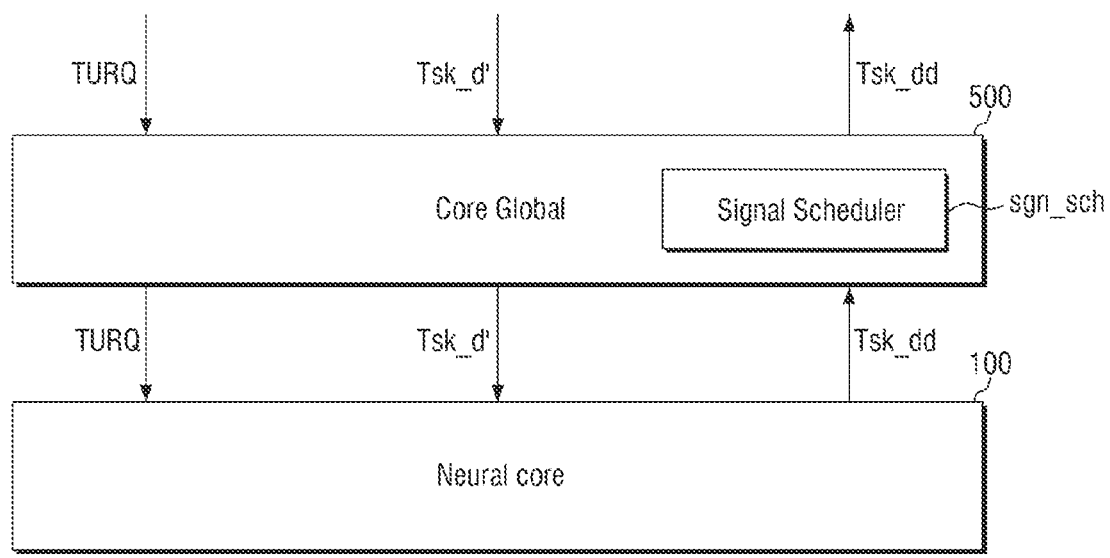
FIG. 28 is a diagram for illustrating data that the core global and the processing unit of FIG. 15 exchange.

FIG. 28 is a diagram for illustrating data that the core global and the processing unit of FIG. 15 exchange.

Referring to FIG. 28, the core global 500 may receive the table update request TURQ and transfer the table update request TURQ to the LSU 110. In addition, the core global 500 may receive the task information Tsk_d' and transfer the task information Tsk_d' to the neural core 100.

The neural core 100 may perform tasks and generate completion signals. The neural core 100 may transfer the completion signals to the core global 500. The core global 500 may include a signal scheduler sgn_sch. The signal scheduler sgn_sch may receive the completion signal, schedule a transmission of the completion signal, and transmit the completion signal to the done passage 630. The signal scheduler sgn_sch may be referred to as a signal scheduler circuit, but for the sake of convenience, the terms are unified as a signal scheduler. Further, the signal scheduler sgn_sch may be implemented as a circuit or circuitry.

Figure 29:
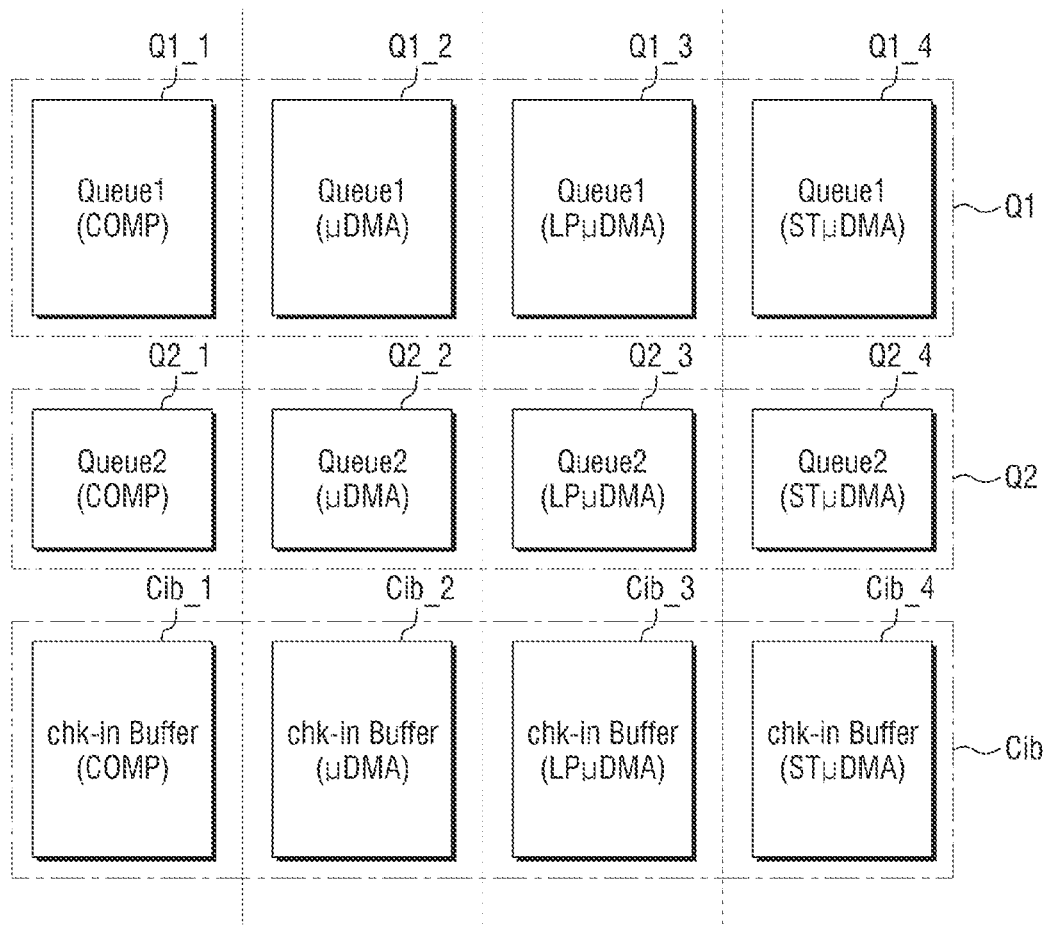
FIG. 29 is a diagram for illustrating types of task descriptors stored in a first queue, a second queue, and a check-in buffer.

FIG. 29 is a diagram for illustrating types of task descriptors stored in a first queue, a second queue, and a check-in buffer.

Referring to FIG. 29, the 1st to 4th queues Q1_1 ... Q1_4 of the first queue group Q1, the 1st to 4th queues Q2_1 ... Q2_4 of the second queue group Q2, and first to fourth check-in buffers Cib_1 to Cib_4 of a check-in buffer Cib may store particular types of task descriptors, respectively. The 1st to 4th queues Q1_1 ... Q1_4 of the first queue group Q1, the 1st to 4th queues Q2_1 ... Q2_4 of the second queue group Q2, and the first to fourth check-in buffers Cib_1 to Cib_4 may store different types of task descriptors.

For example, the 1st queue Q1_1 of the first queue group Q1, the 1st queue Q2_1 of the second queue group Q2, and the first check-in buffer Cib_1 may store task descriptors for computation (COMP), and the 2nd queue Q1_2 of the first queue group Q1, the 2nd queue Q2_2 of the second queue group Q2, and the second check-in buffer Cib_2 may store task descriptors for micro-DMA. In addition, the 3rd queue Q1_3 of the first queue group Q1, the 3rd queue Q2_3 of the second queue group Q2, and the third check-in buffer Cib_3 may store task descriptors for LP micro-DMA, and the 4th queue Q1_4 of the first queue group Q1, the 4th queue Q2_4 of the second queue group Q2, and the fourth check-in buffer Cib_4 may store task descriptors for ST micro-DMA. However, the embodiment is not limited thereto.

Figure 30:
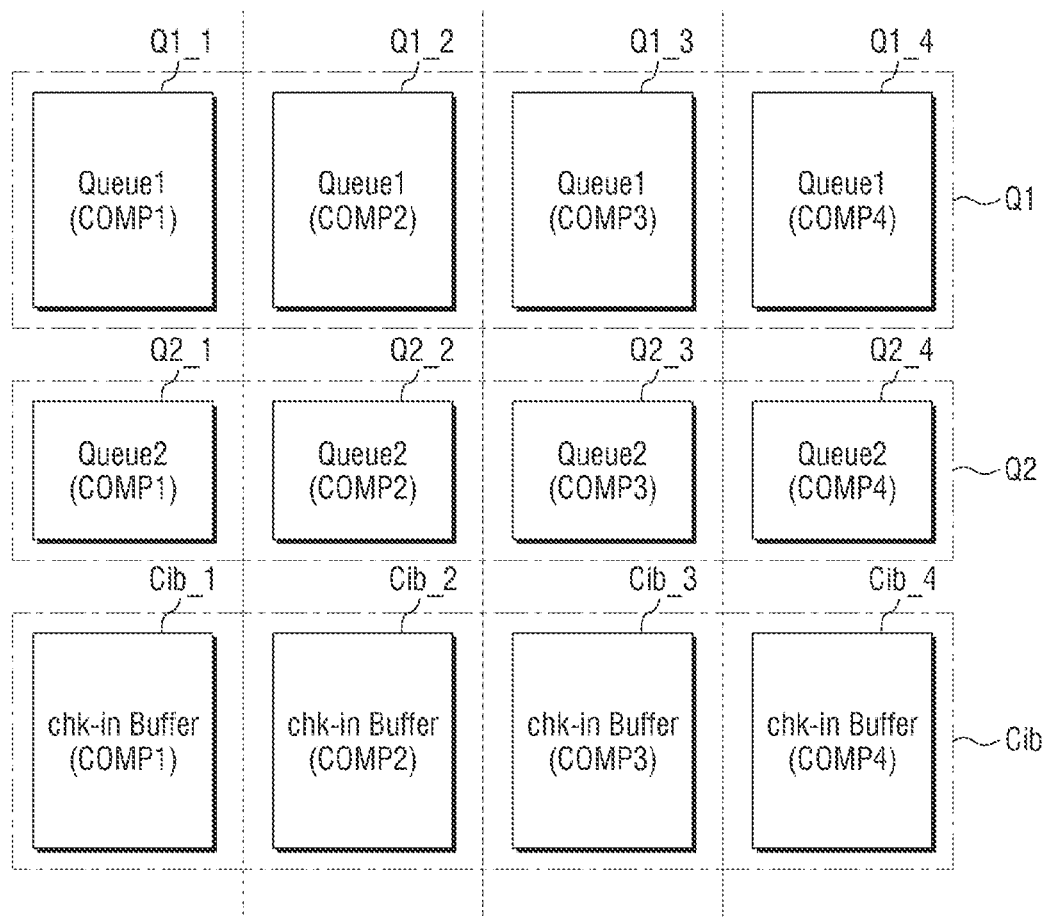
FIG. 30 is a diagram for illustrating a first queue, a second queue, and a check-in buffer of a neural processing device in accordance with some embodiments of the disclosure.

FIG. 30 is a diagram for illustrating a first queue, a second queue, and a check-in buffer of a neural processing device in accordance with some embodiments of the disclosure.

Referring to FIG. 30, the 1st to 4th queues Q1_1 ... Q1_4 of the first queue group Q1, 1st to 4th queues Q2_1 ... Q2_4 of the second queue group Q2, and first to fourth check-in buffers Cib_1 to Cib_4 of a check-in buffer Cib may store particular types of task descriptors, respectively. The 1st to 4th queues Q1_1 ... Q1_4 of the first queue group Q1, the 1st to 4th queues Q2_1 ... Q2_4 of the second queue group Q2, and the first to fourth check-in buffers Cib_1 to Cib_4 may store the same type of task descriptors.

For example, the 1st queue Q1_1 of the first queue group Q1, the 1st queue Q2_1 of the second queue group Q2, and the first check-in buffer Cib_1 may store task descriptors for first computation, and the 2nd queue Q1_2 of the first queue group Q1, the 2nd queue Q2_2 of the second queue group Q2, and the second check-in buffer Cib_2 may store task descriptors for second computation. In addition, the 3rd queue Q1_3 of the first queue group Q1, the 3rd queue Q2_3 of the second queue group Q2, and the third check-in buffer Cib_3 may store task descriptors for third computation, and the 4th queue Q1_4 of the first queue group Q1, the 4th queue Q2_4 of the second queue group Q2, and the fourth check-in buffer Cib_4 may store task descriptors for fourth computation. However, the embodiment is not limited thereto.

In some embodiments, the first to fourth computations may be exactly the same computation, or may be computations of the same type but different kinds in detail.

Figure 31:
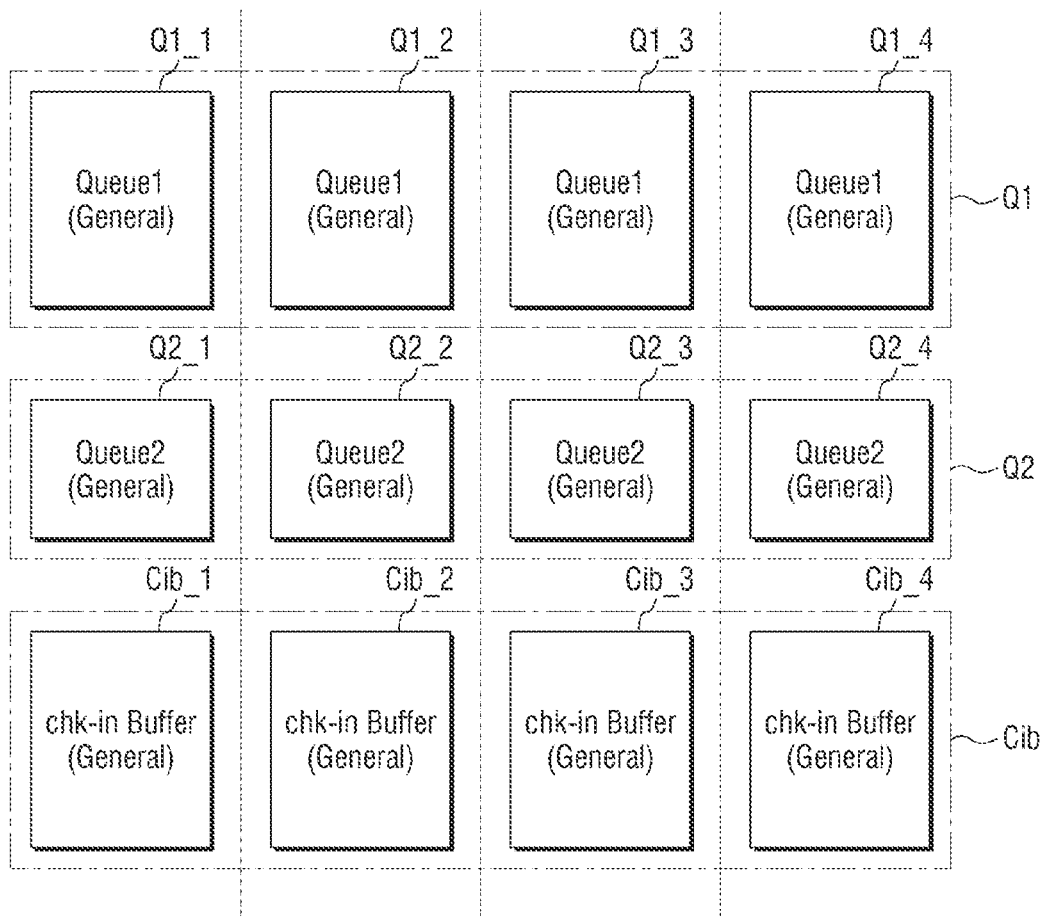
FIG. 31 is a diagram for illustrating a first queue, a second queue, and a check-in buffer of a neural processing device in accordance with some embodiments of the disclosure.

FIG. 31 is a diagram for illustrating a first queue, a second queue, and a check-in buffer of a neural processing device in accordance with some embodiments of the disclosure.

Referring to FIG. 31, the 1st to 4th queues Q1_1 ... Q1_4 of a first queue group Q1, 1st to 4th queues Q2_1 ... Q2_4 of the second queue group Q2, and first to fourth check-in buffers Cib_1 to Cib_4 of a check-in buffer Cib may store several types of task descriptors, respectively. The 1st to 4th queues Q1_1 ... Q1_4 of a first queue group Q1, the 1st to 4th queues Q2_1 ... Q2_4 of the second queue group Q2, and the first to fourth check-in buffers Cib_1 to Cib_4 may store different types of task descriptors or the same type of task descriptors.

Figure 32:
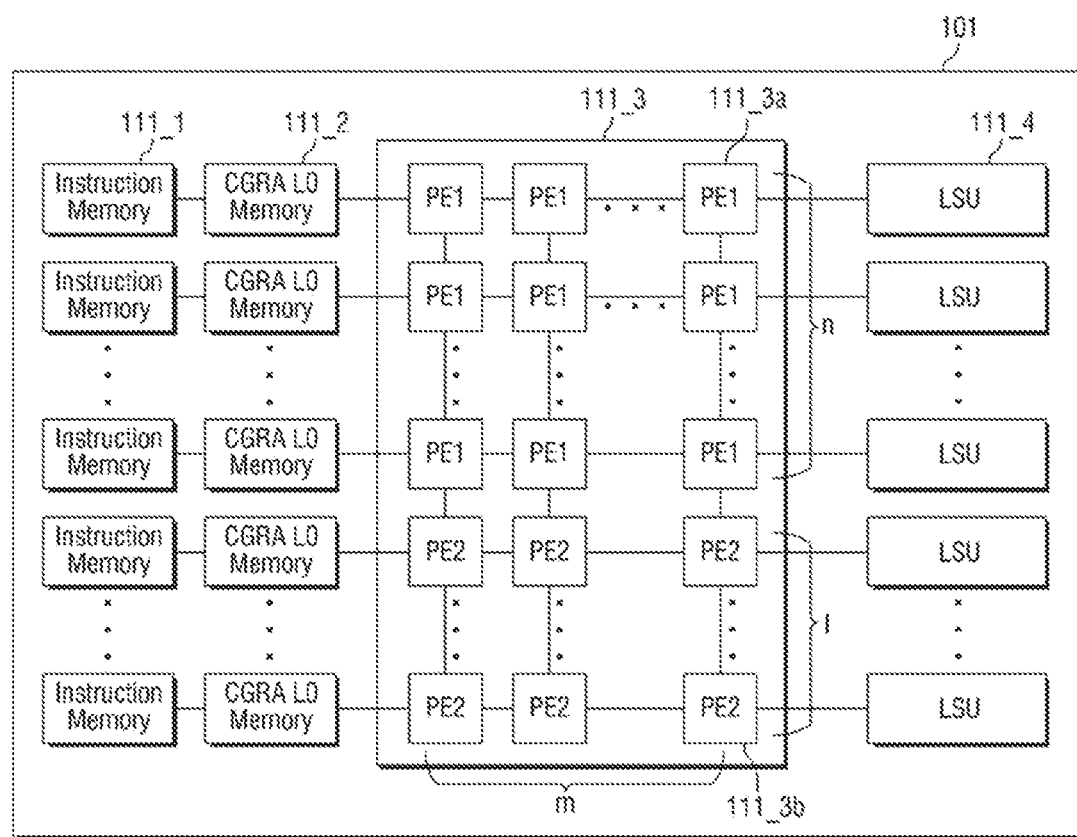
FIG. 32 is a block diagram for illustrating the structure of the neural processing device of FIG. 1 in detail.

FIG. 32 is a block diagram for illustrating in detail the structure of the neural processing device in accordance with some embodiments of the disclosure.

Referring to FIG. 32, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In some embodiments, the instructions may instruct the operation of first type of a plurality of processing elements 111_3a included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In some embodiments, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in 1 rows. Accordingly, the first type of the plurality of processing elements 111_3a and the second type of the plurality of processing element 111_3b may be arranged in (n+1) rows and m columns.

The LSU 111_4 may receive at least one of data, a control signal, or a synchronization signal from the outside via the local interconnection 200. The LSU 111_4 may transmit at least one of the received data, control signal, or synchronization signal to the CGRA L0 memory 111_2. Similarly, the LSU 111_4 may transfer at least one of the data, control signal, or synchronization signal to the outside via the local interconnection 200.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In other words, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

Figure 33:
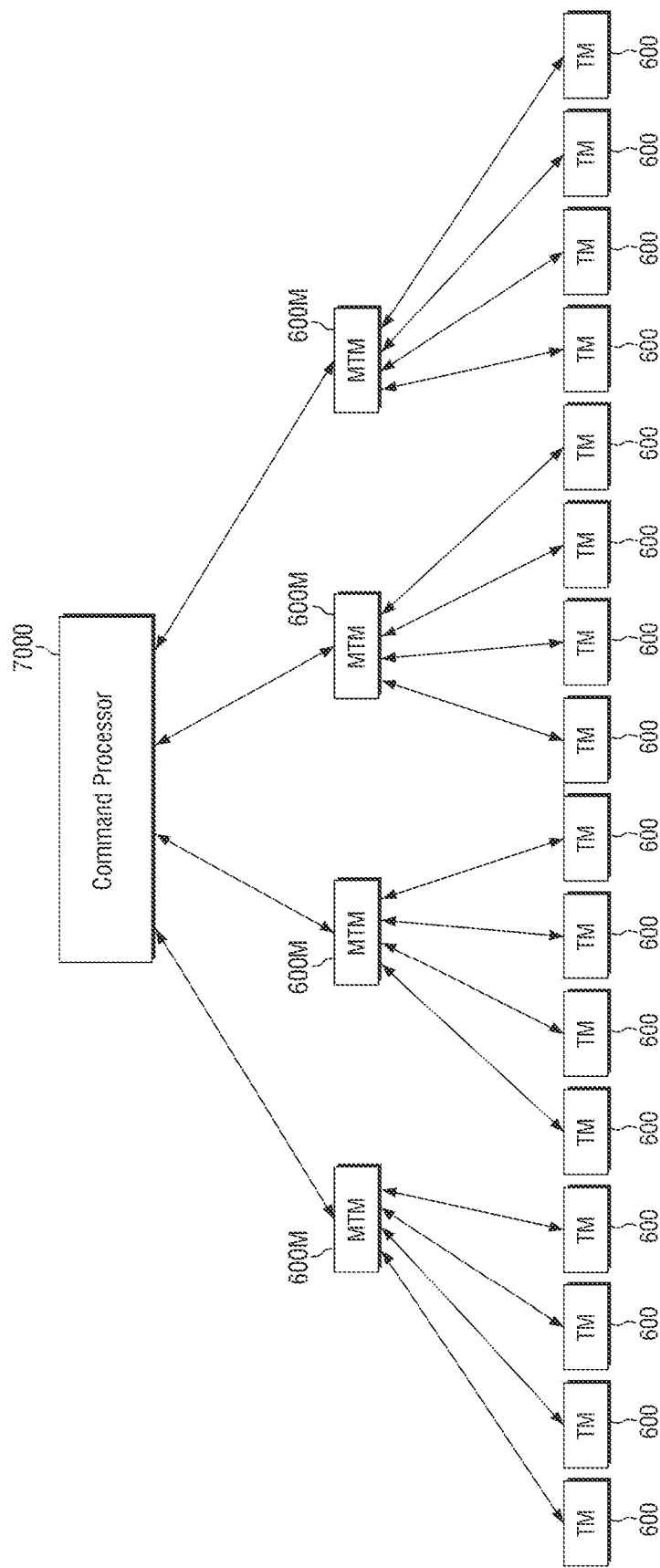
FIG. 33 is a diagram for illustrating a hierarchical structure of a command processor and task managers of a neural processing device in accordance with some embodiments of the disclosure.
Figure 34:
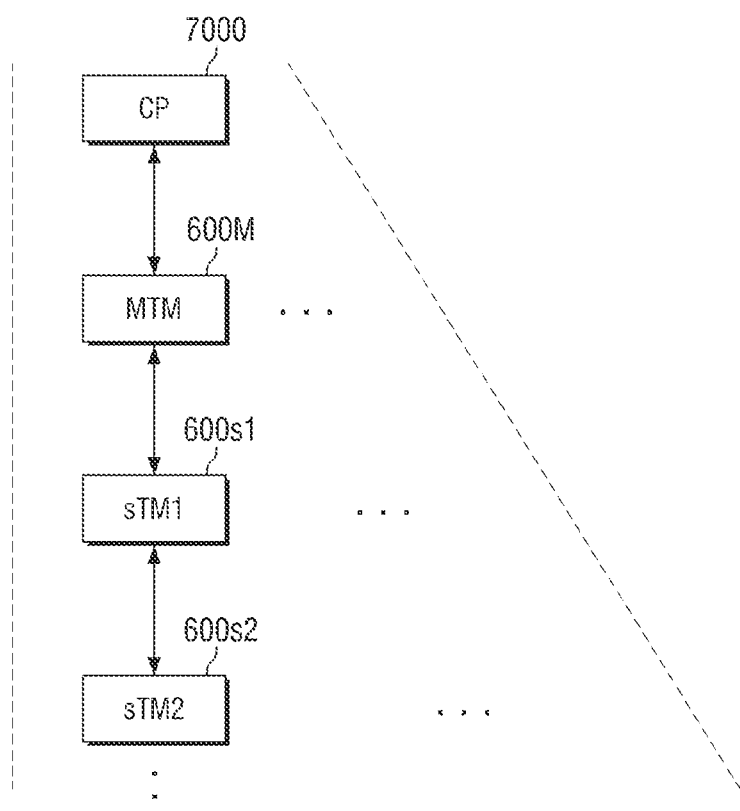
FIG. 34 is a diagram for illustrating a hierarchical structure of a command processor and task managers of a neural processing device in accordance with some embodiments of the disclosure.

FIG. 33 is a diagram for illustrating a hierarchical structure of a command processor and a task manager of a neural processing device in accordance with some embodiments of the disclosure, and FIG. 34 is a diagram for illustrating a hierarchical structure of a command processor and task managers of a neural processing device in accordance with some embodiments of the disclosure.

Referring to FIGS. 33 and 34, if the number of task managers 600 increases, it may be difficult for the command processor 7000 to manage all of the task managers 600. Therefore, the neural processing device 1 in accordance with some embodiments of the disclosure may have a hierarchical structure in which a master task manager 600M manages the plurality of task managers 600 and the command processor 7000 manages the master task managers 600M.

Further, referring to FIG. 34, levels below the master task manager 600M may also be subdivided into a plurality. For example, a first sub-task manager 600s1 and a second sub-task manager 600s2 may form each layer. In some embodiments, one first sub-task manager 600s1 may manage at least one second sub-task manager 600s2, and one master task manager 600M may manage at least one first sub-task manager 600s1. Additionally, several layers may be added below the second sub-task manager 600s2 as well.

In some embodiments, although three levels of the task managers 600, the master task managers 600M, and the command processor 7000 are shown in FIGS. 33 and 34, the number of levels may be four or more. In other words, the depth of the hierarchical structure may vary as desired depending on the number of task managers 600. In addition, the master task manager 600M, the first sub-task manager 600s1, and the second sub-task manager 600s2 may be referred to respectively as a master task manager circuit, a first sub-task manager circuit, and a second sub-task manager circuit, but for the sake of convenience, the terms are respectively unified as a master task manager, a first sub-task manager, and a second sub-task manager. Further, the master task manager 600M, the first sub-task manager 600s1, and the second sub-task manager 600s2 may each be implemented as a circuit or circuitry.

Figure 35:
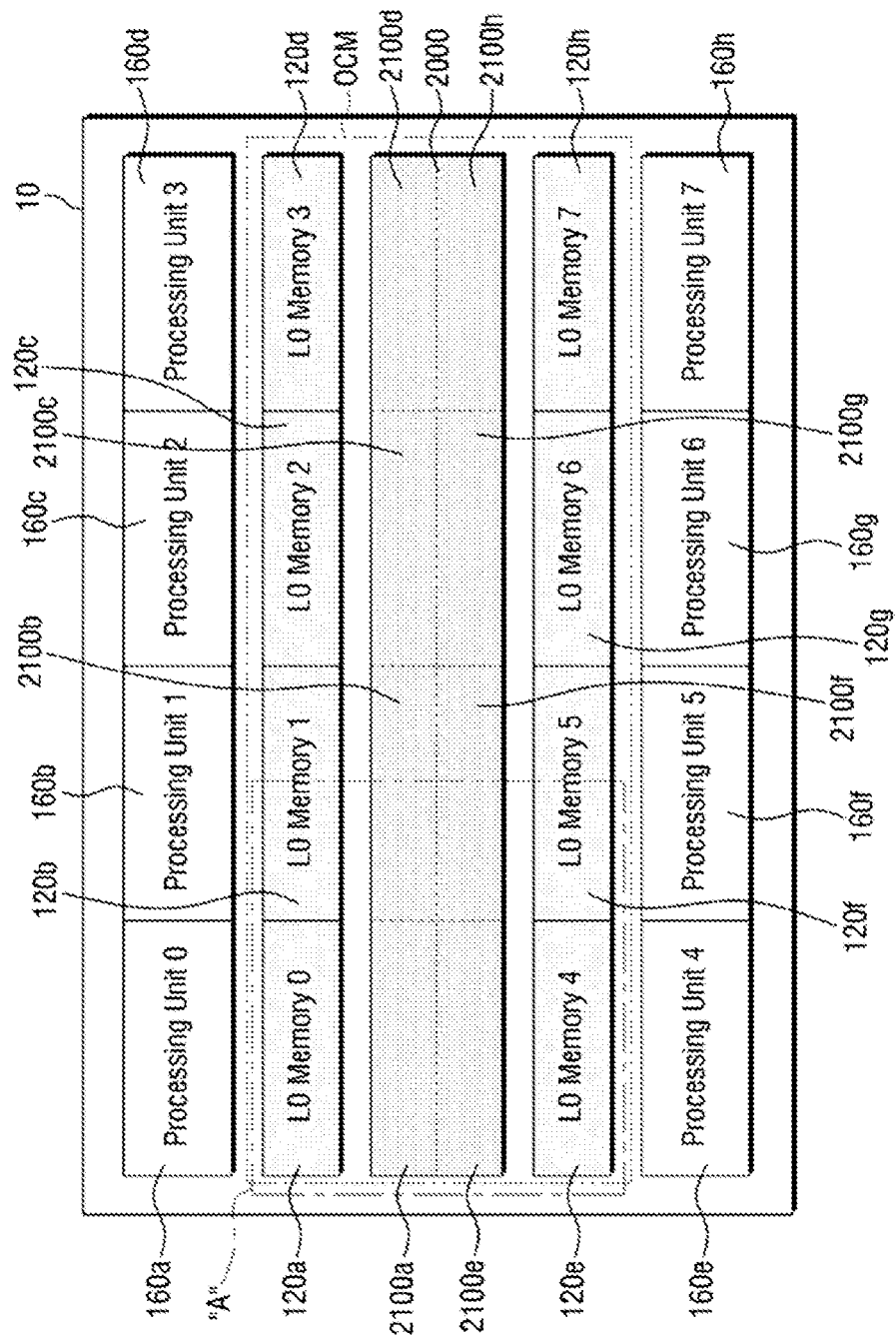
FIG. 35 is a block diagram for illustrating the memory reconstruction of the neural processing system of FIG. 1.

FIG. 35 is a block diagram for illustrating memory reconfiguration of a neural processing system in accordance with some embodiments of the disclosure.

Referring to FIG. 35, the neural core SoC 10 may include first to eighth processing units 160a to 160h and an on-chip memory OCM. Although FIG. 35 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. In some embodiments, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In some embodiments, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In some embodiments, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 36:
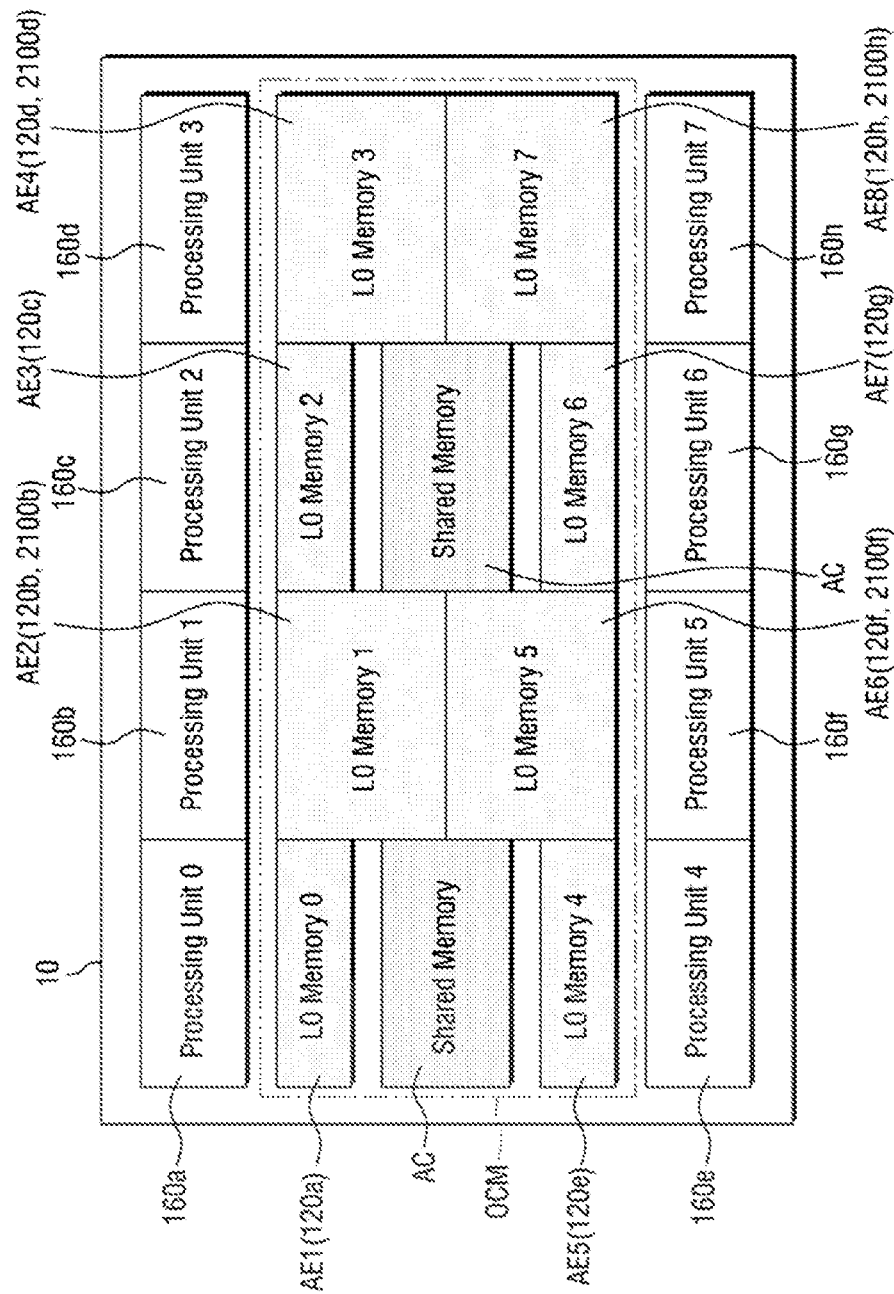
FIG. 36 is a block diagram showing an example of the memory reconstruction of the neural processing system of FIG. 1.

FIG. 36 is a block diagram showing an example of memory reconstruction of a neural processing system in accordance with some embodiments of the disclosure.

With reference to FIGS. 35 and 36, first, third, fifth, and seventh dedicated areas AE1. AE3, AE5, and AE7 for each of the first, third, fifth, and seventh processing units 160a, 160c, 160e, and 160g may include only the first, third, fifth, and seventh L0 memories 120a. 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2. AE4. AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

In some embodiments, each processing unit may perform the same task in some cases, but may perform different tasks in other cases as well. In some embodiments, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Figure 37:
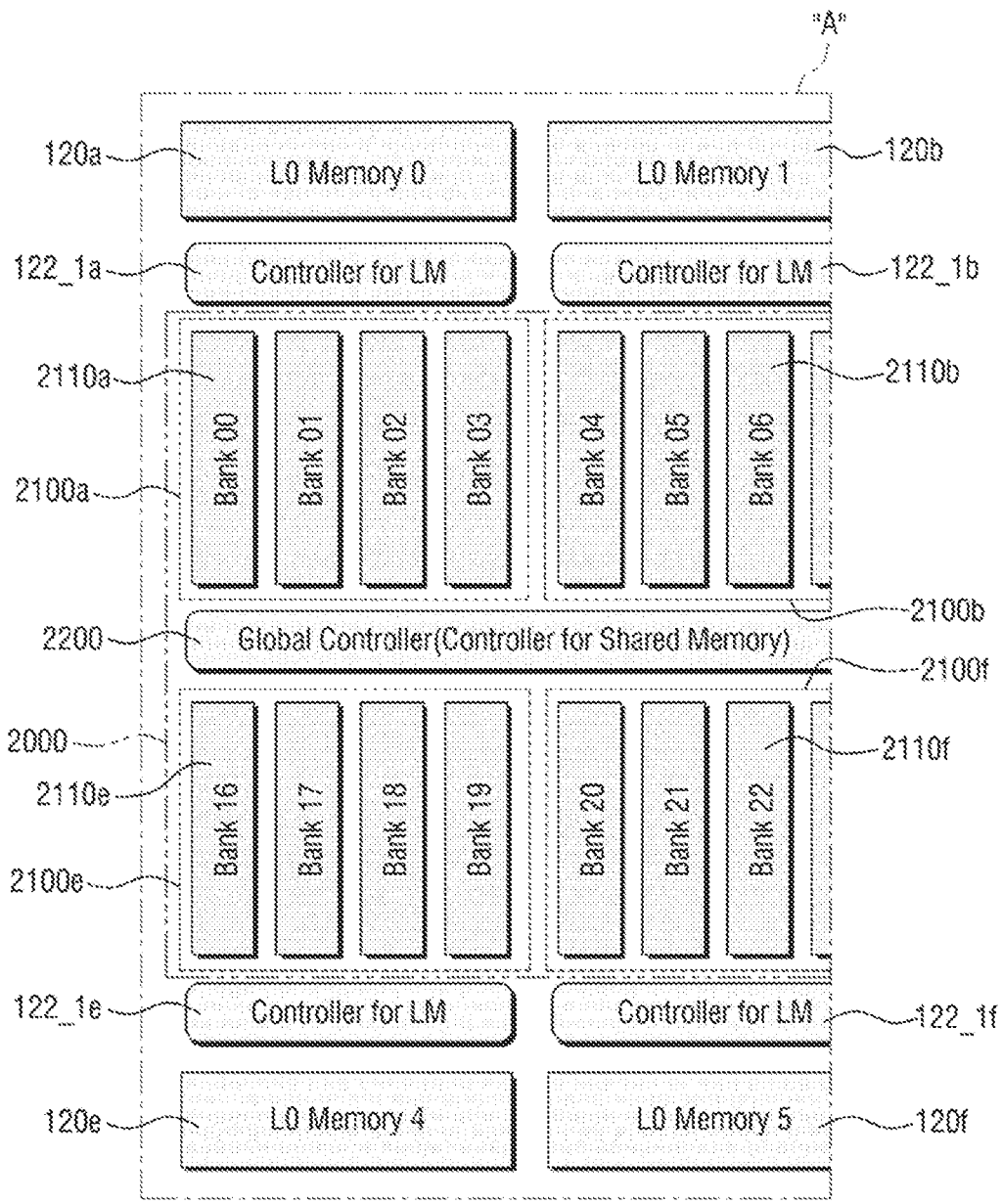
FIG. 37 is an enlarged block diagram of a portion A of FIG. 35.

Therefore, the shared memory 2000 of the neural processing device in accordance with the embodiment may set an optimal ratio of the L0 memory and the global memory according to calculation tasks during the runtime, and may enhance the efficiency and speed of calculation. FIG. 37 is an enlarged block diagram of a portion A of FIG. 35.

With reference to FIGS. 35 and 37, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, the first L0 memory controller 122_1a, the second L0 memory controller 122_1b, the fifth L0 memory controller 122_1e, the sixth L0 memory controller 122_1f, and the global controller 2200 may each be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 8.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 22 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In some embodiments, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In some embodiments, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In some embodiments, the third area and the fourth area do not necessarily coexist, and any one area may take up the entire first memory unit 2100a.

In some embodiments, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments of the disclosure may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 38:
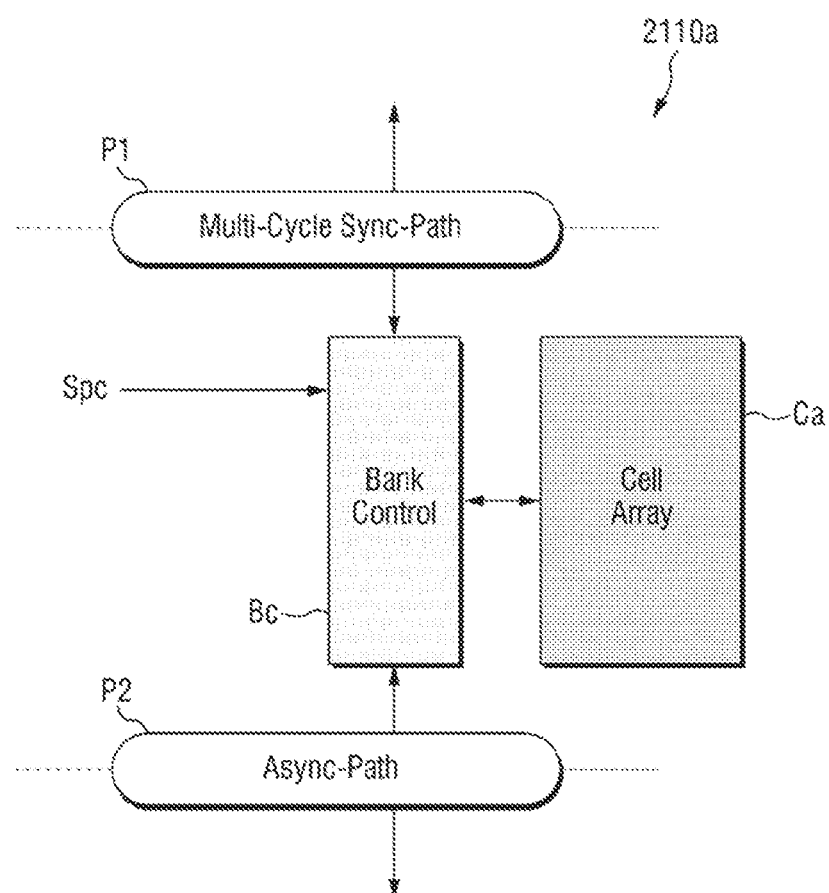
FIG. 38 is a diagram for illustrating the first memory bank of FIG. 37 in detail.

FIG. 38 is a diagram for illustrating the first memory bank of FIG. 37 in detail. Although FIG. 38 illustrates the first memory bank 2110a, other memory banks may also have the same structure as the first memory bank 2110a.

Referring to FIG. 38, the first memory bank 2110a may include a cell array Ca, a bank controller Bc, a first path unit P1, and a second path unit P2.

In some embodiments, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, the bank controller Bc, the first path unit P1, and the second path unit P2 may each be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Be exchanges data with the first path unit P1, and a second interface may be used when the bank controller Bc exchanges data with the second path unit P2. In some embodiments, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In some embodiments, "directly" may mean being exchanged with each other without going through the global interconnection 6000. In other words, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 37.

The first path unit P1 may form a multi-cycle sync-path. In other words, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In some embodiments, the operating clock frequency of the first path unit P1 may be multiples of the operating clock frequency of the bank controller Bc. In some embodiments, a clock domain crossing (CDC) operation for synchronizing the clocks between the bank controller Bc and the first path unit P1 is not required separately, and thus, a delay of data transmission may not occur. Accordingly, faster and more efficient data exchange can be possible.

In the embodiment shown in FIG. 38, an operating clock frequency of the first path unit P1 may be 1.5 GHZ, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In some embodiments, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 37.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 38, the operating clock frequency of the second path unit P2 may not be synchronized with the operating clock frequency of the bank controller Bc. In some embodiments, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design may be decreased, thereby making it possible to more easily derive the desired hardware operation.

The bank controller Bc may use different address systems in the case of exchanging data via the first path unit P1 and in the case of exchanging data via the second path unit P2. In other words, the bank controller Be may use a first address system if exchanging data via the first path unit P1 and a second address system if exchanging data via the second path unit P2. In some embodiments, the first address system and the second address system may be different from each other.

A bank controller Bc is not necessarily required for each memory bank. In other words, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Be may exist for each memory bank. In some embodiments, the bank controller Bc may control each memory bank individually.

Referring to FIG. 37 and FIG. 38, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In some embodiments, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 38, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHZ) and a global interconnection (e.g., 1 GHZ) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 39:
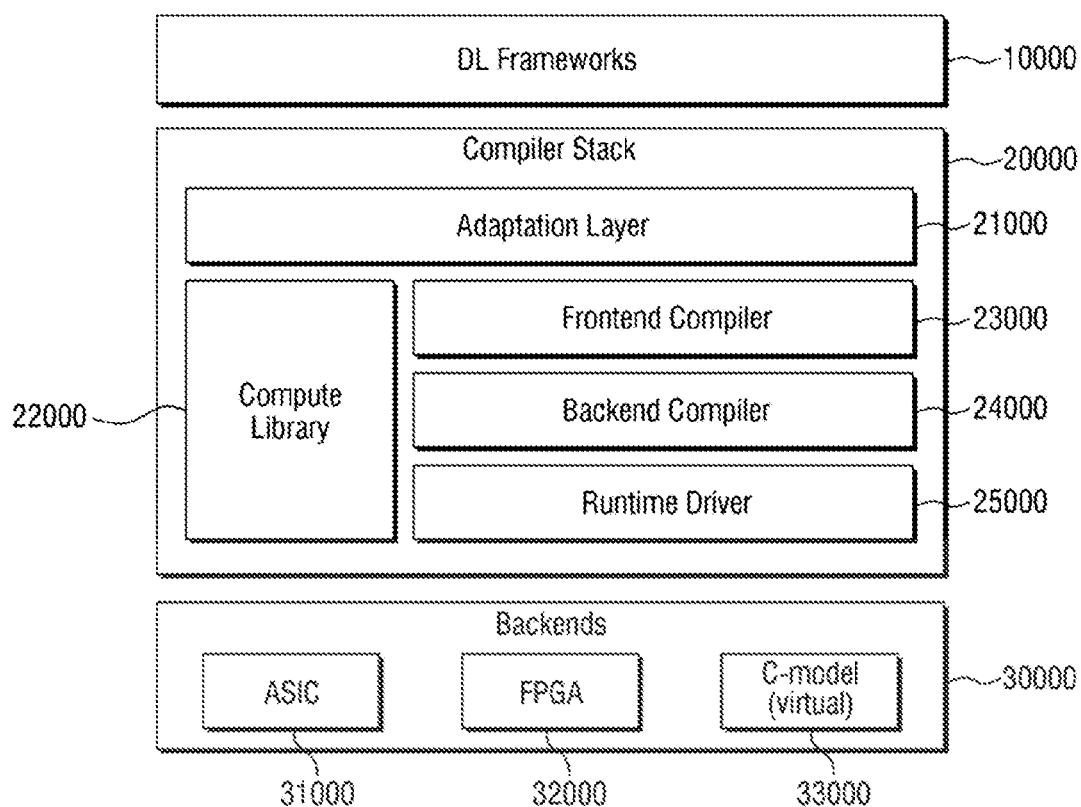
FIG. 39 is a block diagram for illustrating a software hierarchy of a neural processing device in accordance with some embodiments of the disclosure.

FIG. 39 is a block diagram for illustrating a software hierarchy of a neural processing device in accordance with some embodiments.

Referring to FIG. 39, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 40:
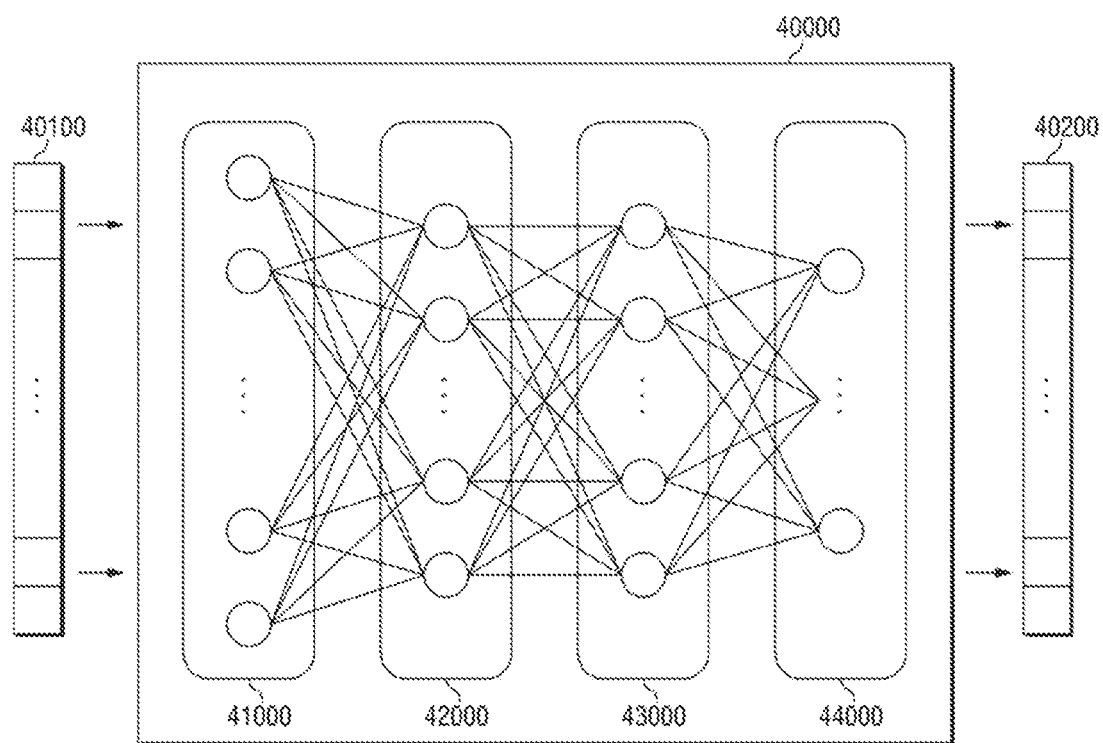
FIG. 40 is a conceptual diagram for illustrating deep learning calculations performed by a neural processing device in accordance with some embodiments of the disclosure.

FIG. 40 is a conceptual diagram for illustrating deep learning calculations performed by a neural processing device in accordance with some embodiments.

Referring to FIG. 40, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 25, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 41:
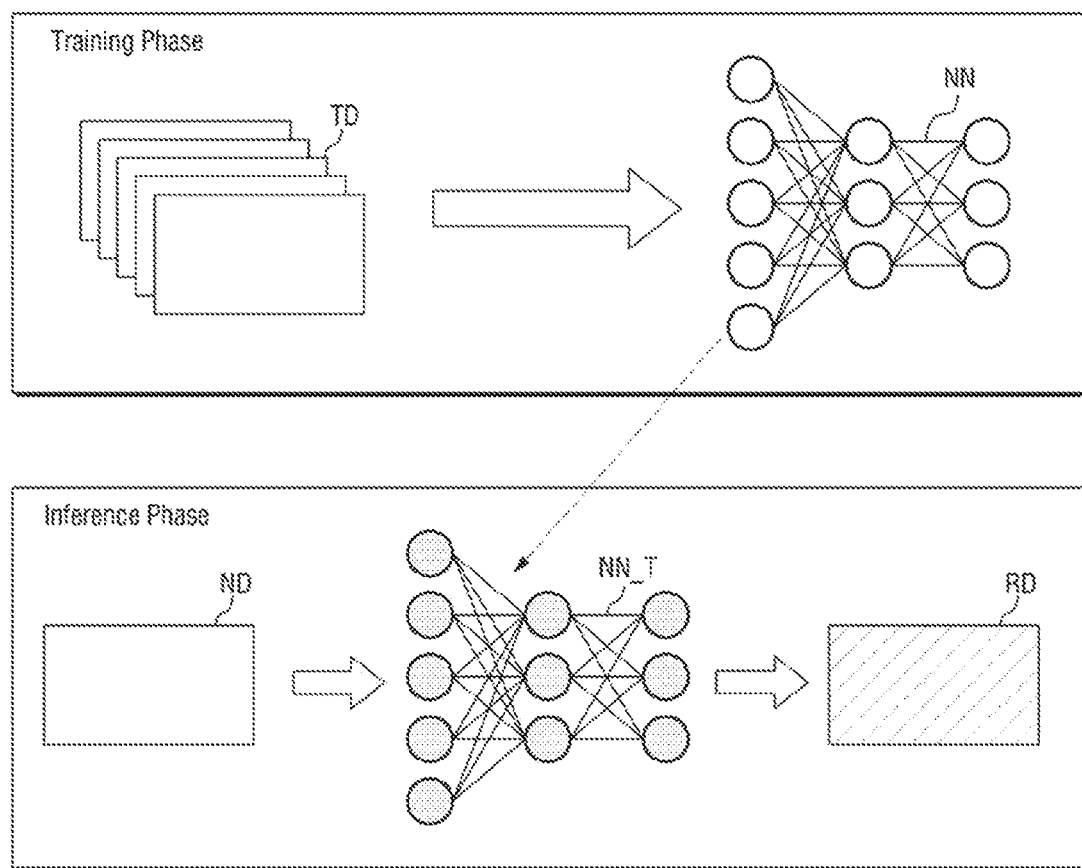
FIG. 41 is a conceptual diagram for illustrating training and inference operations of a neural network of a neural processing device in accordance with some embodiments of the disclosure.

FIG. 41 is a conceptual diagram for illustrating training and inference operations of a neural network of a neural processing device in accordance with some embodiments.

Referring to FIG. 41, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a neural processing device in accordance with some embodiments of the disclosure will be described with reference to FIGS. 17 to 28, 42 to 47, and so on. The parts overlapping with the embodiments described above will be omitted or simplified.

Figure 42:
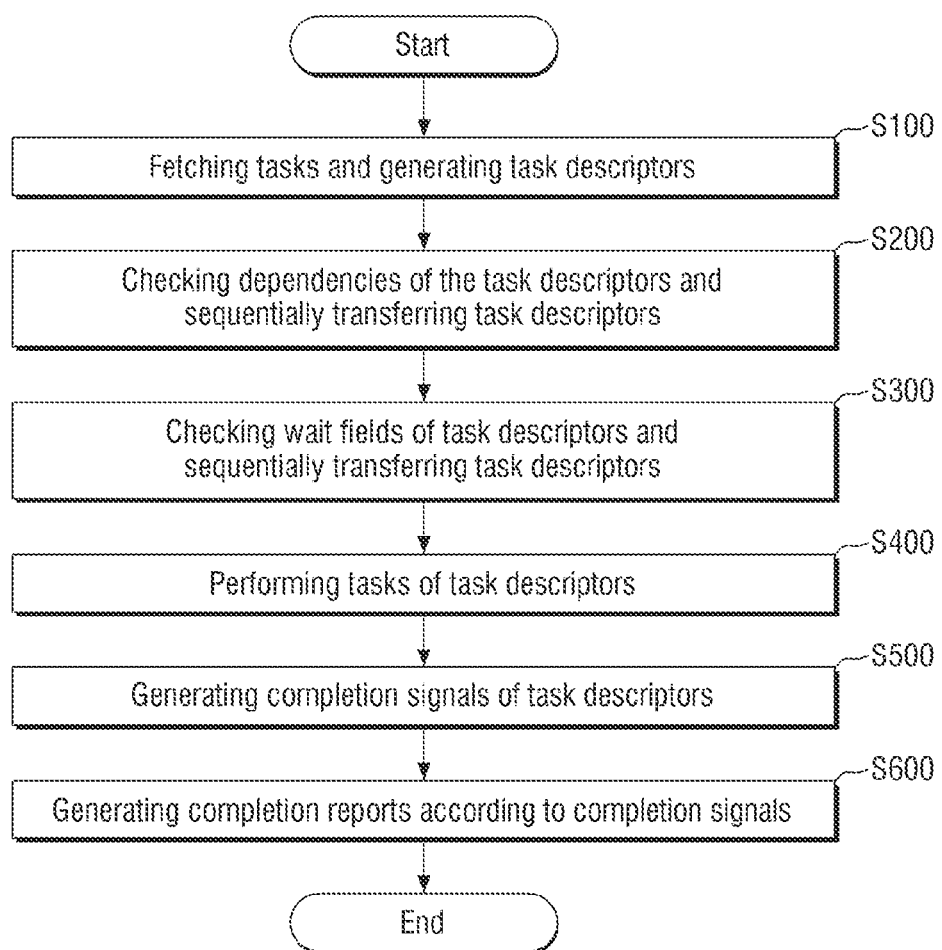
FIG. 42 is a flowchart for illustrating a method for managing tasks of a neural processing device in accordance with some embodiments of the disclosure.
Figure 43:
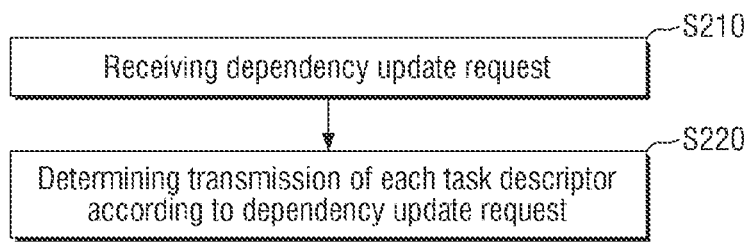
FIG. 43 is a flowchart for illustrating the checking the dependencies of FIG. 42 in detail.
Figure 44:
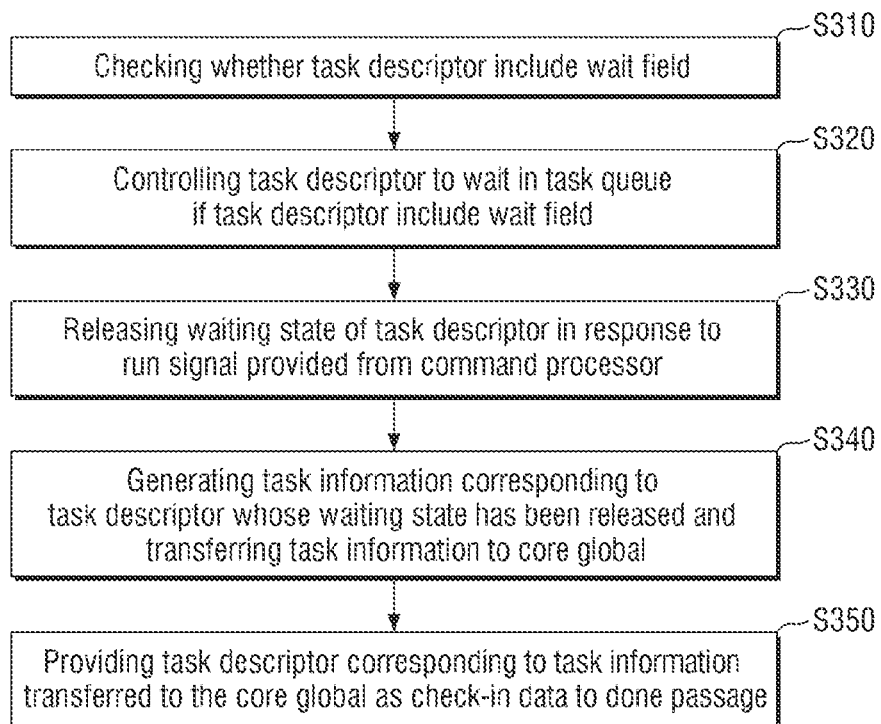
FIG. 44 is a flowchart for illustrating the checking the wait fields of FIG. 42 in detail.
Figure 45:
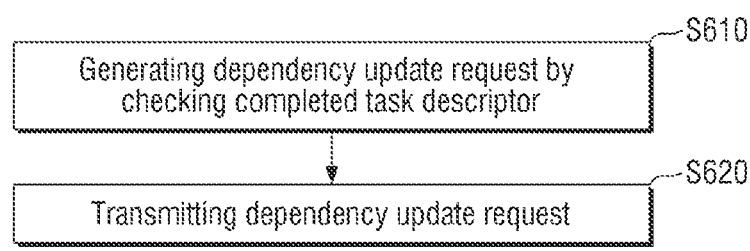
FIG. 45 is a flowchart for illustrating a process of generating a dependency update request in detail, in the generating the completion reports of FIG. 42.
Figure 46:
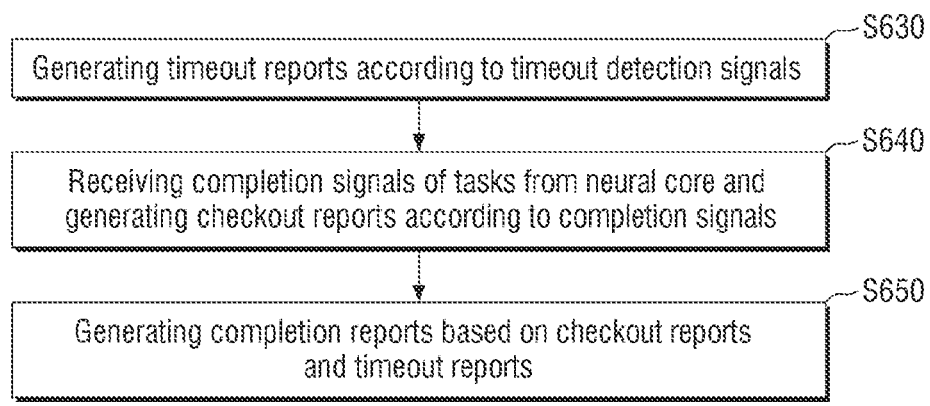
FIG. 46 is a flowchart for illustrating a process of generating the completion reports in detail, in the generating the completion reports of FIG. 42.
Figure 47:
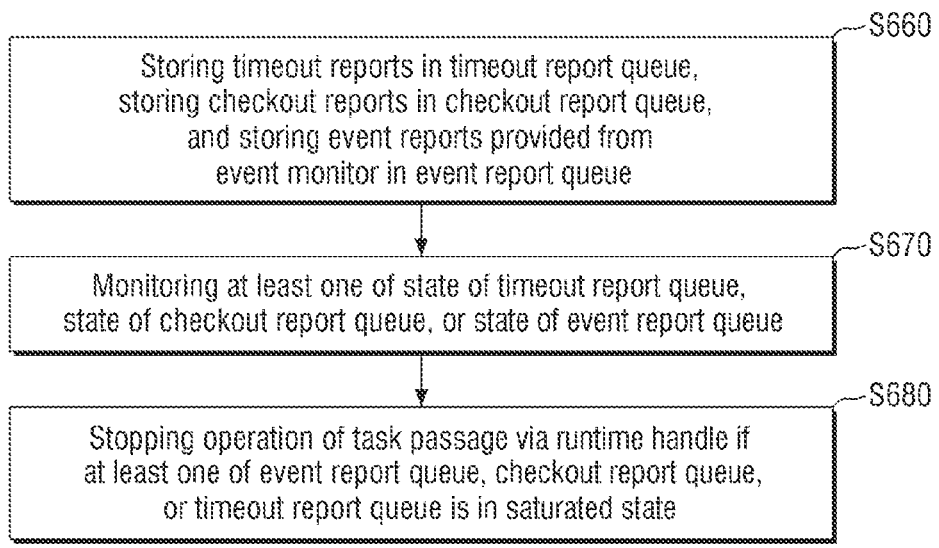
FIG. 47 is a flowchart for illustrating a control process according to the state of a report queue, in the generating the completion reports of FIG. 42.

FIG. 42 is a flowchart for illustrating a method for managing tasks of a neural processing device in accordance with some embodiments of the disclosure, and FIG. 43 is a flowchart for illustrating the checking the dependencies of FIG. 42 in detail. FIG. 44 is a flowchart for illustrating the checking and sequentially transferring the wait fields of FIG. 42 in detail. FIG. 45 is a flowchart for illustrating a process of generating a dependency update request in detail, in the generating the completion reports of FIG. 42. FIG. 46 is a flowchart for illustrating the process of generating the completion reports in detail, in the generating the completion reports of FIG. 42. FIG. 47 is a flowchart for illustrating a control process according to the state of a report queue, in the generating the completion reports of FIG. 42.

Referring to FIG. 42, the task manager 600 may fetch tasks and generate task descriptors at S100.

Specifically, referring to FIG. 17, the task buffer 621 may store tasks Task according to control signals transmitted from the command processor 7000. The task buffer 621 may store the tasks Task in the form of task descriptors in the first queue group Q1 by task fetching operations of the core global 500. In some embodiments, the task passage 620 may generate task descriptors corresponding to the tasks Task and store the task descriptors in the first queue group Q1.

Referring again to FIG. 42, dependencies of the task descriptors are checked and transferred in sequence at S200.

In detail, referring to FIG. 43, a dependency update request is received at S210. Next, transmission of each task descriptor is determined according to the dependency update request at S220.

Specifically, referring to FIG. 17, the dependency checker DPc may receive a dependency update request DFURQ. The dependency update request DFURQ may notify a change of dependency as a completed task occurs according to a defined dependency between particular tasks. In some embodiments, each task descriptor may include a dependency field as to which tasks it has a dependency on. In some embodiments, it must be updated in such a way that when the task included in the dependency field is completed, it will be removed from the dependency field. Therefore, the dependency update request DFURQ may include an update request for the dependency field of a task descriptor. Accordingly, the dependency checker DPc may sequentially transmit the first to n-th task descriptors Tsk_d1 to Tsk_dn to the second queue group Q2.

Referring again to FIG. 42, wait fields of the task descriptors are checked and transferred sequentially at S300.

In detail, referring to FIG. 44, step S300 includes checking whether the task descriptors include a wait field at S310, controlling the task descriptors to wait in a task queue if the task descriptors include the wait field at S320, releasing the waiting state of the task descriptors in response to a run signal provided from the command processor at S330, generating task information corresponding to the task descriptor for which the waiting state has been released and transferring the task information to the core global at S340, and providing the task descriptor corresponding to the task information transferred to the core global as check-in data to the done passage at S350.

Specifically, referring to FIG. 18, a plurality of task descriptors for which the dependency check has been completed may be stored in the second queue group Q2, the runtime handle RH may check whether the task descriptors stored in the second queue group Q2 include the wait field, and determine the state of the task descriptors as a run state or a waiting state.

The runtime handle RH may receive a run signal Run from the command processor 7000. The run signal Run may be provided from the command processor 7000 via the control interconnection CI. The command processor 7000 may transfer the run signal Run in response to transmitting a task that includes a wait field, but embodiments of the disclosure are not limited thereto. The command processor 7000 may transmit the run signal Run to the runtime handle RH at regular intervals. The runtime handle RH may change the task descriptors in the waiting state to the run state in response to the run signal Run.

At S330, the run signal may be a signal provided after the waiting state of the task descriptor, but is not limited thereto. At S330, the run signal may be a signal provided before the waiting state of the task descriptor. In some embodiments, the runtime handle RH may be configured to receive the run signal Run and store the run signal Run for a period of time.

The runtime handle RH may include at least one of at least one register Rs or counter Rc for receiving and storing the run signal Run, but embodiments of the disclosure are not limited thereto.

Referring again to FIG. 42, the tasks of the task descriptors are performed at S400. Next, completion signals of the task descriptors are generated at S500.

Specifically, referring to FIG. 28, the neural core 100 may perform tasks and generate completion signals. The neural core 100 may transfer the completion signals to the core global 500. The core global 500 may include a signal scheduler sgn_sch. The signal scheduler sgn_sch may receive the completion signal, schedule the transmission of the completion signal, and transmit the completion signal to the done passage 630.

Referring again to FIG. 42, completion reports according to the completion signals are generated at S600.

Referring to FIG. 45 in detail, a dependency update request is generated by checking the completed task descriptor at S610. Next, the dependency update request is transmitted at S620.

Specifically, referring to FIG. 18, the dependency setter DPs may receive the completion signals from the check-in buffer Cib and generate dependency update requests DFURQ. In some embodiments, depending on which task corresponding to what task descriptor has been completed, the dependency setter DPs may generate a dependency update request DFURQ. The dependency setter DPs may transmit the dependency update request DFURQ to the task passage 620.

In some embodiments, performing the tasks of the transferred task descriptors at S400 may include monitoring the execution time of the tasks and generating timeout detection signals.

The timeout monitor ToM may receive the timeout detection signals TOdec from the check-in buffer Cib. The timeout detection signal TOdec may be a signal regarding whether a time interval between a check-in time and a check-out time exceeds a preset threshold time. The check-in buffer Cib may compare the execution time of the task with the threshold time and determine whether to generate the timeout detection signal TOdec. The check-in buffer Cib may generate the timeout detection signal TOdec if the execution time calculated from the check-in time exceeds the threshold time. Whether to generate a timeout report and the threshold for the execution time may be set individually according to the tasks.

Referring to FIG. 46, generating the completion reports at S600 may further include generating timeout reports according to the timeout detection signals at S630, generating checkout reports according to the received completion signals at S640, and generating the completion reports based on the checkout reports and the timeout reports at S650. Here, steps S630 to S650 are detailed steps for generating the completion reports, and there is no special precedence relationship established between steps S610 to S620 related to the dependency update request.

At S650, the completion report DNrp may be generated based on the checkout report COrp. Since the completion report DNrp includes at least the checkout report, whether a task has been normally performed can be transferred to the command processor 7000. Through the generation and transfer of such a completion report DNrp, it can be checked whether a task has been performed normally, and it is possible to prevent a delay in performing a particular task from being prolonged according to dependencies.

In addition, the completion report DNrp may be configured to further include at least one of the transfer done report TRrp, the event report Erp, or the timeout report TOrp, and it is possible to comprehensively report to the command processor 7000 whether a timeout has occurred, whether a transfer has been completed, whether an event has occurred, and the like, along with whether a task has been performed.

In an embodiment, whether to generate such a completion report DNrp may be set individually according to the tasks. In some embodiments, the command processor 7000 may be set in advance so that a particular task will not receive a completion report DNrp related thereto. Accordingly, since completion reports may not be generated for all tasks, the burden of data processing on the task manager 600 may be reduced, and as the command processor 7000 may not receive all completion reports, the management efficiency of the command processor 7000 may be increased.

However, if an important warning related to task execution or a request for a part requiring correction is required to the command processor 7000, such as a timeout report TOrp, corresponding information may be required to be transferred via a completion report DNrp.

For example, the tasks may include a first task that is set to generate a completion report and a second task that is set not to generate a completion report. In the providing the task descriptor corresponding to the task information transferred to the core global as check-in data to the done passage at S350, a first task descriptor corresponding to the first task and a second task descriptor corresponding to the second task may be checked in at a first check-in buffer and a second check-in buffer, respectively. Here, in the generating the timeout reports, if a timeout report is generated for the second task that is set not to generate a completion report, the generating the completion reports at S650 may perform a process of modifying the second task descriptor to generate a completion report.

In some embodiments, if an important warning related to task execution or a request for a part requiring correction is required to the command processor 7000, such as a timeout report TOrp, corresponding information may be required to be transferred via a completion report DNrp. In an embodiment of the disclosure, if modification is needed for a task descriptor that is set not to generate a completion report, the timeout monitor ToM may transmit a modification request signal Mos to the check-in buffer in which the corresponding task descriptor is stored, and the corresponding task descriptor is modified so that a completion report is generated.

Furthermore, referring to FIG. 47, the generating the completion reports at S600 may include storing the timeout reports in a timeout report queue, storing the checkout reports in the checkout report queue, and storing the event reports provided from an event detection device in an event report queue at S660, and monitoring at least one of the state of the timeout report queue, the state of the checkout report queue, or the state of the event report queue at S670. Moreover, the generating the completion reports at S600 may further include stopping the operation of the task passage via the runtime handle at S680 if at least one of the state of the timeout report queue, the state of the checkout report queue, or the state of the event report queue is confirmed to be in a saturated state.

In some embodiments, blocks, units, modules, and components as described above may be implemented as a circuit or circuitry. Blocks, units, modules, and components which perform processing may be referred to as a processor, a processing circuit, a processor circuit, or a processing circuitry. Blocks, units, modules, and components which store data may be referred to as a memory, a memory circuit, or a memory circuitry.

Hereinafter, various aspects will be described.

In some aspects, a neural processing device comprises processing circuitry; and task managing circuitry operably coupled to the processing circuitry. The task managing circuitry is configured to cause: receiving a plurality of tasks; storing the plurality of received tasks in a dependency check waiting memory; determining whether reference tasks which a task in the dependency check waiting memory depends on are completed based on a dependency of the task in the dependency check waiting memory and a dependency check memory region, wherein the dependency of the task in the dependency check waiting memory represents a list of tasks which have to be completed for the task in the dependency check waiting memory to be transferred to the processing circuitry and the dependency check memory region represents whether reference tasks which tasks in the dependency check waiting memory depend on are completed; transferring the task in the dependency check waiting memory to a process waiting memory in response to determining that reference tasks which the task in the dependency check waiting memory depends on are completed; and transferring tasks in the process waiting memory to the processing circuitry.

In some aspects, transferring the tasks in the process waiting memory to the processing circuitry comprises: determining whether a task in the process waiting memory indicates that a run signal is required for the task in the process waiting memory to be processed, when the task in the process waiting memory indicates that a run signal is not required, transferring the task in the process waiting memory to the processing circuitry regardless of the run signal, and when the task in the process waiting memory indicates that that a run signal is required, transferring the task in the process waiting memory to the processing circuitry in response to receiving the run signal.

In some aspects, the neural processing device of claim 2, wherein transferring the task in the process waiting memory to the processing circuitry in response to receiving the run signal comprises: in response to receiving the run signal, changing a state of a register to indicate that the run signal has been received, and when the task in the process waiting memory indicates that that a run signal is required, transferring the task in the process waiting memory to the processing circuitry in response to determining that the state of the register indicates the run signal has been received.

In some aspects, transferring the task in the process waiting memory to the processing circuitry in response to receiving the run signal further comprises: in response to transferring the task in the process waiting memory to the processing circuitry, changing the state of the register to indicate that the run signal has not been received.

In some aspects, transferring the task in the process waiting memory to the processing circuitry in response to receiving the run signal comprises: in response to receiving the run signal, increasing a counter value in a register to indicate how many run signals have been received, in response to transferring, to the processing circuitry, a task indicating that the run signal is required to be processed, decreasing the counter value in the register, and when the task in the process waiting memory indicates that the run signal is required transferring the task in the process waiting memory to the processing circuitry in response to determining that the counter value is greater than zero.

In some aspects, the task managing circuitry is further configured to cause: storing events in an even queue; and in response to detecting that a number of entries in the even queue is larger than a threshold, ceasing to transfer tasks in the process waiting memory to the processing circuitry regardless of the run signal until transferring tasks to the processing circuitry is resumed.

In some aspects, the task managing circuitry is further configured to cause: storing tasks which are not completed for a predetermined time in a timeout queue; and storing tasks which are completed in a completed task queue.

In some aspects, the task managing circuitry is further configured to cause: in response to detecting that a number of entries in the timeout queue is larger than a threshold, ceasing to transfer tasks in the process waiting memory to the processing circuitry regardless of the run signal until transferring tasks to the processing circuitry is resumed.

In some aspects, the task managing circuitry is further configured to cause: in response to detecting that a number of entries in the completed task queue is larger than a threshold, ceasing to transfer tasks in the process waiting memory to the processing circuitry regardless of the run signal until transferring tasks to the processing circuitry is resumed.

In some aspects, the plurality of tasks are received from an upper-level task managing circuitry of the task managing circuitry. The task managing circuitry is further configured to cause: determining whether a task in the completed task queue requires a report, and transmitting, to the upper-level task managing circuitry, a completion report indicating that a task in the completed task queue is completed, when the task in the completed task queue requires the report.

In some aspects, the plurality of tasks are received from an upper-level task managing circuitry of the task managing circuitry. The task managing circuitry is further configured to cause: determining whether a task in the timeout queue requires a report; and transmitting, to the upper-level task managing circuitry, a timeout report indicating that a task in the timeout queue is not completed for a predetermined time, when the task in the timeout queue requires the report.

In some aspects, the task managing circuitry is further configured to cause: updating the dependency check memory region in response to a signal indicating that a task processed by the processing circuitry is completed.

In some aspects, tasks are stored in a form of task descriptors in the dependency check waiting memory, and tasks are stored in a form of task descriptors in the process waiting memory.

In some aspects, the tasks are for a machine learning model, the processing circuitry processes tasks which are transferred from the process waiting memory to generate task processing results, and the neural processing device is configured to perform training or inference of the machine learning model based on the task processing results.

In some aspects, a method performed by a neural processing device, comprises: receiving a plurality of tasks; storing the plurality of received tasks in a dependency check waiting memory; determining whether reference tasks which a task in the dependency check waiting memory depends on are completed based on a dependency of the task in the dependency check waiting memory and a dependency check memory region, wherein the dependency of the task in the dependency check waiting memory represents a list of tasks which have to be completed for the task in the dependency check waiting memory to be transferred to the processing circuitry and the dependency check memory region represents whether reference tasks which tasks in the dependency check waiting memory depend on are completed; transferring the task in the dependency check waiting memory to a process waiting memory in response to determining that reference tasks which the task in the dependency check waiting memory depends on are completed; and transferring tasks in the process waiting memory to the processing circuitry.

In some aspects, transferring the tasks in the process waiting memory to the processing circuitry comprises: determining whether a task in the process waiting memory indicates that a run signal is required for the task in the process waiting memory to be processed; when the task in the process waiting memory indicates that a run signal is not required, transferring the task in the process waiting memory to the processing circuitry regardless of the run signal; and when the task in the process waiting memory indicates that that a run signal is required, transferring the task in the process waiting memory to the processing circuitry in response to receiving the run signal.

In some aspects, transferring the task in the process waiting memory to the processing circuitry in response to receiving the run signal comprises: in response to receiving the run signal, changing a state of a register to indicate that the run signal has been received; and when the task in the process waiting memory indicates that that a run signal is required, transferring the task in the process waiting memory to the processing circuitry in response to determining that the state of the register indicates the run signal has been received.

In some aspects, transferring the task in the process waiting memory to the processing circuitry in response to receiving the run signal further comprises: in response to transferring the task in the process waiting memory to the processing circuitry, changing the state of the register to indicate that the run signal has not been received.

In some aspects, transferring the task in the process waiting memory to the processing circuitry in response to receiving the run signal comprises: in response to receiving the run signal, increasing a counter value in a register to indicate how many run signals have been received; in response to transferring, to the processing circuitry, a task indicating that the run signal is required to be processed, decreasing the counter value in the register; and when the task in the process waiting memory indicates that the run signal is required transferring the task in the process waiting memory to the processing circuitry in response to determining that the counter value is greater than zero.

In some aspects, the tasks are for a machine learning model. The method further comprises: processing, the processing circuitry, tasks which are transferred from the process waiting memory to generate task processing results; and performing training or inference of the machine learning model based on the task processing results.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A neural processing device comprising:
processing circuitry; and
task managing circuitry operably coupled to the processing circuitry,
wherein the task managing circuitry is configured to cause:
receiving a plurality of tasks;
storing the plurality of received tasks in a dependency check waiting memory;
determining whether reference tasks which a task in the dependency check waiting memory depends on are completed based on a dependency of the task in the dependency check waiting memory and a dependency check memory region, wherein the dependency of the task in the dependency check waiting memory represents a list of tasks which have to be completed for the task in the dependency check waiting memory to be transferred to the processing circuitry and the dependency check memory region represents whether reference tasks which tasks in the dependency check waiting memory depend on are completed;
transferring the task in the dependency check waiting memory to a process waiting memory in response to determining that reference tasks which the task in the dependency check waiting memory depends on are completed;
transferring tasks in the process waiting memory to the processing circuitry; and
updating the dependency check memory region in response to a signal indicating that a task processed by the processing circuitry is completed.

2. The neural processing device of claim 1, wherein transferring the tasks in the process waiting memory to the processing circuitry comprises:
determining whether a task in the process waiting memory indicates that a run signal is required for the task in the process waiting memory to be processed,
when the task in the process waiting memory indicates that a run signal is not required, transferring the task in the process waiting memory to the processing circuitry regardless of the run signal, and
when the task in the process waiting memory indicates that that a run signal is required, transferring the task in the process waiting memory to the processing circuitry in response to receiving the run signal.

3. The neural processing device of claim 2, wherein transferring the task in the process waiting memory to the processing circuitry in response to receiving the run signal comprises:
in response to receiving the run signal, changing a state of a register to indicate that the run signal has been received, and
when the task in the process waiting memory indicates that that a run signal is required, transferring the task in the process waiting memory to the processing circuitry in response to determining that the state of the register indicates the run signal has been received.

4. The neural processing device of claim 3, wherein transferring the task in the process waiting memory to the processing circuitry in response to receiving the run signal further comprises:
in response to transferring the task in the process waiting memory to the processing circuitry, changing the state of the register to indicate that the run signal has not been received.

5. The neural processing device of claim 2, wherein transferring the task in the process waiting memory to the processing circuitry in response to receiving the run signal comprises:
- in response to receiving the run signal, increasing a counter value in a register to indicate how many run signals have been received,
- in response to transferring, to the processing circuitry, a task indicating that the run signal is required to be processed, decreasing the counter value in the register, and
- when the task in the process waiting memory indicates that the run signal is required transferring the task in the process waiting memory to the processing circuitry in response to determining that the counter value is greater than zero.

6. The neural processing device of claim 2, wherein the task managing circuitry is further configured to cause:
- storing events in an even queue; and
- in response to detecting that a number of entries in the even queue is larger than a threshold, ceasing to transfer tasks in the process waiting memory to the processing circuitry regardless of the run signal until transferring tasks to the processing circuitry is resumed.

7. The neural processing device of claim 2, wherein the task managing circuitry is further configured to cause:
- storing tasks which are not completed for a predetermined time in a timeout queue; and
- storing tasks which are completed in a completed task queue.

8. The neural processing device of claim 7, wherein the task managing circuitry is further configured to cause:
- in response to detecting that a number of entries in the timeout queue is larger than a threshold, ceasing to transfer tasks in the process waiting memory to the processing circuitry regardless of the run signal until transferring tasks to the processing circuitry is resumed.

9. The neural processing device of claim 7, wherein the task managing circuitry is further configured to cause:
- in response to detecting that a number of entries in the completed task queue is larger than a threshold, ceasing to transfer tasks in the process waiting memory to the processing circuitry regardless of the run signal until transferring tasks to the processing circuitry is resumed.

10. The neural processing device of claim 7,
wherein the plurality of tasks are received from an upper-level task managing circuitry of the task managing circuitry,
wherein the task managing circuitry is further configured to cause:
determining whether a task in the completed task queue requires a report, and
transmitting, to the upper-level task managing circuitry, a completion report indicating that a task in the completed task queue is completed, when the task in the completed task queue requires the report.

11. The neural processing device of claim 7,
wherein the plurality of tasks are received from an upper-level task managing circuitry of the task managing circuitry,
wherein the task managing circuitry is further configured to cause:
determining whether a task in the timeout queue requires a report, and
transmitting, to the upper-level task managing circuitry, a timeout report indicating that a task in the timeout queue is not completed for a predetermined time, when the task in the timeout queue requires the report.

12. The neural processing device of claim 1, wherein
tasks are stored in a form of task descriptors in the dependency check waiting memory, and
tasks are stored in a form of task descriptors in the process waiting memory.

13. The neural processing device of claim 1, wherein
the tasks are for a machine learning model,
the processing circuitry processes tasks which are transferred from the process waiting memory to generate task processing results, and
the neural processing device is configured to perform training or inference of the machine learning model based on the task processing results.

14. A method performed by a neural processing device, comprising:
receiving a plurality of tasks;
storing the plurality of received tasks in a dependency check waiting memory;
determining whether reference tasks which a task in the dependency check waiting memory depends on are completed based on a dependency of the task in the dependency check waiting memory and a dependency check memory region, wherein the dependency of the task in the dependency check waiting memory represents a list of tasks which have to be completed for the task in the dependency check waiting memory to be transferred to a processing circuitry and the dependency check memory region represents whether reference tasks which tasks in the dependency check waiting memory depend on are completed;
transferring the task in the dependency check waiting memory to a process waiting memory in response to determining that reference tasks which the task in the dependency check waiting memory depends on are completed;
transferring tasks in the process waiting memory to the processing circuitry; and
updating the dependency check memory region in response to a signal indicating that a task processed by the processing circuitry is completed.

15. The method of claim 14, wherein transferring the tasks in the process waiting memory to the processing circuitry comprises:
determining whether a task in the process waiting memory indicates that a run signal is required for the task in the process waiting memory to be processed,
when the task in the process waiting memory indicates that a run signal is not required, transferring the task in the process waiting memory to the processing circuitry regardless of the run signal, and
when the task in the process waiting memory indicates that that a run signal is required, transferring the task in the process waiting memory to the processing circuitry in response to receiving the run signal.

16. The method of claim 15, wherein transferring the task in the process waiting memory to the processing circuitry in response to receiving the run signal comprises:
in response to receiving the run signal, changing a state of a register to indicate that the run signal has been received, and
when the task in the process waiting memory indicates that that a run signal is required, transferring the task in the process waiting memory to the processing circuitry in response to determining that the state of the register indicates the run signal has been received.

17. The method of claim 16, wherein transferring the task in the process waiting memory to the processing circuitry in response to receiving the run signal further comprises:
in response to transferring the task in the process waiting memory to the processing circuitry, changing the state of the register to indicate that the run signal has not been received.

18. The method of claim 15, wherein transferring the task in the process waiting memory to the processing circuitry in response to receiving the run signal comprises:
in response to receiving the run signal, increasing a counter value in a register to indicate how many run signals have been received,
in response to transferring, to the processing circuitry, a task indicating that the run signal is required to be processed, decreasing the counter value in the register, and
when the task in the process waiting memory indicates that the run signal is required transferring the task in the process waiting memory to the processing circuitry in response to determining that the counter value is greater than zero.

19. The method of claim 14, wherein the tasks are for a machine learning model,
the method further comprises:
processing, using the processing circuitry, tasks which are transferred from the process waiting memory to generate task processing results; and
performing training or inference of the machine learning model based on the task processing results.

\* \* \* \* \*